United States Patent [19]

Fleischer, III et al.

[11] Patent Number: 5,974,133

[45] Date of Patent: Oct. 26, 1999

[54] METHOD AND APPARATUS FOR FACILITATING COMMUNICATION ACROSS MULTIPLE LOCATIONS

[75] Inventors: Harold C. Fleischer, III; Michael W. Boeckman, both of St. Louis, Mo.

[73] Assignee: Southwestern Bell Technology Resources, Inc., Austin, Tex.

[21] Appl. No.: 08/640,140

[22] Filed: Apr. 30, 1996

[51] Int. Cl.⁶ .............................. H04M 7/00; H04M 3/42; H04M 3/00; H04Q 11/04

[52] U.S. Cl. .......................... 379/230; 370/410; 379/196; 379/210; 379/216; 379/220; 379/224; 379/231; 379/234; 379/901

[58] Field of Search ..................................... 379/207, 210, 379/211, 212, 215, 216, 219, 220, 222, 224, 229, 230, 196, 197, 198, 231, 232, 233, 234, 901; 370/410

[56] References Cited

U.S. PATENT DOCUMENTS

| | | | |
|---|---|---|---|
| 4,191,860 | 3/1980 | Weber | 379/115 |
| 4,611,094 | 9/1986 | Asmuth et al. | 379/201 |
| 4,611,096 | 9/1986 | Asmuth et al. | 379/207 |
| 4,757,267 | 7/1988 | Riskin | 379/113 |
| 4,788,718 | 11/1988 | McNabb | 379/113 |
| 5,247,571 | 9/1993 | Kay et al. | 379/207 |
| 5,353,331 | 10/1994 | Emery | 379/207 X |
| 5,422,941 | 6/1995 | Hasenauer et al. | 379/207 |
| 5,539,817 | 7/1996 | Wilkes | 379/230 |
| 5,574,780 | 11/1996 | Andruska et al. | 379/216 X |

OTHER PUBLICATIONS

Advanced Intelligent Network (AIN) 0.1 Switching Systems Generic Requirements (Bellcore TR–NWT 001284), Issue 1, Aug. 1992.

Advanced Intelligent Network (AIN) 0.1 Switch–Service Control Point (SCP) Application Protocol Interface Generic Requirements (Bellcore TR–NWT–001285), Issue 1, Aug. 1992.

Generic Requirements for GetData (Bellcore GR–2838–CORE), Issue 1, Aug. 1994.

Generic Requirements for GetData (Bellcore GR–2838–CORE), Revision 1, Jul. 1996.

Berman, Roger K., and Brewster, John H., Perspectives on the AIN Architecture, IEEE Communications Magazine, Feb. 1992, pp. 27–32.

"ISDN Call Forwarding," Bell Communications Research, Technical Reference TR–TSY–000853, Issue 1 (Dec. 1988).

"ISDN Call Forwarding, Revision 1," Bell Communications Research, Technical Reference TR–TSY–000853, Revision 1 (Dec. 1993).

"Class Feature: Calling Number Delivery," Bell Communications Research, Technical Reference TR–TSY–000031, Issue 3 (Jan. 1990).

"Class Calling Name Delivery Generic Requirements", Bell Communications Research, Technical Reference TR–NWT–001188, Issue 1 (Dec. 1991).

"Status of PINs and Remote Access", Bell Communications Research, Technical Memorandum TM–INS–021336 (May 1992).

*Primary Examiner*—Harry S. Hong
*Attorney, Agent, or Firm*—Greenblum & Bernstein P.L.C.

[57] ABSTRACT

The multiple location, communications network is provided as an overlay application to, for example, one or more private networks. The network adds increased flexibility to an existing private network system by adding additional features, e.g., abbreviated dialing plans, function number dialing, automatic selection of routing, centralized access to private and public network facilities, outgoing call screening, and work-at-home functionality, that may not be currently available to the private network subscriber. Further, the network overlay application of the present invention is adapted to maintain and not disturb the subscriber's current service or the existing private network.

66 Claims, 17 Drawing Sheets

Figure 8

| Call Type / Calling Scope | Code | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| On-Net, Intra-LATA, pvt fac | 110 | x | x | x | x | x | x | x | x | x | x | x | x | x | x | x | x | x | x | x | x |
| On-Net, Intra-LATA, pvt fac/PSTN | 210 |   | x |   | x | x | x | x | x | x | x | x | x | x | x | x | x | x | x | x | x |
| On-Net, Inter-LATA, pvt fac | 120 |   |   | x | x |   |   | x | x | x |   | x | x | x | x | x | x | x | x | x | x |
| On-Net, Inter-LATA, pvt fac/PSTN | 220 |   |   | x | x | x |   | x | x | x |   | x | x | x | x | x | x | x | x | x | x |
| Off-Net, Intra-LATA, pvt fac | 111 |   |   |   |   | x | x | x | x | x | x | x | x | x | x | x | x | x | x | x | x |
| Off-Net, Intra-LATA, pvt fac/PSTN | 211 |   |   |   |   |   | x |   | x | x |   |   | x | x | x |   |   |   | x | x | x |
| Off-Net, Inter-LATA, pvt fac | 121 |   |   |   |   |   |   | x |   | x |   |   |   | x |   |   |   | x | x | x | x |
| Off-Net, Inter-LATA, pvt fac/PSTN | 221 |   |   |   |   |   |   |   |   | x |   |   |   |   |   | x | x |   | x | x | x |
| Off-Net, International, pvt fac | 102 |   |   |   |   |   |   |   |   |   | x |   | x |   | x | x | x | x | x | x | x |
| Off-Net, International, pvt fac/PSTN | 202 |   |   |   |   |   |   |   |   |   |   | x |   |   |   |   |   |   |   | x | x |
| Offnet (NANP)+Intra-LATA+pvt with 900, 976, 555 dialed | 113 |   |   |   |   |   |   |   |   |   |   |   |   | x |   | x |   | x |   |   | x |
| Offnet (NANP)+Inter-LATA+pvt with 900, 976, 555 dialed | 123 |   |   |   |   |   |   |   |   |   |   |   |   |   |   |   |   |   |   |   |   |
| Offnet (NANP)+Intra-LATA+pvt/PSTN with 900, 976, 555 dialed | 213 |   |   |   |   |   |   |   |   |   |   |   |   |   |   |   |   |   |   |   |   |
| Offnet (NANP)+Inter-LATA+pvt/PSTN with 900, 976, 555 dialed | 223 |   |   |   |   |   |   |   |   |   |   |   |   |   |   |   |   |   |   |   |   |

| Call Type / Calling Scope | Code | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|
| On-Net, Intra-LATA, pvt fac | 110 | x | x | x | x | x | x | x | x | x | x | x | x | x | x | x |
| On-Net, Intra-LATA, pvt fac/PSTN | 210 |   | x | x | x | x | x | x | x | x | x | x | x | x | x | x |
| On-Net, Inter-LATA, pvt fac | 120 | x |   | x | x |   | x | x | x | x |   | x | x | x | x | x |
| On-Net, Inter-LATA, pvt fac/PSTN | 220 |   |   | x | x | x | x | x | x | x |   | x | x | x | x | x |
| Off-Net, Intra-LATA, pvt fac | 111 | x | x | x | x | x | x | x | x | x | x | x | x | x | x | x |
| Off-Net, Intra-LATA, pvt fac/PSTN | 211 |   | x | x | x |   | x |   | x | x |   |   | x | x | x | x |
| Off-Net, Inter-LATA, pvt fac | 121 |   |   | x |   | x |   | x |   | x | x |   |   | x | x | x |
| Off-Net, Inter-LATA, pvt fac/PSTN | 221 |   |   |   |   | x | x | x | x | x |   | x | x | x | x | x |
| Off-Net, International, pvt fac | 102 |   |   |   |   |   |   |   |   |   | x |   |   |   |   | x |
| Off-Net, International, pvt fac/PSTN | 202 |   |   |   |   |   |   |   | x | x |   |   |   |   |   |   |
| Offnet (NANP)+Intra-LATA+pvt with 900, 976, 555 dialed | 113 | x |   |   |   |   |   |   |   | x |   |   |   |   |   | x |
| Offnet (NANP)+Inter-LATA+pvt with 900, 976, 555 dialed | 123 |   |   |   | x |   |   |   |   |   |   |   |   |   |   |   |
| Offnet (NANP)+Intra-LATA+pvt/PSTN with 900, 976, 555 dialed | 213 |   |   |   |   |   |   |   |   |   |   |   |   |   |   |   |
| Offnet (NANP)+Inter-LATA+pvt/PSTN with 900, 976, 555 dialed | 223 |   |   |   |   |   |   |   |   |   |   |   |   |   |   |   |

Figure 8

METHOD AND APPARATUS FOR FACILITATING COMMUNICATION ACROSS MULTIPLE LOCATIONS

BACKGROUND OF THE INVENTION

Field of the Invention

The present invention generally relates to an apparatus and method for facilitating communication across multiple locations. More particularly, the present invention relates to an Advanced Intelligent Network (AIN) application for providing multiple location networking capabilities to subscribers using a predetermined dialing scheme, such as an abbreviated dialing scheme.

Acronyms

The written description provided herein contains acronyms which refer to various communication services and system components. Although known, use of several of these acronyms is not strictly standardized in the art. For purposes of the written description herein, acronyms will be defined as follows:

1FR—Single Flat Rate (Residential Customer)
1FB—Single Flat Rate (Business Customer)
AC—Alternate Carrier
ATG—Alternate Trunk Group
AIN—Advanced Intelligent Network
ASF—Automatic Selection of Facilities
CAF—Centralized Access to Facilities
CAF-DP—Centralized Access to Facilities-Dial Plan
CAF-TL—Centralized Access to Facilities-Tie Line
CCS—Common Channel Signaling
CDN—Called Number
CDP—Customized Dialing Plan
CGN—Calling Number
CENTREX—Central Exchange Service
CO—Central Office
CPR—Call Processing Record
DID—Direct Inward Dialing
DRS—Data and Reports System
DNT—Dialed Number Trigger
DOW—Day-of-Week
DOY—Day-of-Year
DP—Dialing Plan
EO—End Office
FD—Function Dialing
FGD—Feature Group D
ISCP—Integrated Service Control Point
IXC—Interexchange Carrier
LATA—Local Access and Transport Area
LCS—Local Calling Scope
MOC—Maintenance and Operations Console
NPA—Number Plan Area
NXX—Central Office Code
OCS—Outgoing Call Screening
PBX—Private Branch Exchange
PC—Primary Carrier
PIC—Primary Interexchange Carrier
POP—Point of Presence
PTG—Primary Trunk Group
PSTN—Public Switched Telephone Network
SAC—Second Alternate Carrier
SATG—Second Alternate Trunk Group
SCE—Service Creation Environment
SCP—Service Control Point
SMDR—Station Message Detail Recording
SMS—Service Management System
SS7—Signaling System 7
SSP—Service Switching Point
STP—Signaling Transfer Point
TAT—Termination Attempt Trigger
TCAP—Transaction Capabilities Applications Part
TCP/IP—Transmission Control Protocol/Internet Protocol
TOD—Time-of-Day
VTT—Virtual Termination Trigger
WAH—Work at Home
WAN—Wide Area Network

Background and Material Information

In recent years, a number of new telephone service features have been provided by an Advanced Intelligent Network (AIN). The AIN evolved out of a need to increase the capabilities of the telephone network architecture to meet the growing needs of telephone customers. The AIN architecture generally comprises two networks, a data messaging network and a trunked communications network. The trunked communications network handles voice and data communications between dispersed network locations, whereas the data messaging network is provided for controlling operations of the trunked communications network.

An illustration of the basic components of an AIN architecture is shown in FIG. 12. As shown in FIG. 12, Service Switching Points (SSPs) 64–70 are provided for sending and receiving data messages from a Service Control Point (SCP) 56 via Signaling Transfer Points (STPs) 58–62. The data messages are communicated to and from the SSPs 64–70 and the SCP 56 along a Common Channel Signaling (CCS) network 88. Each SSP 64–70 routes telephone calls between a calling station (e.g., station 72) and a called station (e.g., station 84) through the trunked communications network 90–92. For more information regarding AIN, see Berman, Roger K., and Brewster, John H., "Perspectives on the AIN Architecture," IEEE Communications Magazine, February 1992, pp. 27–32, the disclosure of which is expressly incorporated herein by reference in its entirety.

A number of features provided by the prior AIN or AIN-type intelligent networks relate to specialized call processing of incoming calls and call traffic.

For example, U.S. Pat. No. 4,191,860, to WEBER, provides for special processing of calls, such as INward WATS (Wide Area Telephone Service) calls, via a number of local switching offices based on information stored in a central database. The central database is located at a remote Service Control Point (SCP). The local and toll offices of the telephone network compile a call data message via a common channel interoffice signaling (CCIS) link to the central database. The database at the SCP translates the dialed INWATS number into an unlisted destination telephone number based on an originating area code. The unlisted destination number is then returned to the central offices via the CCIS link, and the call is completed. When the number of telephone calls to the unlisted number per unit time exceeds a threshold, the database instructs the telephone system to inhibit such calls from being connected for a predetermined period of time.

U.S. Pat. Nos. 4,611,094 and 4,611,096, both to ASMUTH et al., disclose a system for providing custom incoming telephone call processing services to a subscriber operating at geographically diverse locations. A subscriber program stored in a central database is accessed to provide instructions to the SSPs to complete incoming calls to one of the subscriber locations in accordance with special services defined by the subscriber. The subscriber program controls the Action Control Points (ACPs) to string together the desired call processing capabilities to process each call. Specified parameters stored in the program, such as time of day, caller location and data inputted by the caller, determine the final destination to which each call should be completed.

U.S. Pat. No. 4,788,718, to McNABB, teaches centralized recording of call traffic information. The system provides a data gathering and recording function to the centralized database which stores the subscriber's call routing program. The subscriber's call routing program performs several functions, including presenting various announcements to callers, prompting callers for inputting information digits and collecting the resulting information digits, routing the call to a number provided by the subscriber, and performing final call dispositions other than routing to the telephone number provided by the subscriber. Processing of the call traffic information dynamically changes the subscriber's call routing program to reduce the number of blocked calls to the subscriber's telephone numbers.

U.S. Pat. No. 4,757,267, to RISKIN, discloses routing of an "800-type" telephone call. The system identifies the caller's originating telephone number and initially routes the call to an office in the general vicinity of the caller. The office includes a vertical-horizontal (V-H) file listing dealers by product/service and equivalent latitude and longitude. The call is routed to the nearest dealer for the identified product or service based on a comparison of the called 800-number and the data in the V-H file. If the call cannot be completed to the nearest dealer, because the dealer's telephone is busy or the dealer does not answer, the call is routed to the next nearest dealer.

While prior AIN or AIN-type intelligent network applications have provided various call screening and processing features to subscribers and users, such past attempts have not extended the advantages of AIN functionality to private networks. In particular, prior attempts have not provided an overlay to supplement and enhance services to subscribers or users of an existing private network (e.g., networks comprising one or more PBX and/or Centrex systems) to facilitate multiple location communication and provide increased flexibility to private network users. For example, for private networks having geographically dispersed locations and served by different switches, past attempts have not permitted private network subscribers to complete calls as if being served by the same switch. This type of capability would enable subscribers to place local area and long distance calls to other locations using a simplified and abbreviated dialing scheme. Past attempts have also failed to enable subscribers to add or append remote or isolated locations (e.g., a satellite office location or a home location) to the existing private network and provide full service integration to such locations. Prior systems also do not provide a wide variety of existing options to private network subscribers, such as the ability to allow subscribers to access a private trunk group and make an outgoing call from a location not within the private network.

Other features, such as the control of access to and from a private network system through, for example, AIN authority validation, has not been provided by prior attempts. Further, past attempts fail to monitor long distance calling traffic originating on-network to determine whether the authority to originate the call is unrestricted, restricted, or unauthorized.

Such features would be highly desirable to subscribers and users of private communication networks, such as large multi-location/multi-switch corporate subscribers and government agencies, that desire ease of inter- and intra-location calling, especially from for example existing CENTREX, Private Branch Exchange (PBX), key systems, and Work at Home (WAH) sites.

OBJECTS OF THE PRESENT INVENTION

In view of the above, the present invention, through one or more of its various aspects and/or embodiments is thus presented to accomplish one or more objects and advantages, such as those noted below.

A general objective of the present invention is to provide a flexible, multiple location subscriber telecommunications network for use in an Advance Intelligent Network (AIN).

Another objective of the present invention is to provide Advanced Intelligent Network (AIN) functionality to a multiple switch network telephone system.

A further objective of the present invention is to provide Advanced Intelligent Network (AIN) functionality to a selected abbreviated dialing plan.

A further objective of the present invention is to provide Advanced Intelligent Network (AIN) functionality to a multiple location private network that includes access codes to be entered by network users to access optional features of the private network.

A further objective of the present invention is to provide Advanced Intelligent Network (AIN) functionality to a multiple location private network that includes an optional feature for relating terminating numbers to the function or service performed by the terminating party.

A further objective of the present invention is to provide Advanced Intelligent Network (AIN) functionality to a multiple location private network that includes an optional feature for automatically selecting a predefined routing scheme for on-network terminating calls.

A further objective of the present invention is to provide Advanced Intelligent Network (AIN) functionality to a multiple location private network that includes an optional feature for automatically selecting a predefined routing scheme for off-network terminating calls.

A further objective of the present invention is to provide Advanced Intelligent Network (AIN) functionality to a multiple location private network that includes an optional feature for a caller to choose a private trunk group directly accessible from the caller's local switch.

A further objective of the present invention is to provide Advanced Intelligent Network (AIN) functionality to a multiple location private network that includes an optional feature for a caller to access and utilize the functionality of a remote network switch.

A further objective of the present invention is to provide Advanced Intelligent Network (AIN) functionality to a multiple location private network that includes an optional feature for screening calls according to the originating location.

A further objective of the present invention is to provide Advanced Intelligent Network (AIN) functionality to a multiple location private network that includes an optional feature for screening calls according to the authority of the calling party.

A further objective of the present invention is to provide Advanced Intelligent Network (AIN) functionality to a multiple location private network that includes an optional feature for a user to access and utilize the private network from home.

A further objective of the present invention is to provide Advanced Intelligent Network (AIN) functionality to a multiple location private network that includes an optional feature for a user to receive business calls directed to the work telephone on his home telephone.

A further objective of the present invention is to provide Advanced Intelligent Network (AIN) functionality to a multiple location private network that includes a combination of the above options.

SUMMARY OF THE PRESENT INVENTION

Accordingly, one aspect of the present invention is to provide a multiple location communications network associated with a private network in an advanced intelligent communications system. The advanced intelligent communications system may include a service control point, a two-way communications network interconnecting a plurality of network service switching points and a plurality of non-network service switching points, and selectively establishing communication between at least two of a plurality of geographically dispersed locations coupled to the network and non-network service switching points. The at least two locations may include an originating station and a terminating station. The multiple location communication network may include a device for receiving, at one of the plurality of network service switching points, a call request from the originating station to establish a communication connection with the terminating station. The call request may include at least one dialed digit, and the one network service switching point may include a device for identifying a service control point request based upon the at least one dialed digit. The network also includes a device for accessing the service control point in response to the service control point request identified by the identifying device, the accessing device may include a device for forwarding a query message from the one network service switching point to the service control point, the query message may include the at least one dialed digit. The network may also include a device for identifying, at the service control point, the terminating station based on the query message and the at least one dialed digit, a device for forwarding from the service control point to the one network service switching point a query response, the query response may include routing information that may include a routing path between the originating station and the terminating station, and a device for establishing the communication connection between the originating station and the terminating station based on the query response and the at least one dialed digit.

According to another feature of the present invention, when the originating station is a non-network location, the call request includes a designated number to append the non-network location to the private network, the designated number being entered prior to entry of the at least one dialed digit. The service control point may include a device for verifying that the one non-network location is authorized to be appended to the private network such that when the verifying device determines that the one non-network location is authorized to be appended to the network, the one non-network location becomes an appended location of the private network. The verifying device may include a look up table including home telephone numbers of authorized users and work telephone numbers of the authorized users. When a calling phone number associated with said originating station is found in said look up table, said authorization is verified.

According to another feature of the present invention, the network may include a device for accepting the at least one dialed digit entered from one of the home telephone numbers listed in the look up table and a device for blocking the at least one dialed digit entered from one of the work telephone numbers listed in the look up table.

According to another feature of the invention, the network may include a device for enabling call forwarding to a home telephone number of the authorized user, a device for collecting an enable request from the authorized user entered from a station associated with the authorized user's home telephone number, and a device for blocking said enable request from said authorized user entered from a station associated with said authorized user's work telephone number. The network may also include a device for disabling call forwarding to a home telephone number of said authorized user and a device for collecting a disable request from said authorized user entered from a station associated with one of said authorized user's work telephone number and said authorized user's home telephone number.

According to another aspect of the present invention, the service control point further comprising a device for selectively forwarding a call offered to a work telephone number of one of the authorized users to a home telephone number associated with the work telephone number in the look up table.

According to another aspect of the present invention, when the originating station is an originating network location, the originating station may be adapted to directly access specific network features associated with a central access service switching point. The call request may include an access number associated with the central access service switching point to connect the originating network location to the central access service switching point. Further, the service control point may include a device for determining whether the central access service switching point is a local network service switching point or a non-local network service switching point with respect to the originating station.

According to still another feature of the present invention, when the central access service switching point comprises a non-local network service switching point, the service control point may include a device for translating the access number into a terminating number associated with the non-local network service switching point and means for instructing a local network service switching point to forward the call request to the non-local network service switching point.

According to another feature of the present invention, the service control point further include a device for instructing the non-local network service switching point to play a second dial tone to the originating station.

According to yet another feature of the present invention, when the central access service switching point includes a local network service switching point, the service control point further may include a device for blocking call processing.

According to a further feature of the present invention, when the originating station is an originating network location, the originating station may be adapted to directly access private facilities directly coupled to a central access point including one of a local network service switching point and a non-local network service switching point. The call request may include an access number associated with the central access point to connect the originating network location to the central access point.

According to another feature of the present invention, the service control means may include a device for translating the access number into a terminating number associated with the central access service switching point. The service control point further may include a device for determining whether the central access service switching point is a local network service switching point or a non-local network service switching point with respect to the originating station. When the central access service switching point includes a local network service switching point, the service control point may include a device for instructing the central access service switching point to play a second dial tone.

According to still another aspect of the present invention, when the central access service switching point includes a non-local network service switching point, the service control point may include a device for translating the access number into a terminating number associated with the central access service switching point and a device for forwarding the call request to the central access service switching point. The service control point further may include a device for instructing the central access service switching point to play a second dial tone to the originating station.

According to another feature of the present invention, when the terminating station location includes a terminating network location, the device for selectively establishing a routing path comprises a device for determining the originating station location, a device for determining the termination station location, and a device for ascertaining a desired routing scheme for establishing the service connection. The device for determining the termination station location may include a device for translating the at least one dialed digit into the terminating number, and the device for determining the originating station location may include a device for translating a calling telephone number into the originating station location. Further, the device for ascertaining a desired routing scheme for establishing the service connection may include a look up table including each network location listed as a terminating station location and as an originating station location, and the device for ascertaining may include a device for correlating the originating station location with the terminating station location in the look up table and a device for selecting a predefined routing scheme from a subscriber prioritized facility arrangement list.

According to another feature of the present invention, the originating station entering an access number to indicate that the terminating station location may include a terminating non-network location. The service control point may include a device for instructing the one service switching point to play a second dial tone to the originating station, to which the originating station may enter a terminating number in response. The device for selectively establishing a routing path may include a device for determining the originating station location, a device for determining the termination station location, and a device for ascertaining a desired routing scheme for establishing the service connection. The device for ascertaining a desired routing scheme for establishing the service connection may include a look up table including a listing of each originating network location, a listing of terminating locations. The listing of terminating locations may be arranged as a listing of selected NPA-NXXs, a listing of selected NPAs, and a default listing. The service control point further may include a device for determining the termination station location including means for translating the at least one dialed digit into a terminating station NPA-NXX, and the device for determining the originating station location may include a device for translating a calling telephone number into the originating station location. The device for ascertaining may include a device for correlating the originating station location with the terminating station NPA-NXX in the look up table and a device for selecting a predefined routing scheme from a subscriber prioritized facility arrangement list. When the terminating station NPA-NXX is not listed, the device for ascertaining comprising a device correlating the originating station location with the terminating station NPA in the look up table and a device for selecting the predefined routing scheme from the subscriber prioritized facility arrangement list. When the terminating station NPA is not listed, the device for ascertaining may include a device for correlating the originating station location with the terminating station default listing in the look up table and a device for selecting the predefined routing scheme from the subscriber prioritized facility arrangement list.

According to another feature of the present invention, the listing of terminating locations may be arranged as a listing of intra-LATA, a listing of inter-LATA, and international. The service control point further may include a device for determining the termination station location including a device for translating the at least one dialed digit into an indication of a termination type including one of international, inter-LATA, and intra-LATA, and the device for determining the originating station location may include a device for translating a calling telephone number into the originating station location. The device for ascertaining may include a device for correlating the originating station location with the termination type in the look up table and a device for selecting a predefined routing scheme from a subscriber prioritized facility arrangement list.

According to a further feature of the present invention, the at least one dialed digit may include an abbreviated dialing plan number. The abbreviated dialing plan number may include at least a first digit as a location code indicative of a location of the terminating station and at least one additional digit as a line identifier indicative of the terminating station. The line identifier may include at least a portion of the terminating station's associated North American Numbering Plan number, the location code may include at least a portion of the terminating station's associated North American Numbering Plan number, the location code may include a unique indicator for each of the plurality of network service switching points, or the location code may include a unique indicator for each subscriber location within the private network, wherein each subscriber location includes a plurality of associated subscriber stations. The device for identifying the terminating station may include a device for translating the abbreviated dialing plan number into a North American Numbering Plan number.

According to yet another feature of the present invention, the abbreviated dialing plan number may include a unique indicator for each of the plurality of network stations. The device for identifying the terminating station may include a device for translating the abbreviated dialing plan number into a North American Numbering Plan number.

According to still another feature of the present invention, the at least one dialed digit may include an access number to enable function dialing. The function dialing may include a function dialing number in which alphabetic representations of dialed numbers are dialed at the originating station to form a word associated with a functional aspect of a terminating station party. The word may include an appended location code and the service control point further including a device for discerning the word from the location code to instruct the one service control point to terminate the function dialing number to the terminating station party at the appended location.

According to another feature of the present invention, the network may include a device for selectively routing the function dialing number to the terminating party according to predefined routing schemes. The device for selectively routing may include a device for determining whether a routing scheme is defined between the originating station and the terminating station. The determining device may include a device for accessing a first look up table for on network routing schemes, and, if no routing schemes are found for a pair of the originating station and terminating station, the determining device further may include a device for accessing a second look up table for off network routing schemes. The network may include a device for routing the call request according to the determining device.

According to another feature of the present invention, an outgoing call screening feature may be provided, the outgoing call screening feature actuated after the service control point identifies the terminating station and before forwarding the query response. The outgoing call screening feature may include a device for determining a call type and a device for ascertaining whether the determined call type is within a privilege class associated with the originating station. The call type may include a member of the group including on-network intra-LATA private facilities; on-network intra-LATA private/public facilities; on-network inter-LATA private facilities; on-network inter-LATA private/public facilities; off-network intra-LATA private facilities; off-network intra-LATA private/public facilities; off-network inter-LATA private facilities; off-network inter-LATA private/public facilities; off-network international private facilities; off-network international private/public facilities; off-network (NANP) intra-LATA private facilities with 900-, 976-, and 555 service blocking; off-network (NANP) inter-LATA private facilities with 900-, 976-, and 555 service blocking; off-network (NANP) intra-LATA private/public facilities with 900-, 976-, and 555 service blocking; and off-network (NANP) inter-LATA private/public facilities with 900-, 976-, and 555 service blocking. The privilege class, assigned to a network station, may include a listing of each the call type that a station may offer for termination.

According to a further aspect of the invention, when the determined call type is not within the privilege class associated with the origination station, the service control means further comprising blocking means for blocking the call from termination. Alternatively, when the determined call type is not within the privilege class associated with the origination station, the service control point further may include a device for receiving an authorization code associated with the originating party and a device for validating the authorization code to determine whether the determined call type is within the privilege class of the entered authorization codes.

Another aspect of the present invention is to provide a method for call processing in a multiple location communications network associated with a private network in an advanced intelligent communications system. The advanced intelligent communications system may include a service control point, a two-way communications network interconnecting a plurality of network service switching points and a plurality of non-network service switching points, and selectively establishing communication between at least two of a plurality of geographically dispersed locations coupled to the network and non-network service switching points. The at least two locations may include an originating station and a terminating station. The method may include receiving, at one of the plurality of network service switching points, a call request from the originating station to establish a communication connection with the terminating station. The call request may include at least one dialed digit, the one network service switching point may include a device for identifying a service control point request based upon the at least one dialed digit. The method may also include accessing the service control point in response to the service control point request identified by the identifying device, the accessing step may include forwarding a query message from the one network service switching point to the service control point, the query message may include the at least one dialed digit. The method may also include identifying, at the service control point, the terminating station based on the query message and the at least one dialed digit, forwarding from the service control point to the one network service switching point, a query response may include routing information may include a routing path between the originating station and the terminating station, and establishing the communication connection between the originating station and the terminating station based on the query response and the at least one dialed digit.

According to another feature of the present invention, when the originating station is a non-network location, the call request may include a designated number to append the non-network location to the private network, the designated number being entered prior to entry of the at least one dialed digit. The method may include verifying that the one non-network location is authorized to be appended to the private network such that when the verifying step determines that the one non-network location is authorized to be appended to the network, the one non-network location becomes an appended location of the private network. The verifying step may include a look up table including home telephone numbers of authorized users and work telephone numbers of the authorized users, thus, when a calling phone number associated with the originating station is found in the look up table, the authorization is verified. The method further may include selectively forwarding a call offered to a work telephone number of one of the authorized users to a home telephone number associated with the work telephone number in the look up table.

According to a further feature of the present invention, the method may include accepting the at least one dialed digit entered from one of the home telephone numbers listed in the look up table and blocking the at least one dialed digit entered from one of the work telephone numbers listed in the look up table.

According to yet another feature of the present invention, the method may include enabling call forwarding to a home telephone number of the authorized user, collecting an enable request from the authorized user entered from a station associated with the authorized user's home telephone number, and blocking the enable request from the authorized user entered from a station associated with the authorized user's work telephone number. However, the method may also include disabling call forwarding to a home telephone number of the authorized user and collecting a disable request from the authorized user entered from a station associated with one of the authorized user's work telephone number and the authorized user's home telephone number.

According to another feature of the present invention, when the originating station is an originating network location, the method may include adapting the originating station to directly access specific network features associated with a central access service switching point. The call request may include an access number associated with the central access service switching point to connect the originating network location to the central access service switching point. The method further may include determining whether the central access service switching point is a local network service switching point or a non-local network service switching point with respect to the originating station. When the central access service switching point includes a non-local network service switching point, the method may include translating the access number into a terminating number associated with the non-local network service switching point and instructing a local network service switching point to forward the call request to the non-local network service switching point. The method further may include instructing the non-local network service switching point to play a second dial tone to the originating station.

According to another feature of the present invention, when the central access service switching point includes a local network service switching point, the method further may include blocking call processing.

According to a further feature of the present invention, when the originating station is an originating network location, the method may include adapting the originating station to directly access private facilities directly coupled to a central access point including one of a local network service switching point and a non-local network service switching point. The call request may include an access number associated with the central access point to connect the originating network location to the central access point.

According to a still further feature of the present invention, the method may include translating the access number into a terminating number associated with the central access service switching point. The method further may include determining whether the central access service switching point is a local network service switching point or a non-local network service switching point with respect to the originating station. When the central access service switching point comprises a local network service switching point, the method may include instructing the central access service switching point to play a second dial tone.

According to another feature of the present invention, when the central access service switching point includes a non-local network service switching point, the method may include translating the access number into a terminating number associated with the central access service switching point and forwarding the call request to the central access service switching point. The method further may include instructing the central access service switching point to play a second dial tone to the originating station.

According to another feature of the present invention, when the terminating station location includes a terminating network location, the step for selectively establishing a routing path may include determining the originating station location, determining the termination station location, and ascertaining a desired routing scheme for establishing the service connection. The step for determining the termination station location may include translating the at least one dialed digit into the terminating number, and the step for determining the originating station location may include translating a calling telephone number into the originating station location. The step for ascertaining a desired routing scheme for establishing the service connection may include a look up table including each network location listed as a terminating station location and as an originating station location, and the step for ascertaining may include correlating the originating station location with the terminating station location in the look up table and selecting a predefined routing scheme from a subscriber prioritized facility arrangement list.

According to a further aspect of the present invention, the originating station may enter an access number to indicate that the terminating station location includes a terminating non-network location. The method may include instructing the one service switching point to play a second dial tone to the originating station, to which the originating station may enter a terminating number in response. The step for selectively establishing a routing path may include determining the originating station location, determining the termination station location, and ascertaining a desired routing scheme for establishing the service connection. The step for ascertaining a desired routing scheme for establishing the service connection may include a look up table including a listing of each originating network location and a listing of terminating locations. The method may also include arranging the listing of terminating locations as a listing of selected NPA-NXXs, a listing of selected NPAs, and a default listing. The method further may include determining the termination station location which may include translating the at least one dialed digit into a terminating station NPA-NXX, and the step for determining the originating station location may include translating a calling telephone number into the originating station location. The step for ascertaining may include correlating the originating station location with the terminating station NPA-NXX in the look up table and selecting a predefined routing scheme from a subscriber prioritized facility arrangement list. When the terminating station NPA-NXX is not listed, the step for ascertaining may include correlating the originating station location with the terminating station NPA in the look up table and selecting the predefined routing scheme from the subscriber prioritized facility arrangement list. When the terminating station NPA is not listed, the step for ascertaining may include correlating the originating station location with the terminating station default listing in the look up table and selecting the predefined routing scheme from the subscriber prioritized facility arrangement list.

According to yet another feature of the present invention, the method may include arranging the listing of terminating locations as a listing of intra-LATA, a listing of inter-LATA, and international. The method further may include determining the termination station location including translating the at least one dialed digit into an indication of a termination type including one of international, inter-LATA, and intra-LATA. The step for determining the originating station location may include translating a calling telephone number into the originating station location. The step for ascertaining may include correlating the originating station location with the termination type in the look up table and selecting a predefined routing scheme from a subscriber prioritized facility arrangement list.

According to another aspect of the present invention, the at least one dialed digit may include an abbreviated dialing plan number. The abbreviated dialing plan number may include at least a first digit as a location code indicative of a location of the terminating station and at least one additional digit as a line identifier indicative of the terminating station. The line identifier may include at least a portion of the terminating station's associated North American Numbering Plan number, the location code may include at least a portion of the terminating station's associated North American Numbering Plan number, the location code may include a unique indicator for each of the plurality of network service switching points, or the location code may include a unique indicator for each subscriber location within the private network, wherein each subscriber location includes a plurality of associated subscriber stations.

According to a still further feature of the present invention, the step for identifying the terminating station may include translating the abbreviated dialing plan number into a North American Numbering Plan number.

According to another feature of the present invention the abbreviated dialing plan number may include a unique indicator for each of the plurality of network stations. The step for identifying the terminating station may include translating the abbreviated dialing plan number into a North American Numbering Plan number.

According to a further feature of the present invention, the at least one dialed digit may include an access number to enable function dialing. The function dialing may include entering a function dialing number in which alphabetic representations of dialed numbers at the originating station to form a word associated with a functional aspect of a terminating station party. By appending a location code to the word, the method further may include discerning the word from the location code instructing the one service control point to terminate the function dialing number to the terminating station party at the appended location.

According to a further aspect of the present invention, the method may include selectively routing the function dialing number to the terminating party according to predefined routing schemes. The step for selectively routing may include determining whether a routing scheme is defined between the originating station and the terminating station. The determining step may include accessing a first look up table for on network routing schemes, and, if no routing schemes are found for a pair of said originating station and terminating station, the determining step further comprising accessing a second look up table for off network routing schemes. The method may also include routing the call request according to the determining step.

According to yet another feature of the present invention, an outgoing call screening method may be provided. The method may include actuating the outgoing call screening feature after the identifying step and before the forwarding step. The outgoing call screening method may include determining a call type and ascertaining whether the determined call type is within a privilege class associated with the originating station. The call type may include a member of the group consisting of on-network intra-LATA private facilities; on-network intra-LATA private/public facilities; on-network inter-LATA private facilities; on-network inter-LATA private/public facilities; off-network intra-LATA private facilities; off-network intra-LATA private/public facilities; off-network inter-LATA private facilities; off-network inter-LATA private/public facilities; off-network international private facilities; off-network international private/public facilities; off-network (NANP) intra-LATA private facilities with 900-, 976-, and 555 service blocking; off-network (NANP) inter-LATA private facilities with 900-, 976-, and 555 service blocking; off-network (NANP) intra-LATA private/public facilities with 900-, 976-, and 555 service blocking; and off-network (NANP) inter-LATA private/public facilities with 900-, 976-, and 555 service blocking. The method may include assigning the privilege class to a network station, the privilege class listing each the call type that a station may offer for termination.

According to an aspect of the present invention, when the determined call type is not within the privilege class associated with the origination station, the method further comprising blocking the call from termination. Alternatively, when the determined call type is not within the privilege class associated with the origination station, the method further may include receiving an authorization code associated with the originating party, and validating the authorization code to determine whether the determined call type is within the privilege class of the entered authorization codes.

The above-listed and other objects, features and advantages of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like references numerals represent similar parts throughout the several views of the drawings, and wherein:

FIG. 8 illustrates an exemplary privilege class table for determining the call types for which a particular station is authorized;

DETAILED DESCRIPTION OF THE PREFERRED EMBODIMENTS

Many telephone services may be provided using an AIN or AIN-type network for centralized control of telephone services offered to subscribers, as opposed to localized control of services at the Central Office (CO) or End Office (EO). The AIN system is provided through interaction between switching points and other systems supporting AIN logic.

Figure 1:
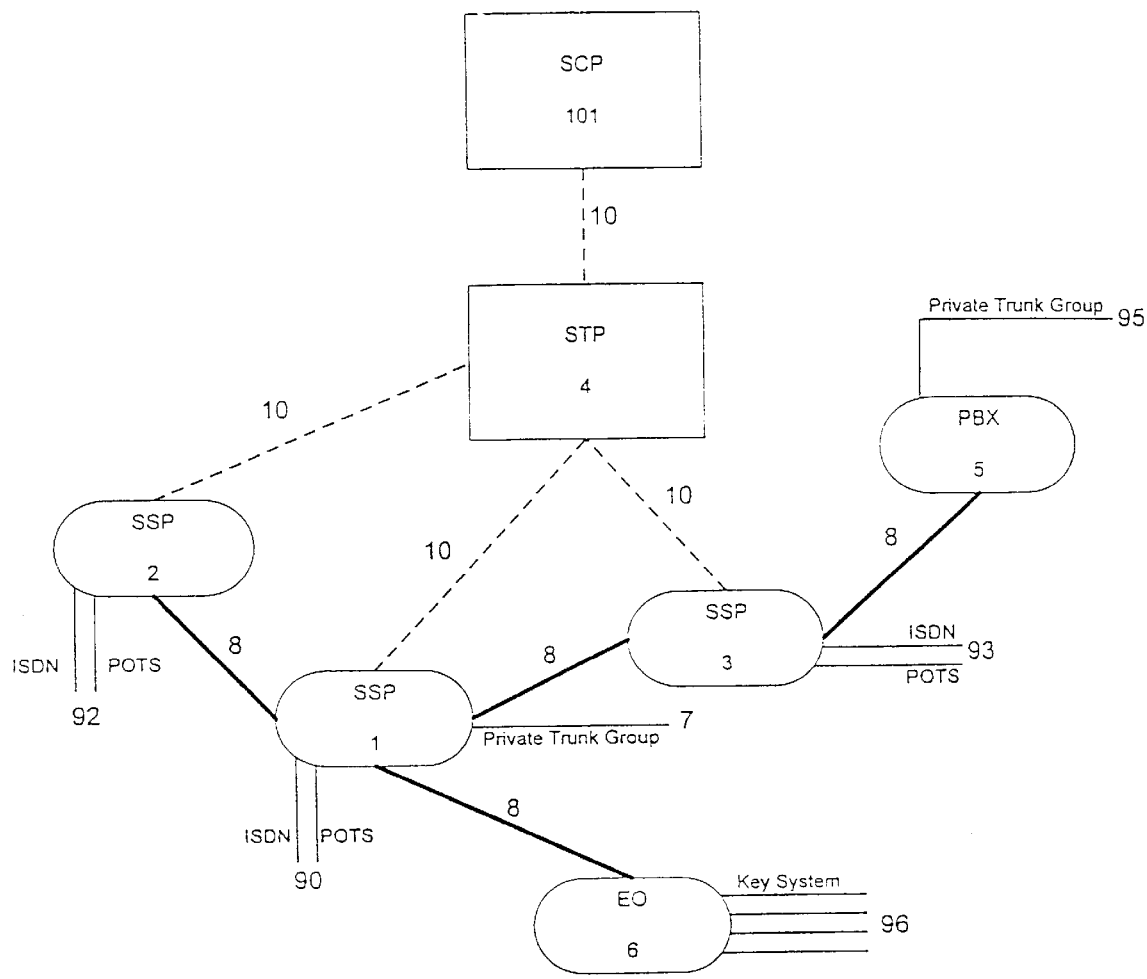
FIG. 1 illustrates, in a general block diagram form, a simplified representation of an aspect of the present invention.

According to an aspect of the present invention, an apparatus and method for facilitating communication across multiple locations may be implemented using an AIN or AIN-type network with at least AIN Release 0.0 or AIN Release 0.1 protocols and advanced intelligent network capabilities which are provided by a telephone company. For example, as shown in FIG. 1, the invention may be implemented with an AIN network provided with a programmable service control point (SCP) 101 and central offices or end offices 1, 2, and 3 equipped with AIN service switching point (SSP) features. For example, each of the SSPs 1, 2, and 3 may include different types of switches. That is, a 5ESS type switch may be included in SSP 1, a 1AESS type switch may be included in SSP 2, and a DMS-100 type switch may be included in SSP 3. Integrated Services Digital Network (ISDN) lines and plain old telephone system (POTS) lines 90, 92, and 93 may be coupled to SSPs 1, 2, and 3, respectively. Each of the SSPs may be interconnected via trunk lines 8. The trunk lines 8 may be public or private. In the basic dialing plans (discussed below), the default is public trunk lines, however, certain options available to the subscriber enable additionally accessing private trunk lines. The network may also include a private branch exchange (PBX) 5 for coupling a private trunk group 95 to network SSP 3. The network may also include an end office (EO) 6 for coupling a key system 96 to network SSP 1. Further, private trunk groups 7 may be directly coupled to SSP 1. The SSPs 1, 2, and 3 may also be interconnected via an existing Common Channel Signaling (CCS) network 10 to a service transfer point (STP) 4, and STP 4, in turn, coupled to SCP 101 via the CCS network. The CCS replaced the CCIS discussed above in the prior art.

The multiple location telecommunications network according to an aspect of the present invention may be an overlay application. That is, the presently disclosed network may add increased flexibility to an existing private network system by adding additional features, e.g., abbreviated dialing plans, function number dialing, automatic selection of routing, centralized access to private and public network facilities, outgoing call screening, and work-at-home functionality, that may not be currently available to the subscriber. This overlay application may be implemented so that it does not disturb the subscriber's current service or the existing private network.

Figure 2:
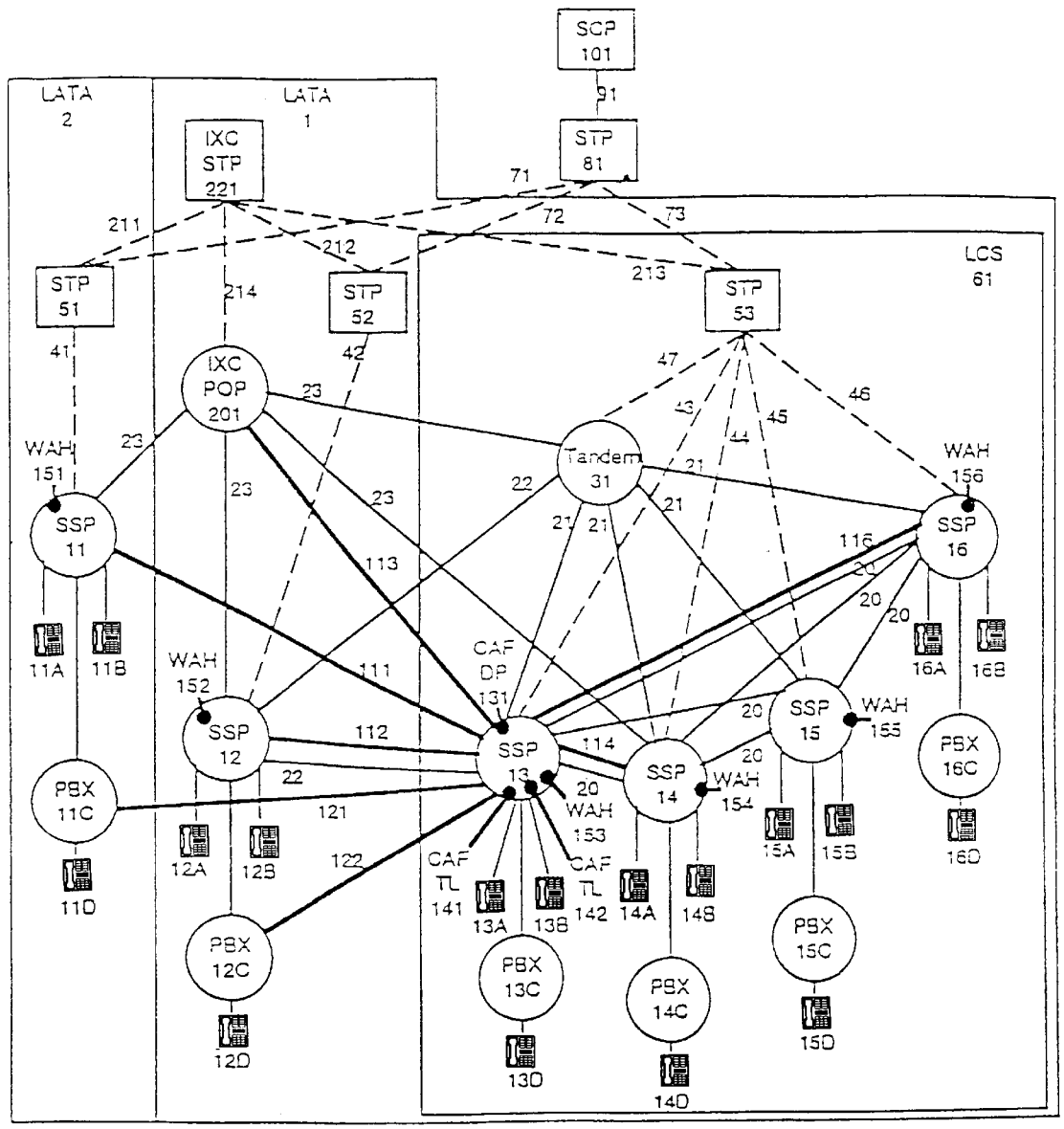
FIG. 2 illustrates, in a general block diagram form, an Advanced Intelligent Network (AIN) system for implementing the intelligent network screening features, in accordance with an embodiment of the present invention.

Referring now to the accompanying drawings, FIG. 2 illustrates an exemplary general block diagram of an Advanced Intelligent Network (AIN) in which an apparatus and method for facilitating multiple location, communications is embodied, in accordance with an aspect of the present invention. The network arrangement of FIG. 2 is provided for purposes of illustration and not limitation, and other particular network arrangements may of course be used to implement the various features of the invention, as further described below.

In the embodiment of FIG. 2, a network spanning two local access transport areas LATA 1 and LATA 2 is shown. Within LATA 1 is a local calling scope (LCS) 61 that indicates the local toll-free calling service area. The LCS 61 includes stations, e.g., stations 13A, 13B, 13D, 14A, 14B, 14D, 15A, 15B, 15D, 16A, 16B, and 16D, and corresponding switches, e.g., service switching points (SSP) or end offices (EO) 13, 14, 15, and 16, and PBX switches 13C, 14C, 15C, and 16C interconnecting the individual stations. Also in LATA 1, but outside of LCS 61, are stations 12A, 12B, and 12D, SSP (or EO) 12, and PBX 12C. Within LATA 2 are stations 11A, 11B, and 11D, SSP 11, and PBX 11C. The multiple location private network comprises stations 11A, 12A, 13A, 14A, 15A, and 16A, and PBXs 11C (with station 11D connected), 12C (with station 12D connected), 13C (with station 13D connected), 14C (with station 14D connected), 15C (with station 15D connected, and 16C (with station 16D connected), each station including a specific work telephone number (work TN). Stations 11B, 12B, 13B, 14B, 15B, and 16B are not locations on the private network, rather home locations within the public switched telephone network (PSTN). Each of the home locations include a specific home telephone number (home TN).

According to the present invention, a subscriber, such as corporation or small business with multiple locations connected to one or more switches may convert their current private network system to the multiple location, communication network of the present invention, described hereinbelow. That is, the multiple location communication network is an overlay to an existing private network and permits subscribers to decide how many and which stations are to be equipped within the network. In the example shown in FIG. 2, each switch may include different types of facilities and/or triggers, and all switches are essentially equal, i.e., there is no switch hierarchy. However, it should also be noted that the oldest switch or largest location may have significantly more service triggers, thus acting as a service gateway. For example, assume that SSP 13 is the oldest and largest location within the multiple location private network shown in FIG. 2, and is set up as a gateway for traffic leaving LCS 61. Accordingly, the other switches within the subscriber's multiple location, communication network, i.e., SSPs 11, 12, 14, 15, and 16, may interconnect with SSP 13.

However, it is only necessary that all switches in the private network be interconnected. In the basic dialing plan (discussed below), the service default is to terminate calls over public trunk lines. As shown in FIG. 2, either a direct route or a tandem/IXC public route exists between all private network switches. In LCS 61, direct trunks 20 exist between SSP 13, SSP 14, SSP 15, and SSP 16. Assuming LCS 61 to be a large service area, direct trunks may not be available between each switch, either actually or due to excessive traffic. For example, SSP 13 may alternatively use trunk 21 to tandem switch 31 and may use trunk 21 to SSP 16 to terminate an offered call. This alternative path is an overflow route for traffic that cannot find room on trunk 20 between SSP 13 and SSP 16. As can be seen in FIG. 2, a public route always exists between the switches that comprise the private network, whether that route is direct or via over flow path.

FIG. 2 also includes private trunks for interconnecting locations. These trunks may be accessible to subscribers of certain services. Further, the private trunks may enable subscribers to reduce calling costs normally associated with public toll routes.

Each office equipped as an AIN SSP may allow normal switch processing to be suspended at specific points in a call so that the switch may send an AIN message query to SCP 101. Service control point 101 may execute software based service logic and return call processing instructions to the triggering AIN SSP. New services may be provisioned by assigning AIN SSP triggers to customer lines, trunks, and/or NANP telephone numbers. The SSPs may include, but are not limited to, 5ESS, 1AESS, and DMS-100 switches. The 5ESS switches may utilize AIN Release 0.1 protocol and should be equipped with Generic 5E9.1 (or higher) software and associated AIN SSP features in order to serve subscribers. The 1AESS switches may use AIN Release 0.0 protocol and should be equipped with Generic 1AE12.03 (or higher) software and associated AIN SSP features in order to serve subscribers. The DMS switches may utilize AIN Release 0.1 protocol and should be equipped with Generic BCS-36 (or higher) software and associated AIN SSP features. Specifications of AIN Release 0.1 SSPs may be found in Bellcore documents TR-NWT-001284, "Advanced Intelligent Network Release 0.1 Switching System Generic Requirements", Issue 1 (August 1993) and TR-NWT-001285, "Advanced Intelligent Network 0.1 Switch-Service Control Point Application Protocol Interface Generic Requirements", Issue 1 (August 1992) from Bell Communications Research, Inc., of Livingston, N.J., the disclosures of each document is incorporated by reference herein in its entirety.

FIG. 2 shows an example of a portion of a PSTN that includes the subscriber's private telephone network configured as a multiple location, communications network. Each of the individual private network stations, i.e., 11A, 11D, 12A, 12D, 13A, 13D, 14A, 14D, 15A, 15D, 16A, and 16D, include an associated work TN and each is shown connected to respective SSPS, e.g., SSPs 11–16. Each of the individual home stations, i.e., 11B, 12B, 13B, 14B, 15B, and 16B, include an associated home TN and is shown connected to respective SSPs, e.g., SSPs 11–16. Each individual station 11A–16D may include terminal equipment, such as a telephone, and may be either directly connected to its respective switch by a local telephone line or connected via a private branch exchange (PBX) 11C–16C. As shown in FIG. 2, each PBX has normal, public connection to its associated SSP. FIG. 2 also shows each of PBX 11C and PBX 12C coupled to SSP 13 by a centralized access to facilities (CAF) trunk, e.g., a private tie line trunk 121 and 122, respectively. This permits LCS 61 traffic to be concentrated to PBX 11C and 12C via SSP 13. For example, PBX 11C may use trunk 121 to enter LCS 61 at SSP 13, and SSP 13 may then tandem traffic to any multiple location switch within LCS 61. Conversely, any traffic from within LCS 61 may be directed to SSP 13 and terminated to one of SSP 11 or SSP 12 over trunk 121 or trunk 122. Each SSP 11–16 may include AIN functionality and work at home (WAH) trigger capability 151–156.

The SSPs 11–16 may be interconnected by various trunking options. For example, SSPs 11, 12, 14, and 16 may be coupled to SSP 13 by automatic selection of facilities (ASF) trunks, e.g., private trunks 111, 112, 114, and 116, respectively. In accordance with an aspect of the invention, an ASF feature may be provided to selectively access private trunks for inter-LATA calls that are associated with the private network. Because SSPs 13, 14, 15, and 16 are within LCS 61, SSPs 14, 15, and 16 may be coupled to SSP 13 by trunks connecting local SSPs, i.e., toll-free calling trunks 20. Also, SSPs 14, 15, and 16 are interconnected via local SSP connecting trunks 20. Because SSP 12 is located within LATA 1, but outside of LCS 61, SSP 12 may be connected to SSPs within LCS, e.g., SSP 13, by a trunk connecting SSPs (or tandem switches) to other SSPs inside LATA 1 for toll calls, e.g., trunk 22.

The ASF trunks 111, 112, 114, 116 are not provided for terminating local traffic. Instead, local traffic is terminated via the local trunks 20. The ASF trunks may be utilized for toll calls, e.g., from within LCS 61 to LATA 1. Assume that a caller at station 16A is calling station 12A. The offered call would be directed from SSP 16 to SSP 13 over ASF trunk 116. At SSP 13, normal switch translations would be used to tandem the traffic onto ASF trunk 112. It is noted that if the call had originated at station 13A, then station 13A would have used ASF to access ASF trunk 112. Assuming that a caller at station 12A is calling station 16A, the call would be directed from SSP 12 to SSP 13 over ASF trunk 112 for tandeming to ASF trunk 116. Thus, utilizing ASF trunks 111, 112, 114, and 116 minimizes toll charges while also minimizing private trunk costs.

Note that an ASF trunk has not been shown interconnecting SSP 15 to another private network switch. An ASF trunk may not be necessary if the private trunk costs are more than the toll costs, for example, if station 15A and PBX 15C have a low community of interest with inter-LATA stations associated with SSPs 11 and 12.

Within LATA 1 is a tandem switch 31 that is connected to each of the SSPs 12–16. Tandem switch 31 is coupled to each of the SSPs 13–16 of LCS 61 by trunks 21. Trunks 21 may interconnect tandem switch 31 with each SSP within LCS 61 for toll-free telephone calls. However, trunks 21 may also be used to connect tandem switch 31 to, e.g., toll calls that terminate on SSPs outside LCS 61, but within LATA 1; calls terminating on SSPs outside LATA 1; and, calls originating outside of LCS 61 but terminating on an SSP within LCS 61. Tandem switch 31 is also coupled to SSP 12 by trunk 22, which may be a trunk connecting SSPs (or tandem switches) to other SSPs within the same LATA but not within the same LCS.

Trunk 22 may be used to carry intra-LATA toll calls. Because SSP 12 and SSP 13 are close to each other and have a high community of interest, direct intra-LATA toll trunk 22 may be provided. Trunk 22 may overflow at SSP 13 to trunk 21 then tandem 31, which will then use its intra-LATA toll trunk 22 to complete to SSP 12. Trunk 22 may overflow at SSP 12 to intra-LATA toll trunk 22 to tandem 31, which uses trunk 21 to complete to SSP 13. Within the rest of the LATA, the community of interest do not permit economical direct trunking between points. Thus, all other intra-LATA toll traffic has been shown as a combination of trunks 21 and 22 through tandem 31.

The multiple location, communications network of the present invention may require that the subscriber designate an interexchange carrier (IXC) for handling interchange traffic. According to the exemplary embodiment of FIG. 2, the subscriber may designate, for example, an interexchange carrier (IXC) associated with an IXC point of presence (POP) switch 201. Because IXC POP 201 has been designated as the interexchange switching point, IXC POP 201 may be connected to switch 13 via an ASF trunk 113 to provide, for example, direct delivery of a high volume of inter-LATA traffic via private trunks, thus, avoiding access charges on PSTN inter-LATA toll traffic. Further, IXC POP 201 may be connected to the other individual SSPs within the network either directly by a trunk line 23 or indirectly via a trunk line 23 to tandem switch 31. Trunk lines 23 may be used to connect SSPs (or tandem switches) to IXC POPs for calls to SSPs within other LATAs.

For the purposes of illustration, the multiple location, communications network of FIG. 2 is shown as including only six SSPs. However, more (or less) than six SSPs may be utilized. The SSPs 11–16 are each programmable switches which: recognize AIN-type calls; launch queries to service control point (SCP) 101; and, receive commands and data from SCP 101 to further process and route AIN-type calls. When one of the SSPs is triggered by an AIN-type call, the triggered SSP formulates an AIN service request and responds to call processing instructions from the network element in which the AIN service logic resides. According to an aspect of the invention, the AIN service logic may reside in a database at SCP 101.

SCP 101 may be implemented with an integrated service control point (ISCP). The ISCP is an integrated system which may include a service management system (SMS), a data and reports system (DRS), a programmable service control point (SCP), and a service creation environment (SCE). The SCE may be provisioned as a terminal implemented to work with SMS to create, modify, and load services into the SCP database. The SCP may execute software-based service logic and return call routing instructions to the triggering SSPs. The SMS may be provided for administrative purposes to synchronize customer CPR and data on the mated pair of ISCPs that SCP 101 represents. The DRS may be provided for compiling call information to be used for billing and administrative purposes. By way of example, the ISCP may be implemented with the Bellcore Integrated Service Control Point (ISCP), loaded with preferably at least ISCP software Version 4.0, available from Bell Communications Research, Inc., of Livingston, N.J.

In order to facilitate signaling and data messaging, each SSP and tandem switch within the multiple location, communications network is equipped with Common Channel Signaling (CCS) capabilities, e.g., Signaling System 7 (SS7), which provides two-way communications of data messages over CCS links 41–47 between each SSP and tandem switch and the SCP 101. The data messages may be formatted in accordance with the Transaction Capabilities Applications Part (TCAP). The telephone network essentially employs an upper-level software controlled network through the STPs and the SCP. The software resides over the hardware to check the call route and the availability of connection prior to hardware connection. In addition, each STP in the network may be equipped to route AIN SS7 messages based upon 6-digit global title translations.

Accordingly, the connections by links 41–47, links 71–73, and link 91 through STPs 51–53 and 81 are for signaling purposes, and allow each of the SSPs 11–16 to send and receive messages to and from SCP 101 via the STPs. As shown in FIG. 2, a local STP 53 may act as the data messaging control point for LCS 61. That is, all data messages from SSPs within LCS 61 or directed to SSPs within LCS 61 may be transmitted through STP 53. Accordingly, CCS links 43–47 are shown establishing a data link between STP 53 and either tandem switch 31, SSP 13, SSP 14, SSP 15, or SSP 16. For data messages from or to SSP 12 and other SSPs not within LCS 61, a CCS link 42 and a local STP 52 may be provided. For data messages from or to SSP 11, a CCS link 41 may be provided to a local STP 51. The connections by links 41–47 from the SSPs or tandem switch to the STPs are for signaling purposes, and allow the SSPs to send and receive messages to and from SCP 101.

Each of STPs 51, 52, and 53 may be connected to other STPs. For example, CCS links 71, 72, 73, and 91 may be provided to interconnect SCP 101 to local STPs 51, 52, and 53 through a regional STP 81. Further, CCS links 211, 212, and 213 may be provided to interconnect an IXC STP 221 to local STPs 51, 52, and 53, respectively. An additional CCS link 214 may be established to couple the IXC STP 221 to IXC POP 201.

MULTIPLE LOCATION, COMMUNICATIONS NETWORK HARDWARE

1. AIN Triggers

The present invention contemplates at least three AIN triggers that may be implemented on any of the above-described AIN SSPs to facilitate accessing the subscribed features of the multiple location, communications network. The 5ESS and DMS-100 AIN SSPs may be provisioned with a customized dialing plan (CDP) trigger, a termination attempt trigger (TAT), and a 10 digit trigger. The 1AESS AIN SSP may be provisioned with a CENTREX access trigger (CAT), which is equivalent to the CDP trigger, and a dialed number trigger (DNT), which is equivalent to the TAT.

When utilizing a 5ESS-type SSP, if a subscriber currently subscribes to custom ISDN and desires to subscribe to multiple location, communications network interworking, the switch may require being equipped with software including, e.g., 2372 (ASP Interworking with Custom ISDN Attendants) and 2846 (ASP Interworking with Custom ISDN). Further, if the subscriber currently subscribes to station message detail recording (SMDR) and desires to subscribe to multiple location, communications network interworking, the switch may also require being equipped with software including, e.g., 2563 (ASP Interworking with SMDR). In general, custom ISDN and SMDR services are not provisioned as part of the AIN deployment process. As subscribers order the multiple location, communications network feature and additionally wish to interwork their current services with the network, the local service provider's engineering forces may place orders and have the necessary features installed.

When utilizing the 1AESS type SSP, certain design parameters must be considered. When performing services that require forwarding of calls, e.g., Work-at-Home (WAH), the forwarding should be provided by a separate service available through the service provider, e.g., call forwarding or remote access to call forwarding (RACF). Subscribers with PBX systems may want RACF to be implemented. To implement this feature, the RACF-CTX custom feature, defined by set card FF064, may be required in the 1AESS. The set card is available through the local service provider's engineering forces.

A. Customized Dialing Plan (CDP) Trigger

The CDP trigger is a subscribed trigger that enables access codes to be defined at the SSP and may be assigned to all lines and trunks that may be assigned to a customized dialing plan, including business access arrangements. The business access arrangements may include, e.g., business POTS lines, business basic rate ISDN lines, and business trunks with direct inward dialing and direct outward dialing.

A CDP trigger, e.g., a one to three digit number, may be defined and assignable as an access code for a customized dialing plan. For example, the digit "4" may be assigned as the CDP access code trigger, such that when the digit is entered immediately after the station goes off-hook, the SSP will trigger an AIN query. When no SSP access code is dialed, i.e., a digit other than "4" is entered immediately after the station goes off-hook, the call proceeds under normal call processing. When the SSP access code is dialed after the station goes off-hook, SSP processing may be invoked such that the CDP trigger will launch an AIN query. The CDP trigger may be assigned more than one access code for accessing various features of the multiple location, communications network, as further described below.

The CDP trigger may also be assigned an intercom code, which is a code of a predetermined length, e.g., between one and seven digits, that may be used by the subscriber's network to trigger additional features of the network. The CDP trigger may be assigned more than one intercom code for accessing various network locations through AIN, as will be further described below; however, it is preferred that all intercom codes assigned within the network be of the same length. It is noted that the network may utilize both access codes and intercom codes within a single defined service. While it is not necessary that the access codes and intercom codes be of a uniform length, it should be noted that the intercom codes should not begin with digits that have been defined as access codes. The CDP trigger may be implemented with AIN Release 0.1.

The CENTREX access trigger (CAT) is functionally the same as the CDP trigger, except the CAT is implemented with AIN Release 0.0. Accordingly, the CAT may be programmed to recognize a dialed access code number and to trigger AIN functionality in response to recognizing the dialed access code number.

B. Terminating Attempt Trigger

The TAT is a subscribed trigger that may be assigned to a directory number/call type. Thus, the TAT may be assigned to a directory number that may or may not have any physical facilities assigned to it, i.e., the switch need not be within a network SSP. The TAT may be assigned a trigger that includes, e.g., a seven to ten digit number that is dedicated solely for the purpose of triggering AIN functionality. The TAT may be implemented with AIN Release 0.1.

The dialed number trigger (DNT) is functionally the same as the TAT, except that the DNT is implemented with AIN Release 0.0. Accordingly, the DNT may be programmed to recognize a dedicated or designated telephone number and to trigger AIN functionality in response to recognizing the designated telephone number.

C. 10 Digit Trigger

The 10 digit trigger is an office based trigger that may be assigned to a dialed number. Accordingly, the 10 digit trigger may be programmed to recognize a dedicated or designated telephone number and to trigger AIN functionality in response to recognizing the designated telephone number.

2. Service Control Point

The multiple location, communications network feature of the present invention may require several service logic programs (or call processing records (CPR)) to fully implement the subscriber's desired features within a single network. For example, each subscriber may require a CPR for AIN Release 0.0 implementation of subscribed service and a CPR for AIN Release 0.1 implementation of the subscribed service. However, common service logic for both AIN Releases may be in the same CPR with protocol particular logic. Further, a CPR for implementing a work at home feature, a CPR for implementing an optional service, such as centralized access to public and private facilities, may also be provided. Each CPR may have a number of associated tables to be accessed by the SCP in implementing the particular service logic. It is also noted that each originating station requires a trigger CPR. Generally, a trigger CPR may be small. That is, while the originating station trigger may also include associated tables, particularly if a subscriber subscribes to WAH with call forwarding, the trigger CPR may only include graphs for CDP access or intercom triggers and one graph for the WAH trigger, with each graph stored in a database in the SCP 101. Each graph may include at least two nodes and each trigger CPR may include at least one call variable used by each graph.

The service provisioner needs to known the AIN release of each network station's serving SSP because the SCP may use the telephone number and the AIN trigger type to generate a unique key for access to AIN functionality. Because AIN Release 0.1 and AIN Release 0.0 are different, some aspects of a service may need to be separated according to the AIN release. Further, to create a unique key for access to AIN functionality, the AIN release may be needed to ensure that the proper service creation features and the protocols may be utilized for effective and accurate communication with the SSP. Although separate CPRs may be required to support the present invention across AIN releases, the individual tables stored in the SCP may be designed to accommodate both AIN versions of the present service.

An originating trigger CPR may be dedicated to each of the network stations within the subscriber's network and may be maintained in the SCP to monitor triggering of AIN functionality by any of the network stations. Accordingly, the CPR may need to know what type of SSP is providing the AIN trigger and query message. Accordingly, the originating trigger CPR may be designed to transfer control to an appropriate "transfer in" CPR to translate the switch commands into common call variables usable by the CPR to continue the service logic. Use of the "transfer in" CPR ensure maximum software reuse but may decrease SCP performance (capacity).

Each SSP may have an originating trigger on those lines comprising the private network. When the triggering event, i.e., origination of the offered call, occurs, the SSP may send a query for that calling number (CGN) to the SCP. The SCP may use the CGN to find its trigger CPR and the trigger type in the query sent by the SSP to the SCP to determine the appropriate originating trigger in the CPR to use.

As discussed above, if the triggering SSP is a 5ESS or DMS-100 type switch, AIN Release 0.1 functionality may be utilized. Preferably, the originating trigger CPR is short and transfers control to an appropriate "transfer in" graph in the common service logic CPR. A major function of the "transfer in" graph is to transform data in either AIN Release 0.0 or in AIN Release 0.1 protocol to generic, protocol insensitive values that the common service logic CPR can process. At the end of the common service logic CPR, control is transferred over to "transfer out" graph to prepare an appropriate protocol response to send back to the SSP.

For purposes of illustration, various features of the present invention will now be described from the standpoint of a switch implementing AIN Release 0.1 protocol and the CPR provisioned with CDP triggers. However, as will be apparent to those of ordinary skill in the art based on the disclosure provided herein, the present invention is not limited to implementation through AIN Release 0.1 and can be designed and provisioned with a network utilizing triggers associated with AIN Release 0.0.

MULTIPLE LOCATION, COMMUNICATIONS NETWORK SERVICE LOGIC

The multiple location, communications network features according to the present invention offer the subscriber various call features and listing options in order to fit the particular concerns and requirements of the subscriber. While FIG. 2 shows a number of access types and access arrangements, the network may integrate and provide inter-location dialing as if all access types were on a single switch.

The multiple location, communications network of the present invention may provide a basic service from which subscribers may select a dialing format that is best suited for their needs as a communication network subscriber. The available options associated with such a basic service may include features referred to herein as Function Dialing (FD), Centralized Access to Private/Public Facilities (CAF), Automatic Selection of Facilities (ASF), Call Screening (CS), and Work At Home (WAH). While the available options will generally be described herein as if provisioned in the alternative, it is contemplated that these options may be combined in any of a wide variety of combinations to provide a single complex service, if desired.

1. DIALING PLAN FOR BASIC SERVICE

The basic service of the present invention may provide the subscriber with an abbreviated or customized dialing plan that will complete inter-location calls as if they were served by the same switch. The dialing plan for basic service may be implemented by service logic or CPR stored in a database in SCP 101. The dialing plan will normally be uniform throughout the subscriber's multiple location, communications network and will provide an abbreviated dialing plan without requiring dedicated facilities. The subscriber may select the number of dialed digits that will be required to identify each station within the network, e.g., a five digit number for each station. Once the number of digits for identifying each station is selected, the subscriber may select one of two optional numbering formats, e.g., location code or extension code.

It is noted, however, that the abbreviated or customized dialing plan is contemplated for calls originating and terminating within the multiple location, communications network. Calls originating to off-network locations will have to have their North American Numbering Plan (NANP) number dialed as the off-network locations are not part of the abbreviated dialing plan.

A. Location Code Numbering

The location code numbering format option may be preferred for subscriber's wishing to retain and use at least a portion of each station's NANP number as part of the abbreviated dialing plan. For example, location code numbering enables private network stations to maintain extension numbers assigned prior to subscribing to the multiple location, communications network feature. As shown in Tables 1 and 2, each of the subscriber's multiple locations, e.g., building or office locations, may be identified by a single digit number, referred to as, e.g., a location code. In the location code numbering format option, the abbreviated dialing plan associated with each station may include the location code as a leading digit followed by one to seven digits of the station NANP number.

As indicated above, the length, i.e., number of digits, of the abbreviated dialing plan is at the discretion of the subscriber. Assuming, for example, that the subscriber selects a five digit number, the five digit number will comprise the location code and the last four digits of the NANP. The subscriber may also predefine certain special purpose numbers, e.g., "0" for operator, which need not be of the same length as the dialing plan telephone numbers.

The location code may be determined according to one of two optional procedures. According to a first optional procedure (see, for example, Table 1) it is assumed that the NXX for each building has a unique third digit (e.g., 829, 758, 542). Because each location has a unique third digit of NXX, the five digit abbreviated number may be the last five digits of the NANP number (e.g., 829-4353, 758-4565, and 542-1204 will respectively be reached by the predefined abbreviated numbers 9-4353, 8-4565, and 2-1204). In other words, the unique third digit of NXX becomes the identifier of location code, and the five digit abbreviated number includes the last five digits of the NANP number.

TABLE 1

| Location | NXX | Location Code |
|---|---|---|
| Building A | 829 | 9 |
| Building B | 758 | 8 |
| Building C | 542 | 2 |

A second optional procedure is necessary when the third digit of the NXX (when a five digit number is desired) is not unique among the subscriber's building locations (e.g., 829, 758, 699, and 704), as shown for example in Table 2. Clearly, the first optional procedure would not be able to assign a location code to discern the NXXs of 829 and 699. Thus, the subscriber selects a unique location code for each building location (e.g., 3 for 829, 4 for 758, 5 for 699, and 6 for 704). Accordingly, under the second optional feature, the five digit abbreviated number would include the selected location code and the last four digits of the NANP number.

TABLE 2

| Location | NXX | Location Code |
|---|---|---|
| Building A | 829 | 3 |
| Building B | 758 | 4 |
| Building C | 699 | 5 |
| Building D | 740 | 6 |

A CDP trigger may be provisioned in the AIN SSPs to access the location code format option of the dialing plan basic service. A CDP trigger (or CAT) may be defined for each individual location code. Thus, when a valid location code is entered immediately after the network station goes off-hook, AIN functionality may be triggered. According to the service logic, the AIN SSP of the calling station may be defined to recognize the entered location code as an AIN SSP trigger, suspend the call and wait for the additional entry of the NANP digits prior to sending the query message to the SCP. Thus, it is not necessary to play back a second dial tone or prompt the user to enter additional digits to complete the call. From the caller's standpoint, the entire abbreviated number (location code and NANP number digits) are entered as a single number. The AIN SSP may also be equipped with a timer to time out the trigger if additional NANP digits are not provided as input within a predetermined period of time, e.g., 4 seconds.

It is not necessary that the AIN SSP trigger an AIN query for each recognized location code. Intra-switch, station-to-station calls may not trigger the AIN SSP since the switch may be programmed to recognize that the location code does not require the SCP to route the call. Because the remaining digits are the same as the NANP number, the SSP may translate the remaining digits into a line number associated with the terminating station and may directly terminate the offered call without requiring AIN involvement.

Figure 3A:
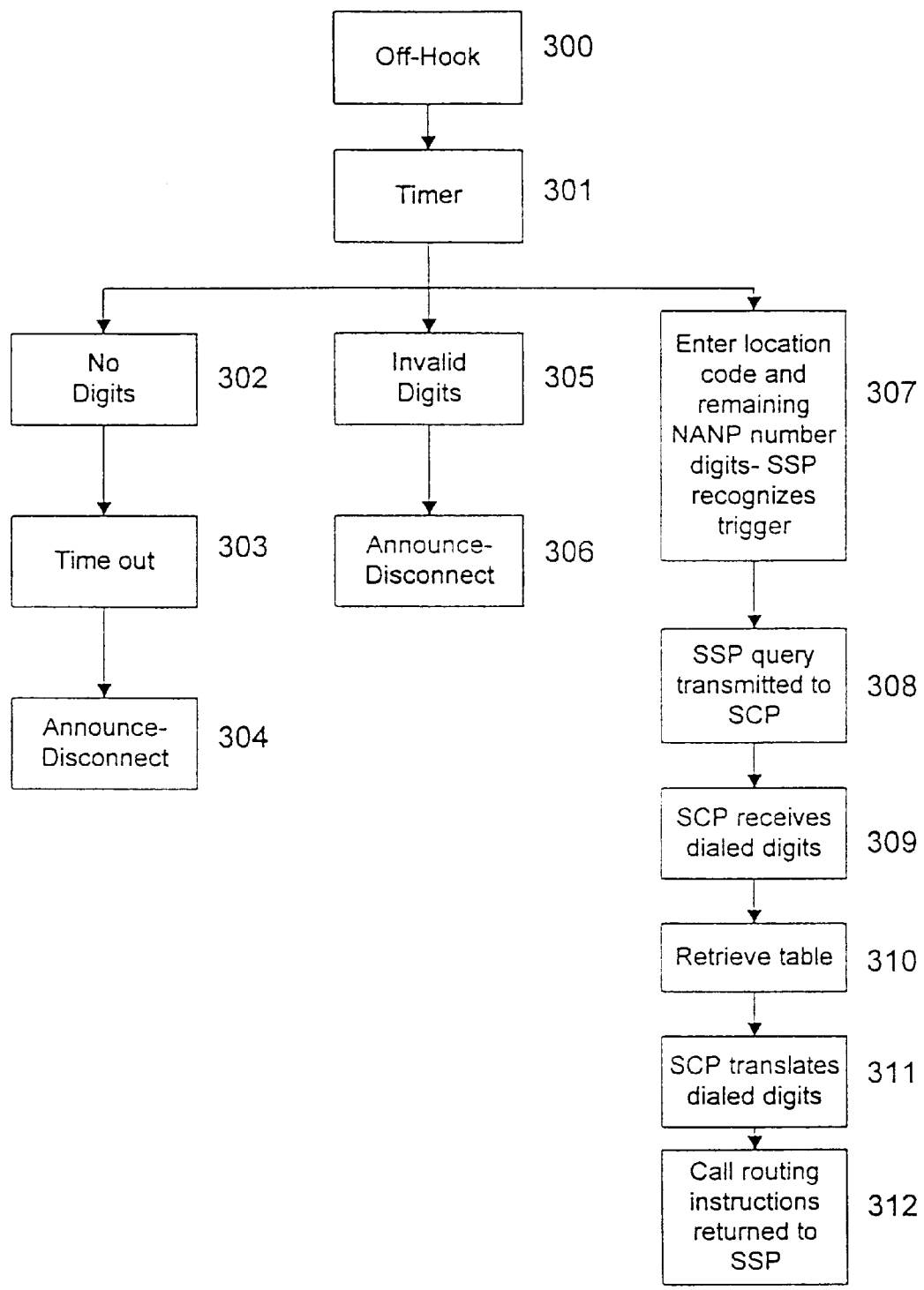
FIG. 3A illustrates an exemplary flow diagram of call processing using a location code number option.

FIG. 3A is a flow diagram of an example of the service logic for placing a call using the location code format option of the dialing plan basic service. In step 300, the calling party, e.g., a party at station 16A, takes the station off-hook.

A timer, provided within local SSP 16, may begin a count for entry of input data in step 301. If no data is entered, as in step 302, the counter will time-out in step 303 after expiration of a predetermined time period, e.g., 4 seconds. After the time-out, the SSP may play an announcement in step 304, e.g., that digits have not been received and that the caller is being disconnected from the network, etc. The call may then be automatically disconnected.

In step 305, if the caller has entered digits, but the digits are not recognized or are invalid, e.g., an improper access code digit has not enabled AIN functionality, the SSP may play an announcement in step 306, e.g., "the number entered is invalid, please check the number and try again." The call may then be automatically disconnected from the network.

In step 307, the caller has entered a valid location code and the proper remaining NANP number digits, e.g., for station 14A. Upon receipt of the location code digit, SSP 16 recognizes the location code as an AIN access code and awaits the entry of the remaining NANP number digits. Upon receipt of the recognized dialing plan abbreviated number, SSP 16, in step 308, launches an AIN query to the originating station CPR within SCP 101 via the SS7 network. In step 309, the SCP receives, with the AIN query, the dialed digits, i.e., the dialing plan abbreviated number, e.g., 4-1001. In step 310, the SCP retrieves an abbreviated dialing translation table (see, for example, Table 3) and looks up the dialing plan abbreviated number, in step 311, to determine associated terminating number, e.g., (987) 123-1001. Once the associated terminating number is found, the SCP may access a routing CPR or another table that includes various information about the called station, as will be discussed below. The table may include an entry for each abbreviated dialing code for a station in the network and include default terminating number routing information so that the SCP may return routing instructions to the triggering SSP to route the call to the called destination. The table may be stored in a database of the SCP.

TABLE 3

Abbreviated Dialing Code Translation Table

| DP Abbreviated # | Terminating # |
| --- | --- |
| 4-1001 | (987) 123-1001 |
| 4-1010 | (987) 123-1010 |
| 5-1001 | (987) 123-1001 |
| 5-1010 | (987) 123-1010 |
| 6-1001 | (798) 456-1001 |
| 6-1010 | (798) 456-1010 |

In addition to the AIN SSPs discussed above, the location code dialing feature may be supported from a PBX that is directly served by an AIN SSP. The customized dialing plan trigger may be assigned to lines and trunks. An escape code may be defined at the PBX, e.g. "9", so that the user may enter into the public switched telephone network (PSTN) prior to entering the dialing plan number. That is, the user would enter the escape code to enter the PSTN, then enter the location code to trigger AIN and enter the remainder of the abbreviated location code number of the terminating party.

B. Extension Code

The extension code format option may be preferred by subscriber's who wish to identify each station by a particular identifier, e.g., an employee number. For this option, the subscriber's may assign a unique one to seven digit identifier code or number to each person. Unlike the location code numbering option discussed above, the extension code is independent of the NANP number of each station. Assuming that the subscriber has opted for a four digit abbreviated number and has assigned the four digit identifier, e.g., 5490, to employee A whose work position has a telephone set with an NANP number of, e.g., 758-2359, calls directed to employee A from within the multiple location telecommunication network need only to be dialed with "5490". An added benefit of extension code is that the employee identified as "5490" may relocate to a new location and/or new NANP number, e.g., 829-3401, yet retain the unique employee identifier code to receive calls from within the network.

Extension codes may be implemented by CDP intercom codes on the DMS-100 switch (or CAT intercom triggers on the 1AESS switch). For the 5ESS switch, the CDP access code may be implemented as the trigger. In all cases, the SSP will recognize the AIN SSP trigger, suspend the call, and send the extension code digits to the SCP for processing and routing.

Figure 3B:
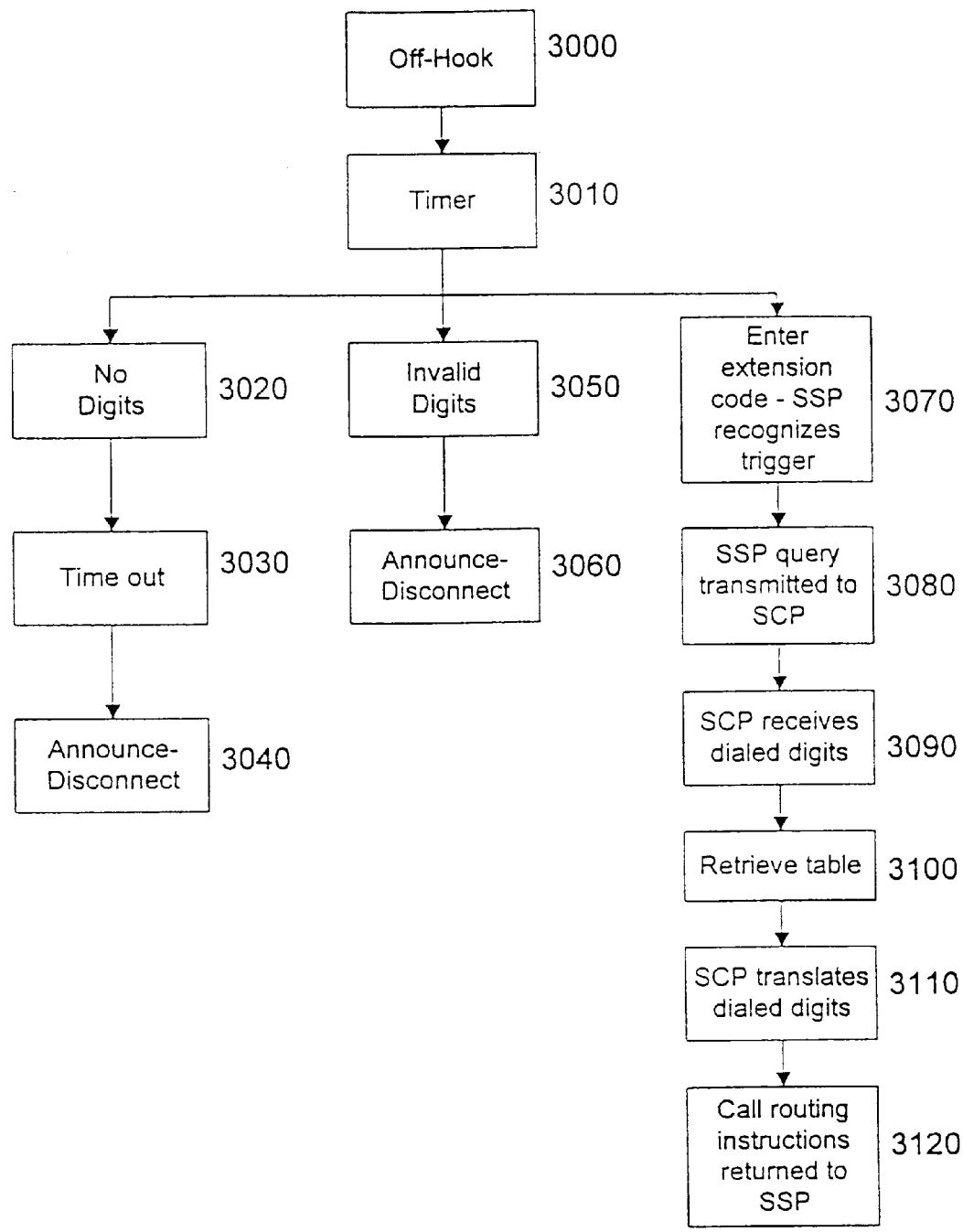
FIG. 3B illustrates an exemplary flow diagram of call processing using an extension code number option.

The call logic for an inter-/intra-location call using location code or extension code dialing is functionally the same. As shown in FIG. 3B, the service logic from the SCP may be similar to the location code dialing shown in FIG. 3A. Thus, the network user, e.g., a user at location 15A, may go off-hook in step 3000, activating a timer in serving SSP 15 in step 3010. If no data is entered, as in step 3020, the counter will time-out in step 3030 after expiration of a predetermined time period, e.g., 4 seconds. After the time-out, the SSP may play an announcement in step 3040, e.g., that digits have not been received and that the caller is being disconnected from the network, etc. The call may then be automatically disconnected.

In step 3050, if the caller has entered digits, but the digits are not recognized or are invalid, e.g., an improper access code digit has not enabled AIN functionality, the SSP may play an announcement in step 3060, e.g., "the number entered is invalid, please check the number and try again." The call may then be automatically disconnected from the network.

In step 3070, the caller has entered a valid extension code, e.g., 5555 for station 14B. Upon receipt of the extension code, SSP 15 recognizes the entered digits as an AIN trigger, i.e., the intercom trigger. Upon receipt of the recognized dialing plan abbreviated number, SSP 15, in step 3080, may launch an AIN query to the extension code CPR within SCP 101 via the SS7 network. In step 3090, the SCP receives, with the AIN query, the dialed digits; i.e., the dialing plan abbreviated number 5555. In step 3100, the SCP retrieves an extension code translation table (see, for example, Table 4) stored in the SCP database, and looks up the dialing plan abbreviated number, in step 3110, to determine the associated terminating number, e.g., (987) 123-2222. Once the associated terminating number is found, the SCP may return routing instructions to the triggering SSP to route the call to the called destination in step 3120.

TABLE 4

Extension Code Translation Table

| DP Abbreviated # | Terminating # |
| --- | --- |
| 6666 | (987) 123-1111 |
| 5555 | (987) 123-2222 |
| 4444 | (987) 123-3333 |
| 3333 | (987) 123-4444 |

TABLE 4-continued

Extension Code Translation Table

| DP Abbreviated # | Terminating # |
| --- | --- |
| 2222 | (798) 456-5555 |
| 1111 | (798) 456-6666 |

It is noted however, that the extension code dialing launches AIN queries for each entered abbreviated number. That is, unlike the location code dialing, extension code dialing does not recognize intra-switch calls to bypass the SCP.

In addition to the AIN SSPs discussed above, the extension code dialing feature may be supported from a PBX that is directly served by an AIN SSP. The customized dialing plan trigger may be assigned to lines and trunks. An escape code may be defined at the PBX, e.g., "9", so that the user may enter into the PSTN prior to entering the dialing plan number. That is, the user would enter the escape code to enter the PSTN, then enter the extension code to trigger AIN to route the call to the desired terminating party.

2. OPTIONAL FEATURES OF BASIC SERVICE

Some of the optional features of the basic service may be accessed by one to three leading digits dialed prior to dialing the optional feature number, e.g., the function dialing number. Because an access number indicates the particular optional feature being accessed by the subscriber, access numbers must be unique for each optional feature. Further, access numbers are usually consistent throughout the multiple location, communication network. For example, assume that the access number for a desired optional feature, e.g., Function Dialing, is "5". Each location within the subscriber's network must dial "5" to access the function number feature prior to entering the desired Function Dialing number. A description of the various features that may be provided in the basic service is discussed below, with reference to the accompanying drawings A. Function Dialing Function Dialing may be an option that is made available to a subscriber of the basic service, regardless of which optional dialing format selected. The function dialing option may be implemented by service logic or CPR stored in a database in SCP 101. Function Dialing enables the subscriber to define and use special uniform dialing codes based upon a predetermined location, job function, etc. For example, a defined Function Dialing number for receiving a facsimile letter may be implemented by using the alphabetical portion of the dial (or keypad), and dialing, for example, FAX; for reaching the security desk, by dialing, for example, HELP; for reaching the cafeteria, by example, by dialing DINE; etc. Function Dialing numbers may be defined by any number of digits, although preferably between one and fifteen digits should be used. It should be noted that the 1AESS switch may only handle 15 digits. Thus, if the access code for function dialing is defined as a three digit code, then the function dialing number may only include twelve digits.

Function Dialing may be one of the optional services that includes an access digit, e.g., "5". The access digit avoids conflicts with the dialing plan abbreviated number and triggers the AIN SSP to suspend the call and await entry of a function number. Thus, for a subscriber to call the security desk, the access digit followed by the Function Dialing number may be entered, e.g., 5-HELP.

Further, function dialing numbers may also include one to three trailing digits to indicate a location-specific function desired by the caller. The trailing location-specific function number, e.g., a one to three digit number, may be automatically added to the dialed function number (e.g., based on the location of the calling party) or it may be manually entered by the calling party after entering the function number. The trailing location number may be used to identify which of the subscriber's multiple locations the function dialing number is attempting to access. In accordance with an aspect of the present invention, this feature may automatically default and send function number calls to a location that is closest to the calling party, and allow a calling party to manually override the default setting by entering a specific location number. This feature may be especially useful when the function number, e.g., HELP, may be used in each of the subscriber's multiple locations. Thus, the trailing location-specific function number enables the subscriber to identify function dialing number for all security offices as, e.g., HELP; all cafeterias as, e.g., DINE; etc., regardless of location.

Assume, for example, that each location within the multiple location private network includes the function dialing number CONF for conference services. When an originating caller at, e.g., SSP 14, dialed "5-CONF", the call would be connected as if 5-CONF14 had been dialed and translated. If the same originating caller desired to host a meeting at, e.g., SSP 11, then "5-CONF11" would be dialed and translated, and the caller would be connected to conference services served by SSP 11.

Function numbers look up the function number as it was dialed. If it works, the resulting 10 digit number may be sent back to the SSP. If it does not work, the location code may be appended to the dialed number and the combination may be looked up in the same table. If it works this time, the resulting 10 digit number may be sent back to the SSP. If it does not work, the SSP may be instructed to play a misdial announcement. Because location codes appended to function dialing numbers requires additional service logic, the ability to append location codes to function dialing numbers may be an optional service. An example of the function dialing number translation table is shown below in Table 5.

TABLE 5

Function Dialing Code Translation Table

| Function Dialing # | Terminating # |
| --- | --- |
| SECURITY11 | (213) 647-8100 |
| SECURITY12 | (456) 531-9822 |
| SECURITY13 | (987) 123-1133 |
| SECURITY14 | (987) 123-1144 |
| SECURITY15 | (987) 123-1155 |
| SECURITY16 | (987) 123-1166 |
| CONF11 | (213) 647-6700 |
| CONF12 | (456) 153-9880 |
| CONF13 | (987) 123-1313 |
| CONF14 | (987) 123-1414 |
| CONF15 | (987) 123-1515 |
| CONF16 | (987) 123-1616 |
| CLEAN | (213) 647-0011 |
| DINE | (213) 647-0022 |
| FAX | (213) 647-0033 |

Figure 4:
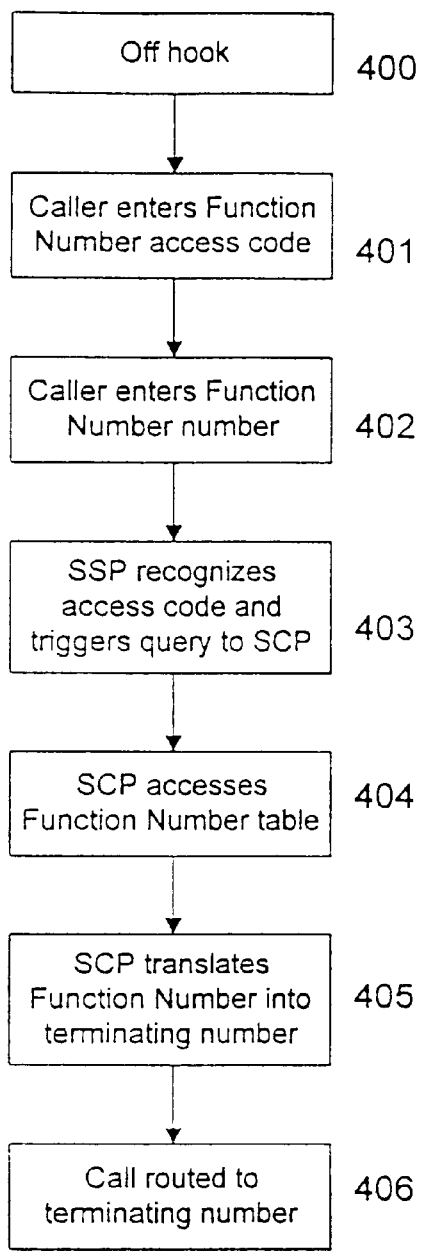
FIG. 4 illustrates an exemplary flow diagram of call processing using function number dialing.

Function Dialing (FN) may be implemented by CDP access codes (or CAT access codes). FIG. 4 shows an exemplary flow diagram of the FN option. In step 400, the calling station goes off-hook. In step 401, the caller enters the FN access code, followed by entering the FN number in step 402. In step 403, the AIN SSP of the calling party (upon entry of the FN access code) will recognize the access code as an AIN SSP trigger and suspend the call processing.

While the call is suspended the AIN SSP will await entry of the function dialing number entered in step 402. After the function dialing number is entered, the AIN SSP will send the function dialing number to the SCP in a query message for SCP processing. Because function numbers may vary in digit length, the SSP may be equipped with a timer to time-out if a Function Dialing number is not entered within a predetermined period of time, e.g., 4 seconds. The timer may also use inter-digit timing to determine when to stop digit collection and send the query message. Alternatively, the network may employ a predetermined stop digit entered by the subscriber, e.g., #, to indicate that the function dialing number is completely entered. In step 404, the SCP may access the FN table, e.g., Table 5, and translate the FN into a terminating number, in step 405. The call may then be routed to the called party, in step 406. As discussed above, the Function Dialing feature may include a location-specific function that comprises one to three trailing digits that are added to the function number. The location-specific number may be manually entered by the calling party after entering the function number, at, for example, step 402, to indicate a specific location (e.g., SECURITY11) or a default location (e.g., SECURITY corresponding to (213) 647-8100) may be automatically set or assigned based on the calling party's location. Based on the data in the FN Translation Table, such as Table 5, and the location-specific function trailing number, the call will be routed to the appropriate location.

B. Automatic Selection of Facilities

Automatic Selection of Facilities (ASF) is another optional feature available to subscribers of the dialing plan basic service. The ASF may be implemented by service logic or CPR stored in a database in SCP 101. The ASF may include two separate options: ASF for on-network calls and ASF for off-network calls. In general, ASF is directed to arranging the facilities. Facilities may be arranged such that up to six routes starting and ending at a particular location may be selected by a subscriber. Thus, the subscriber may potentially have up to six overflow routes. The six routes, in priority (hierarchical) order may referred to as: Primary Trunk Group (PTG), Alternate Trunk Group (ATG), Second Alternate Trunk Group (SATG), Primary Carrier (PC), Alternate Carrier (AC), and Second Alternate Carrier (SAC).

To properly arrange the facilities, at least one route should be populated, and that at least one route should be either PTG or PC. Additionally, an ATG must be preceded by a PTG; an SATG must be preceded by an ATG; an AC must be preceded by a PC; and an SAC must be preceded by an AC.

1. On-Network Calls

On-network calls are calls that are to be terminated to users situated at a remote location but within the multiple location, communications network, which may be either inter-LATA or intra-LATA. According to ASF, the subscriber defines, on a location by location basis, which facilities and carriers will route calls between each location. Thus, the subscriber selects the facilities and carriers, e.g., private or interexchange carrier, to route on-network call traffic within locations and between remote locations. However, the default routing path is via PSTN.

The ASF option allows a user within the network to call another user, via the dialing plan basic service number. The facilities and carriers may then be determined by considering the combination of the originating location and the terminating location. For example, for intra-location calls and intra-LATA calls, the Public Switched Telephone Network (PSTN) facilities may be used, or alternatively, private facilities may be identified. For inter-LATA calls, the ASF subscriber must identify which facilities and carriers will route the call.

The ASF on-network option is utilized to find a facility arrangement between a pair of locations, i.e., originating and terminating. Service logic may be used to determine the pair of locations, and the pair of locations may be used to access the ASF on-network table, shown in Table 6 below.

When a call is placed by location code dialing, the preferred way of determining the pair of locations is to first look up the SS7 signal point code (SPC) assigned to the querying SSP in a table imbedded in the common service logic CPR to determine the originating location. The location code in the abbreviated dialing number may be used as the terminating location identifier. Alternatively, the NPA-NXX of the CGN may be looked up in a table imbedded in the common service logic CPR to determine the originating location. The location code may again be used for identifying the terminating location.

When a call is placed by extension code dialing, the preferred way of determining the pair of locations is to first look up the SS7 signal point code (SPC) assigned to the querying SSP in a table imbedded in the common service logic CPR to determine the originating location. Then the NPA (or NPA-NXX) of the called number (CDN), after translation of the abbreviated number, may be directly utilized as the terminating location identifier. Alternatively, the NPA-NXX of the CGN may be looked up in a table imbedded in the common service logic CPR to determine the originating location. The NPA (or NPA-NXX) of the CDN, after translation of the abbreviated number, may again be directly utilized as the terminating location identifier.

If a pair of locations cannot be determined in the ASF on-network table, the facility arrangement will be the default PSTN. Referring to FIG. 2, the trunk lines, e.g., 111, 112, 114, and 116, are ASF on-network trunks, which means that the designated trunk may be a facility arrangement of one to six specified routes.

In general, the subscriber may select various carriers identifiable as, e.g., Primary Trunk Group (PTG), Alternate Trunk Group (ATG), Second Alternate Trunk Group (SATG), Primary Carrier (PC), Alternate Carrier (AC), and Second Alternate Carrier (SAC). The trunk groups may include facilities such as, e.g., OutWATS, tie-lines, private networks, etc.

Table 6 shows an example of an on-network ASF table that may be stored in a database of the SCP for use in routing inter-location destination calls. In table 6, AAA may be the CIC for the IXC running IXC POP 201, and BBB, CCC, and DDD may be the CICs for other IXCs, whose POPs are not illustrated in FIG. 2. All pairs of locations not shown will default to PSTN using the PIC of the originating station.

TABLE 6

ASF ON-Network Routing Table

| Orig. | Term. | PTG | ATG | SATG | PC | AC | SAC |
|---|---|---|---|---|---|---|---|
| 11 | 13 | 111 | | | AAA | | |
| 11 | 14 | 111 | | | AAA | BBB | |
| 11 | 16 | 111 | | | | | |
| 12 | 13 | 112 | | | BBB | | |
| 12 | 14 | 112 | | | DDD | BBB | |
| 12 | 16 | 112 | | | | | |
| 13 | 11 | 111 | | | CCC | | |
| 13 | 12 | 112 | | | AAA | DDD | BBB |
| 14 | 11 | 114 | | | | | |
| 14 | 12 | 114 | | | DDD | | |
| 16 | 11 | 116 | | | CCC | BBB | |
| 16 | 12 | 116 | | | | | |

With the data in Table 6, after the network user dials the abbreviated number under the appropriate dialing plan, the call will be routed by SCP using the specified facilities. For example, a call originating from SSP 11 and terminating at SSP 14 will be routed using trunk 111 as the primary trunk group, AAA as the primary carrier, and BBB as the alternate carrier. However, a call originating from SSP 12 and terminating at SSP 14 will be routed using trunk 112 as the primary trunk group, DDD as the primary carrier, and BBB as the alternate carrier.

Figure 5:
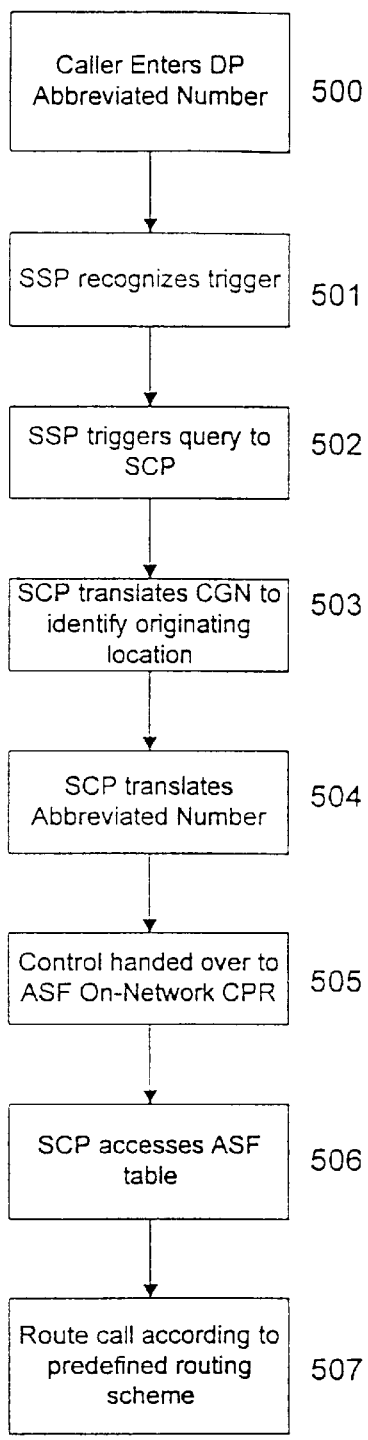
FIG. 5 illustrates an exemplary flow diagram of an on-network terminating call using predefined subscriber routing options.

FIG. 5 shows an exemplary flow diagram of a network originating call to an on-network destination using ASF. For purposes of illustration, the preliminary dialing procedures and dialing options are not discussed within this example. Assume that the call originates from station 13A for termination on the network to station 11A. In step 500, the caller at station 13A enters a valid dialing plan abbreviated number for station 11A. The serving SSP (i.e., SSP 13) recognizes a dialing plan trigger, i.e., the location access code or the intercom code (for extension dialing), in step 501, and may forward the dialed digits and the triggering SSP's identification to the SCP in an SS7 messaging query in step 502 to begin executing the appropriate dialing plan CPR. The triggering SSPs identification is the SS7 SPC. If the SSP supports remote switch modules, the SS7 SPC may prove ineffective in identifying the triggering SSP, however, if no remote switches are supported, the SSP may be easily identified. In case the SSP cannot be identified, the messaging query may also include the calling telephone number (CGN). In step 503, the SS7 SCP determines the originating location, i.e., the serving switch, from SPC assigned to the triggering SSP or from the NPA-NXX of the CGN. In step 504, the SCP may access the appropriate translation table to identify the terminating number and the location of the called party, i.e., at station 11A or SSP location 11.

Now that the location of each of the parties is known by the SCP, the SCP may determine the proper routing scheme. Because the network includes the ASF feature, control of the call is passed to an ASF On-Network CPR stored in the SCP in step 505. In step 506, the SCP may access the routing table, such as Table 6, and determine the subscriber's routing scheme for calls originating from location 13 and terminating to location 11. In this particular example, the SCP would determine that the primary trunk group is 111 and the primary carrier is CCC. Thus, in step 507, the SCP may return the terminating number and the ASF route to triggering SSP 13 to route the call to the desired destination.

2. Off-Network Calls

Off-network calls are calls that are to be terminated to stations not within the multiple location, communications network, which may be intra-LATA, inter-LATA, and international. According to the ASF feature of the invention, the subscriber may also select the route for calls terminating off-network. Off-network calls may be routed by the selected ASF route based upon whether the call is intra-LATA, inter-LATA, or international, or alternatively, based upon the terminating NPA (or NPA-NXX) from the originating location LATA. The international code (i.e., 011) may be included as a terminating NPA.

To access the destination based off-network routing of ASF, an off-network access number may be defined, e.g., 7, to identify the caller's intent to dial an off-network number, i.e., trigger AIN recognition of off-network ASF. Thus, the caller may dial "7" followed by the off-network terminating number. The facilities to be used may be based on the terminating number and the originating LATA. Thus, a list including originating NPAs within the network, a list of terminating NPAs (or NPA-NXXs), and a list of facilities/carriers that will be used to route the off-network calls for each of the originating/terminating combinations may be stored in a database of the SCP. From this list, the SCP may determine, from the called party number, which facilities will be used to route the call, based on the originating location LATA.

Because an access code is required to indicate that the call destination is off-network, this access code should be defined as a CDP trigger access code (or CAT access code) to launch an SS7 messaging query to the SCP when the access code is input immediately after the network station goes off-hook.

For example, for off-network intra-LATA calls, PSTN facilities may be used, alternatively, other facilities may be identified. For off-network inter-LATA calls, the ASF subscriber must specify which carriers may route the call. Thus, the subscriber selects the facilities and carriers, e.g., private or interexchange carrier, to route off-network call traffic to remote locations.

In general, as with the on-network routing, the subscriber may select various facilities and carriers identifiable as, e.g., Primary Trunk Group (PTG), Alternate Trunk Group (ATG), Second Alternate Trunk Group (SATG), Primary Carrier (PC), Alternate Carrier (AC), and Second Alternate Carrier (SAC). The subscriber may specify that the primary trunk group and the two alternate trunk groups connect to carrier points of presence (POP), and the primary carrier and two alternate carriers may specify public facilities. The subscriber may also connect to private trunks at the SSP provided by a provider other than the service provider, e.g., IXC, alternate local exchange carrier, etc., that may not route to an IXC POP. Further, the subscriber may specify NPAs in increments of ten terminating NPAs including an "other" option which acts as a default. All terminating NPAs not specifically shown in the list will be routed according to the "other" option.

The ASF off-network option may employ the same key facility arrangement concept of the ASF on-network option. The ASF off-network option may be utilized to find a route between a pair of locations, i.e., an on-network originating location and an off-network terminating location. The terminating location may be some point defined by a ten to fifteen digit CDN entered by originating party in response to a second dial tone provided from independently the SSP before the query to SCP 101 or after receiving instructions from SCP 101.

The AIN may be adapted to make the functionality of the DMS-100, the 1AESS, and the 5ESS uniform with respect to this feature. Originally, the 5ESS may collect the access code, e.g., "7", and give a second dial tone before the query. The DMS-100 may collect the access code and give a stutter dial tone. The 1AESS may collect all numbers in a continuous string, i.e., access code and terminating number. The originating location is determined in a manner similar to that discussed above with respect to ASF on-network. The service logic analyzes the CDN to determine the key terminating characteristic. For example, if the basic option is all that the subscriber subscribes to with the ASF off-network option, then the key terminating characteristic may be determined by whether the call is intra-LATA, inter-LATA, or international. Each type of traffic may have only one facility arrangement at a given originating location. Alternatively, the subscriber may have a facility arrangement for international and set the remainder to PSTN, i.e., PC being a local exchange carrier (LEC) for intra-LATA and PC being a carrier identification code (CIC) for inter-LATA.

Specifically, the CDN may be analyzed to determine whether the call is international, i.e., whether CDN begins with "011". If international, the facility arrangement may be set according to Table 7A (or alternatively in Table 7B), shown below. If not international, the NPA (or NPA-NXX) of the CDN is used to determine the terminating LATA. The terminating LATA is then compared with the originating LATA. If the LATAs match, the call is intra-LATA and the facility arrangement is set accordingly. If not intra-LATA, the call is inter-LATA and the facility arrangement is established accordingly.

The NPA and NPA-NXX combinations are searched within the ASF off-network table to determine whether a route has been defined. Initially, the SCP may determine whether the offered call is an exception to the ASF off-network routing. For example, the subscriber may determine that certain outgoing calls should be blocked. That is, the subscriber may want to block the dialed NPA "800" from being accessed by network users. The SCP may then determine whether the subscriber blocks other numbers, e.g., NPA is "900" or NXX is "976", and block or route accordingly. Next the NPA-NXX may be utilized as the terminating location, and the originating location and terminating location are checked in the ASF off-network table. If each location is defined, the instructions for routing the call may be forwarded to the SSP. If the NPA-NXX is not predefined in the ASF off-network table, the NPA may be utilized as the terminating location, and checked in the table. Thus, all NPA-NXXs within an NPA are treated equally, albeit after exceptions have been tested. The ASF off-network table also includes a default entry for routing instructions when the originating/terminating pair are not listed in the table.

Referring to FIG. 2, terminating trunk 113 is shown as an ASF off-network trunk. Actually, the facilities arrangement may be one to six predefined routes. Further, another feature of the ASF off-network option is the integration of nonprivate network tandem switching, as discussed above. Thus, the ASF off-network option may instruct SSP 16 to use trunk 116, and when the call reaches SSP 13, switch translations may send the call to trunk 113, i.e., SSP 13 being utilized as a tandem switch.

One of the additional options available, which is discussed below, is the routing of calls in a manner similar to call forwarding methods disclosed in, e.g., commonly assigned, U.S. patent application Ser. No. 08/455,024, filed May 31, 1995, entitled "Apparatus and Method for Forwarding Incoming Calls", the disclosure of which is expressly incorporated herein by reference in its entirety. Thus, the service provisioning may allow the subscriber to define periods in which access will be made to certain facilities according to, e.g., time-of-day/day-of-week routing, specific date/day-of-year routing, percentage allocation routing, and combination routing.

Table 7A and 7B show two examples of Off-Network ASF tables that may be stored in a database of the SCP for use in routing intra- and inter-location destination calls.

With the data in Table 7B, after the network user dials the off-network access code and off-network telephone number, the SCP determines the appropriate routing for the call based upon the terminating NPAs, e.g., 314, 816, 011 and others, of the called number. Alternatively, Table 7A may be used when the SCP determines the appropriate routing based upon whether the call is inter- or intra-LATA. If the NPA of the terminating number matches an NPA in the off-network list, the call will be routed using the facility arrangement of up to six routes for that NPA. If the NPA of the terminating number does not match an NPA in the off-network list, the call will be routed using the "other" options. For example, a call originating from location 13 and terminating to a location indicated by NPA, e.g., 314364, will be routed using 112 as the primary trunk and EEE as the primary carrier (see, for example, Table 7B). In Table 7A and 7B, AAA may be the CIC for the IXC running IXC POP 201, BBB, CCC, and DDD may be the CICs for other IXCs, whose POPs are not illustrated in FIG. 2; and EEE may be the CIC for the local exchange carrier.

TABLE 7A

ASF Off-Network Routing Table (LATA)

| Orig. | Term. | PTG | ATG | SATG | PC | AC | SAC |
|---|---|---|---|---|---|---|---|
| 11 | 011 | | | | AAA | | |
| 11 | intra | | | | EEE | | |
| 11 | inter | | | | AAA | BBB | |
| 12 | 011 | 112 | | | AAA | | |
| 12 | intra | | | | EEE | | |
| 12 | inter | 112 | | | AAA | BBB | |
| 13 | 011 | 113 | | | CCC | | |
| 13 | intra | | | | EEE | | |
| 13 | inter | 113 | | | AAA | DDD | CCC |
| 14 | 011 | 114 | | | | | |
| 14 | intra | | | | EEE | | |
| 14 | inter | 114 | | | | | |
| 15 | 011 | | | | CCC | BBB | |
| 15 | intra | | | | EEE | | |
| 15 | inter | | | | BBB | AAA | CCC |
| 16 | 011 | 116 | | | | | |
| 16 | intra | | | | EEE | | |
| 16 | inter | 116 | | | | | |

In Table 7A, AAA may be the CIC for the IXC running IXC POP 201, and BBB, CCC, and DDD may be CICs for other IXCs whose POPs are not shown in FIG. 2. In addition, EEE may be a CIC for a local exchange carrier.

TABLE 7B

ASF Off-Network Routing Table (NPA)

| Orig. | Term. | PTG | ATG | SATG | PC | AC | SAC |
|---|---|---|---|---|---|---|---|
| 11 | 011 | | | | AAA | | |
| 11 | 314 | 111 | | | AAA | BBB | |
| 11 | 816 | | | | CCC | DDD | |
| 11 | other | | | | AAA | BBB | |
| 12 | 011 | 112 | | | AAA | | |
| 12 | 314 | 112 | | | EEE | | |
| 12 | 816 | | | | CCC | | |
| 12 | other | 112 | | | | | |
| 13 | 011 | 113 | | | AAA | DDD | CCC |
| 13 | 314 | | | | EEE | | |
| 13 | 314364 | 112 | | | EEE | | |
| 13 | 816 | | | | CCC | | |
| 13 | other | 113 | | | CCC | BBB | |

In Table 7B, AAA may be the CIC for the IXC running IXC POP 201, and BBB, CCC, and DDD may be CICs for other IXCs whose POPs are not shown in FIG. 2. In addition, EEE may be a CIC for a local exchange carrier.

For illustration, Table 7B assumes that the NPA of LATA 1 is 314, that the NPA-NXX of SSP 12 is 314364, and that 816 is the NPA of a another LATA (not shown in FIG. 2). Analyzing Table 7B, it is noted that SSP 11 via trunk 111 to SSP 13 assumes that SSP 13 will tandem the call to a proper public or private trunk for 314 traffic; that SSP 11 via trunk 111 to SSP 13 assumes that SSP 13 will tandem the call to trunk 112 for 314364 traffic; that SSP 12 via trunk 112 to SSP 13 assumes that SSP 13 will tandem the call to trunk 113 for 011 traffic; that SSP 12 via trunk 112 to SSP 13 assumes that SSP 13 will tandem the call to a proper public or private trunk for 314 traffic; and that SSP 12 via trunk 112 to SSP 13 assumes that SSP 13 will tandem the call to trunk 113 for other traffic.

Figure 6:
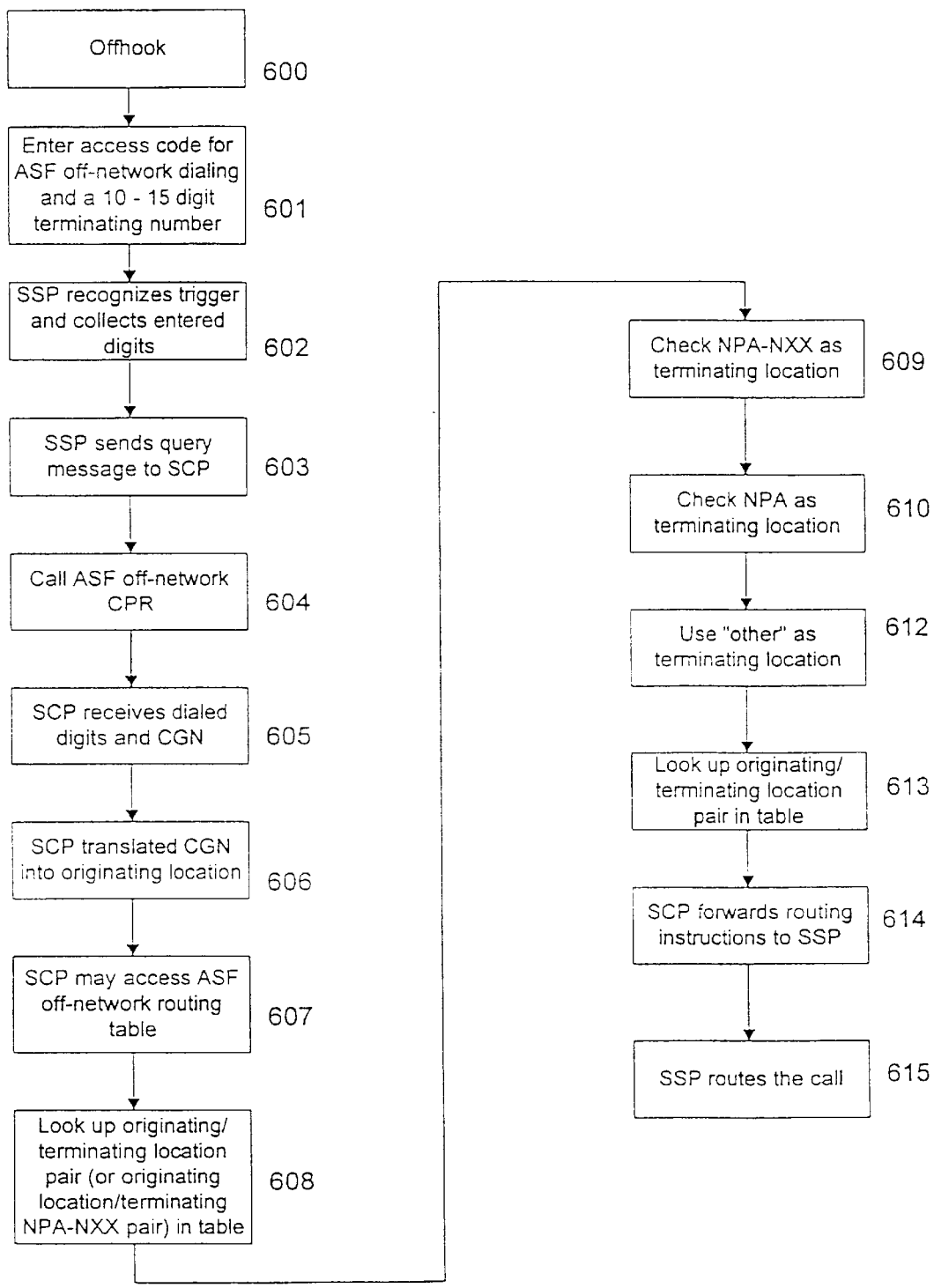
FIG. 6 illustrates an exemplary flow diagram of an off-network terminating call using predefined subscriber routing options.

FIG. 6 shows an exemplary flow diagram of a network originating call to an off-network destination using ASF. Assuming that a calling party at station 12A is offering a call for termination to a station off the network, e.g., (816) 999-9999, station 12A goes off hook at step 600 to originate the desired call. In step 601, the caller enters the access code for destination dialing off-network, e.g., "7", and a ten to fifteen digit telephone number of the terminating party, i.e., (816) 999-9999. The serving SSP, e.g., SSP 12, will recognize the dialing plan trigger, i.e., the access code indicative of off-network dialing, in step 602, and collect the entered digits. Of course, depending upon the serving SSP, the access code may be received by the SSP and a second dial tone (or stutter tone) may be returned to prompt the caller for the additional digits. Serving SSP 12 may then forward the data in an SS7 messaging query to the SCP in step 603. Because the trigger indicates that the call is destined for an off-network location, the query in step 604 triggers an ASF Off-Network CPR at the SCP. In step 605, the SCP translates the SS7 query message to receive the calling number (CGN) and the terminating number. In step 606, the SCP may access the table in the common service logic CPR to determine the location of the calling party from the CGN or may access the table in the common service logic CPR to determine the identity of SSP based upon the received SS7 SPC.

In step 607, the SCP may access the ASF off-network routing table, such as Table 7B, to determine the subscriber's predefined routing for this call. The SCP may look up the originating location and the terminating NPA-NXX of the dialed digits of the destination number in Table 7B in step 608. If the NPA-NXX is included in Table 7B, the instructions for routing may be forwarded to the triggering SSP in step 609. If the NPA-NXX is not included in the table, the originating location and the NPA of the destination number may be looked up in Table 7B in step 610. If NPA is shown, the instructions for routing may be forwarded to the SSP in step 611, if not shown, the default "other" listing may be used as the terminating location in step 612. From the originating/terminating pair, the predefined routing instructions may be found in step 613. From the example above, the off-network routing table may identify the predefined routing scheme for the call, e.g., the primary carrier is CCC (see, e.g., Table 7B). In step 614, the SCP may forward the routing information to triggering SSP 14 through an SS7 messaging response. The triggering SSP then routes the call as instructed by the SCP in step 615.

3. ASF Optional Features

As indicated above, ASF may include optional features similar to the call forwarding services disclosed in, e.g., commonly assigned U.S. patent application Ser. No. 08/455, 024, filed May 31, 1995, entitled "Apparatus and Method for Forwarding Incoming Calls". These optional features may allow the subscriber to tailor the facilities and carriers to be accessed according to, e.g., day, time, date, percentage use, etc.

Each of these optional features may make use of result codes unique to the originating location. In general, a call progresses through a series of decisions for the selected options until reaching the bottom of the service logic section where a result code may be assigned to each path through the decision logic. Paths may share result codes, e.g., where the ASF off-network option (LATA) and, e.g., Day-Of-Week (DOW)/Time-Of-Day (TOD), are present, Monday 8:00 am to 5:00 pm may share the same result code as Tuesday 8:00 am to 5:00 pm and Wednesday 9:00 am to 7:00 pm. Result codes may be anything that will not be confused with the basic or alternative NPA-NXX off-network ASF features.

While tables may be utilized for decision criteria, the optional features may also be entered into the common service logic CPR as call variables.

a. Time-of-Day/Day-of-Week Routing

Time-of-Day (TOD)/Day-of-Week (DOW) routing feature may allow the subscriber to specify up to, e.g., ten different TOD/DOW options for routing inter-LATA call traffic. According to this option, the subscriber may predefine a specific time of day or a range of time within the day in which alternative facilities/carriers are selected in lieu of the normal ASF facilities/carriers. Thus, the TOD/DOW may also include a default entry which will instruct the SCP to route calls during non-TOD/DOW periods.

For example, call variables may be stored within the common service logic in a database of the SCP to specify the subscriber's TOD/DOW parameters for alternative (optional) ASF routing of inter-LATA calling traffic. The call variables may include starting times and ending times for routing, starting days and ending days for routing, and a result code. The originating location and the result code may then access a table similar to, e.g., Table 7A or 7B, in order to determine the facility arrangement for terminating the offered call. The routing instructions indicated by the result code may include trunk group IDs to a carrier POP and/or a carrier selection, as discussed above with regard to on-network or off-network ASF.

b. Specific Date/Day-of-Year Routing

Specific date (DATE)/Day-of-Year (DOY) routing feature may allow the subscriber to specify up to, e.g., ten different DATE/DOY options for routing inter-LATA call traffic. According to this option, the subscriber may predefine a specific date or a range of dates within the year in which alternative facilities/carriers are selected in lieu of the normal ASF facilities/carriers. An "other" option is also provided as a default entry in which during non-date/DOY periods the normal ASF facilities/carriers may be selected for routing call traffic.

For example, call variables may be stored within the common service logic CPR in a database of the SCP to specify the subscriber's DATE/DOY parameters for alternative (optional) ASF routing of inter-LATA calling traffic. The call variable may include a specific date, i.e., month and day, for routing and a result code. The originating location and the result code may then access a table similar to, e.g., Table 7A or 7B, in order to determine the facility arrangement for terminating the offered call. The routing instructions indicated by the result code may include trunk group IDs to a carrier POP and/or a carrier selection, as discussed above with regard to on-network or off-network ASF.

c. Percentage Allocation Routing

Percentage allocation routing allows the subscriber to route inter-LATA call traffic according to the amount of traffic. According to this option, the subscriber may predefine a specific percentage of calls that will be routed to specified alternative facilities/carriers. The subscriber may define, e.g., five percentage amounts; however, for any number of permissible percentage amounts, the total of the percentage amounts must equal 100%. It is noted that there is no "other" or default carrier for this option.

For example, call variables may be stored within the common service logic CPR in a database of the SCP to route inter-LATA calls based upon the amount of traffic. The call variables may include the percentage of allocation of calls to be routed and a result code. The originating location and the result code may then access a table similar to, e.g., Table 7A or 7B, in order to determine the facility arrangement for terminating the offered call. The routing instructions indicated by the result code may include trunk group IDs to a carrier POP and/or a carrier selection as discussed above with regard to on-network or off-network ASF. In all cases, the total percent allocation equals 100%.

d. Combination Routing

Combination routing allows the subscriber to define an ASF service that is a combination of the above-described optional features.

e. With Function Dialing

As an additional option, the ASF on-network and ASF off-network features may be utilized for routing function dialing numbers. As described above, the function dialing number may be translated by the SCP into a ten digit terminating number. The SCP, using ASF for determining a predefined routing scheme, may access the ASF on-network table, e.g., Table 6. The SCP, using the translated ten digit terminating number, may determine the terminating location for the terminating number, as discussed above. The SCP may then search the ASF on-network table for the predefined routing scheme for the originating/terminating location pair. If a predefined routing scheme is found in the ASP on-network table, the function dialing call may be routed accordingly.

When the SCP does not find the originating/terminating location pair in the ASF on-network table, the SCP may then access the ASF off-network table, e.g., Table 7A. As discussed above, the SCP may determine the terminating location by determining whether the translated terminating number is international, inter-LATA, or intra-LATA. The SCP may then search the ASF off-network table for the predefined routing scheme for the originating/terminating location pair. The call may then be routed according to the routing schemes defined in the ASF off-network table.

C. Centralized Access to Facilities

Centralized Access to Facilities (CAF) may be conceptualized as two distinct options with certain commonality. The CAF option may be implemented by service logic or CPR stored in a database in SCP 101. The two options may be referred to as CAF-Tie Line (TL) and CAF-Dial Plan (DP). In general, CAF-TL may be thought of as an option for directly accessing a specific set of up to six facility routes: up to three private trunk groups and up to three carriers. However, CAF-DP may be thought of as an option for accessing the dialing plan of a switch in the private network remote from the calling party's local switch, and then using the dialing plan of the remote switch.

The CAF optional feature may permit subscribers who have made a substantial financial investment in an existing telephone service, e.g., dedicated facilities, to retain their dedicated facilities, if desired. The CAF feature enables network users to access the subscriber's private facilities or the PSTN. This feature differs from ASF in that routing instructions may be determined in ASF according to a subscriber predefined routing table, whereas in CAF the subscriber may explicitly choose how the outgoing call will be routed.

The CAF feature predefines a dialing plan number for accessing private/public facilities, e.g., "8". The subscriber may purchase a ten digit telephone number from existing tariffs to reach the specified private/public facilities, e.g., 1FB or 800- number. Due to certain limitations of the hardware, if more than ninety-nine simultaneous users are anticipated from a 5ESS switch, a 10 digit trigger may be required. All calls attempting to access CAF may be screened to determine whether the caller is authorized to access this feature. Thus, this feature allows billing/accounting information to be maintained according to the extension number of the authorized caller.

1. CAF-TL

Direct access to private/public facilities may be obtained by dialing a predefined access code, e.g., 8, which the local SSP will recognize as an AIN trigger. However, there may be a separate access code for each facility arrangement. Referring to the example of FIG. 2, the private network would need two CAF-TL access codes to be defined, i.e., one for trunk 121 from SSP 13 to PBX 11C, e.g., 81, and one for trunk 122 from SSP 13 to PBX 12C, e.g., 82. Normally, CAF-TL access codes may start with the same digit, e.g., 8, and be of uniform length, however it is not necessary. The access codes must be unique in the private network dialing plan, and the lead digit should be unique to CAF. Each defined access code requires a CAF-TL trigger on SSP 13 for SSP 11, SSP 12, SSP 14, SSP 15, and SSP 16 to access. For example, CAF-TL trigger 141 may be associated with access code 81 for trunk 121 from the other network SSPs, and CAF-TL trigger 142 may be associated with access code 82 for trunk 122 from the other network SSPs. CAF-TL trigger 141 and CAF-TL trigger 142 may be associated with a 10 digit telephone number (TN). Thus, station 13A and station 16A may pick up their respective phones, hear a dial tone, enter access code "81" for trunk 121, hear a second dial tone, dial ten to fifteen digits, hear ringing, and connect to the called number (CDN).

When a call originates from station 13A, the caller picks up the phone and hears a dial tone from SSP 13. Station 13A may dial access code 81 for trunk 121. Service switching point 13 may send a query to SCP 101. Service control point 101 may instruct SSP 13 to provide a second dial tone and collect 10 to 15 digits. The SSP 13 provides the second dial tone, and the caller enters the terminating number digits, which are forwarded to SCP 101 by SSP 13. The SCP may look in a table for facility arrangement 81 and find only primary trunk group 121 is predefined, i.e., all other entries are blank. The SCP instructs SSP 13 to use PTG 121 and outpulse 10 to 15 digits. The SSP 13 connects to trunk 121 and outpulses 10 to 15 digits. The PBX 11C rings, the called party answers and the call is completed. This is an example of CAF-TL.

When a call originates from station 16A, the caller picks up the phone and hears a dial tone from SSP 16. Station 16A may dial access code 81 for trunk 121. Service switching point 16 may send a query to SCP 101. Service control point 101 may instruct SSP 16 to redirect to 10 digit TN for CAF-TL 141. The SSP 16 may use trunk 20 to connect to SSP 13. The SSP 13 detects call attempt to the 10 digit TN for CAF-TL 141 and sends a query to SCP 101. The SCP instructs SSP 13 to provide a second dial tone and collect 10 to 15 digits. The SSP 13 provides the second dial tone, and the caller enters the terminating number digits, which are forwarded to SCP 101 by SSP 13. The SCP may look in a table for facility arrangement 81 i.e., the particular arrangement of the facilities/carrier associated with the access code entered by the caller and find only primary trunk group 121 is predefined, i.e., all other entries are blank. The SCP instructs SSP 13 to use PTG 121 and outpulse 10 to 15 digits. The SSP 13 connects to trunk 121 and outpulses 10 to 15 digits. The PBX 11C rings, the called party answers and the call is completed. This is an example of CAF-TL.

When subscribing to CAF, subscribers may define, e.g., six facilities and carriers, e.g., trunk groups or IXCs, per facility group. For example, subscriber may select facilities and carriers from the group including, e.g., Primary Trunk Group (PTG), Alternate Trunk Group (ATG), Second Alternate Trunk Group (SATG), Primary Carrier (PC), Alternate Carrier (AC), and Second Alternate Carrier (SAC). To properly arrange the facilities, at least one route should be populated, and that at least one route should be either PTG or PC. Additionally, an ATG must be preceded by a PTG; an SATG must be preceded by an ATG; an AC must be preceded by an SAC; and an SAC must be preceded by an AC.

Referring to FIG. 2, SSP 13 may be equipped with CAF capabilities with private tie line trunks connected to SSP 11 and SSP 12, both outside of LCS 61. Because dialing plan abbreviated numbers are routed over the PSTN, toll charges accrue when on-network calls originating within LCS 61 are directed to calling stations located outside of LCS 61. Thus, subscribers may desire that network users call locations within the network via private trunk groups with CAF.

Table 8 shows an example of a CAF access table which may be stored in the SCP. As shown in the table, the originating location may be the primary key, but the access code is also a key. When the table is accessed, the other eight columns are all retrieved. For CAF-TL, the validity column may indicate "proceed" or "redirect". When the CAF service logic sees "proceed" it knows that it has a CAF-TL situation and the originating location is the host for the facility arrangement and knows that at least one of the six columns has an entry. When the CAF service logic sees "redirect", it knows that it may have a CAF-TL or a CAF-DP situation. In the case of CAF-TL, the originating location may not be the host to the facilities so the service logic will use the CAF TN to redirect the call to that number on the SSP that is the host and has a trigger.

Figure 7A:
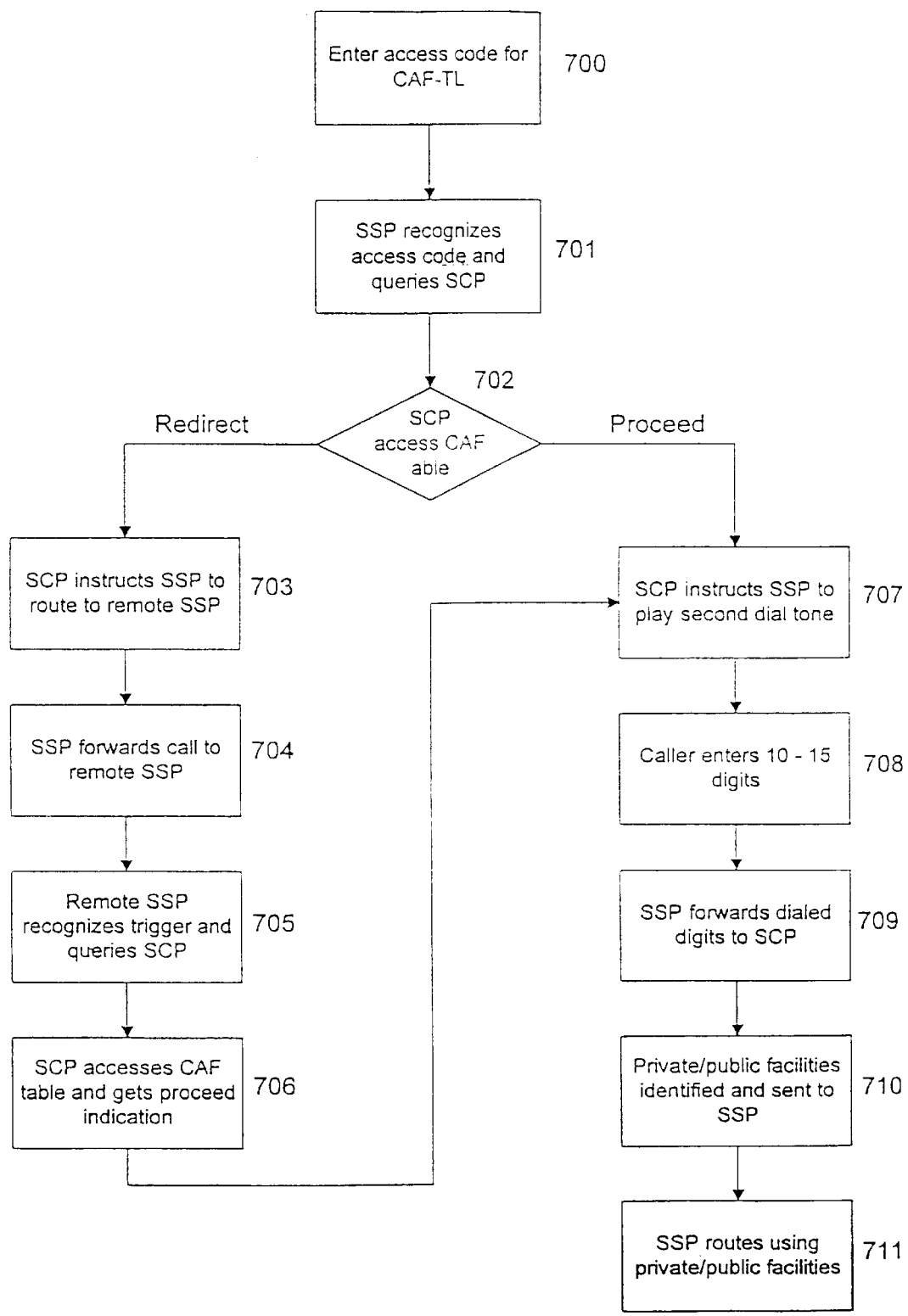
FIG. 7A illustrates an exemplary flow diagram of call processing for an offered call using the centralized access to private/public facilities service tie line option.

FIG. 7A shows an exemplary flow diagram of call processing for the CAF-TL feature. In step 700, the calling party may enter the access code for CAF-TL, e.g., "81". In step 701, the SSP may recognize the access code and may query the SCP. The SCP, in step 702, may access the CAF table, e.g., Table 8, to determine whether to "proceed" or "redirect" the CAF-TL request. If the CAF access table indicates "redirect", the service logic may proceed to step 703 where the SCP may instruct the SSP to route to a remote SSP indicated by the associated CAF telephone number. In step 704, the SSP may forward the call to the remote SSP, and the remote SSP may recognize the trigger and query the SCP in step 705. In step 706, the SCP may access the CAF access table, e.g., Table 8, which will indicate "proceed".

Whether the "proceed" indication is received in response to step 702 or step 706, the service logic may respond to the "proceed" indication by proceeding to step 707. In step 707, the SCP may instruct the SSP to play a second dial tone, which may prompt the calling party to input ten to fifteen digits in step 708. In step 709, the SSP may forward the dialed digits to the SCP, and private/public facilities may be identified and sent to the SSP in step 710. In step 711, the SSP may route the call using the identified facilities.

2. CAF-DP

The Centralized Access to Facilities-Dial Plan (CAF-DP) feature may be optionally utilized, for example, to allow subscribers to access the dialing plan at remote SSPs in the multiple location, communications network. Access to dialing plan may include station to station dialing and optional

TABLE 8

CAF Access Table

| Orig. Loc. | AC | Validity | CAF TN | PTG | ATG | SATG | PC | AC | SAC |
|---|---|---|---|---|---|---|---|---|---|
| 11 | 81 | redirect | 3339871234 | | | | | | |
| 11 | 82 | redirect | 3339871235 | | | | | | |
| 11 | 83 | redirect | 3339871236 | | | | | | |
| 13 | 81 | proceed | | 121 | | | AAA | | |
| 13 | 82 | proceed | | 122 | | | BBB | AAA | |
| 13 | 83 | blocked | | | | | | | |
| 16 | 81 | redirect | 3339871234 | | | | | | |
| 16 | 82 | redirect | 3339871235 | | | | | | |
| 16 | 83 | redirect | 3339871236 | | | | | | |

Using CAF-TL, when a caller from a location within the network accesses a private trunk group directly out of the local SSP, a ten to fifteen digit number may be dialed, depending on the type of switch, either immediately or after receiving a second dial tone. For example, assuming that a calling party at station 13A (in FIG. 2) is calling station 14A, station 13A may dial the CAF-TL access code, e.g., "81", to access the CAF-TL facility arrangement. Because station 13A accesses a private trunk line from its local SSP 13, a ten to fifteen digit number, e.g., dialing a station in a foreign country, may be entered upon receiving the second dial tone.

As a further example, assume that a calling party at station 16A wants to call station 11B over the private facilities. Because the local SSP serving station 16A is not directly tied to the private facilities, the caller may use CAF-TL to directly access the private facilities tied to SSP 13 by dialing the CAF-TL access number. Station 16 may dial "81" to be routed over trunk 20 to CAF-TL 141 at SSP 13. A second dial tone may now be played from SSP 13 at SCP 101's direction. The SCP 101 may instruct SSP 13 to use trunk 121 and to send the 10 collect digits. Private branch exchange 11C may receive the 10 digits via trunk 121 and tandem them to SSP 11 for translation and then ring 11B.

features FD, ASF-On, and ASF-Off, if they are available to stations hosted by that SSP. Thus, this optional feature allows subscribers with remote central offices that are not equipped with certain options to gain access to those optional features through an appropriately provisioned central office using CAF.

In predefining CAF-DP, an access code unique from the CAF-TL access code, e.g., "83", and a dedicated CAF telephone number must be established so that non-equipped offices may access the optional features through the equipped central office. Once access to the remote switch is gained, the caller may, e.g., access service options available through the CAF-DP switch, e.g., to dial on-network stations and/or utilize predefined ASF routes.

For CAF-DP, the validity column will always indicate either "redirect" or "blocked". In the case of a "redirect" encountered using CAF-DP, the service logic may use the CAF TN to redirect the call to that number on the SSP that is the CAF-DP host and has a trigger. When the CAF service logic sees "blocked", it knows that it has a CAF-DP situation and the access code dialed is the one used by other locations to get redirected to the originating location's dialing plan. It should have been blocked at the SSP, but if it gets here, CAF service logic for this CAF-DP situation will ensure that the call is given a blocking announcement.

Using CAF-DP, when a caller, e.g., at station 11A, attempts to access the private network but its local SSP does not have direct access to the private facilities, the call is first directed to an SSP directly tied to the private facilities by dialing the designated CAF-DP access number, e.g., "83". The call will then be redirected according to the CAF table to, e.g., 3339871236. For example, assume that a calling party at station 16A wants to call station 11B over the private facilities. Because the local SSP serving station 16A is not directly tied to the private facilities, the caller may use CAF-DP to directly access the private facilities tied to SSP 13 by dialing the CAF-DP access number.

Typically, CAF-DP may always enable access for station to station dialing and avoid or prevent routing to or through tandem switches and paths that may increase toll charges. For example, referring to FIG. 2, assuming station 15A calling station 12A, the call would be a toll call, via trunk 21, tandem 31, and trunk 22. Assuming station 13A calling station 12A, the call would be a lower toll call, via trunk 22 to SSP 12 if trunk 112 did not exist or was not available. Toll charges for the call from station 15A to station 12A could be reduced if station to station access was provided (such as the call from station 13A to station 12A) and to avoid routing through tandem 31.

Now, assuming that station 15A dialed an access code 83, and 83 was defined in the dialing plan as the CAF-DP 131 TAT trigger, the call would go from SSP 15 to SSP 13 via toll free calling trunk 20. The SSP 13 would provide a second dial tone to station 15A and the calling party at station 15A would dial the terminating number associated with, for example, station 12A. The SSP 13 would send the call via trunk 22 to SSP 12 if trunk 112 did not exist or was not available. This would reduce toll charges for the 15A to 12A call from, e.g., $1.00 to $0.50. Thus, under certain conditions, remote dialing plan access to station to station dialing may benefit the subscriber.

If the subscriber also subscribed to function number dialing, the calling party could enter the function number after receiving the second dial tone from the remote SSP, i.e., CAF-DP 131. If function numbers with appended location codes are part of the subscriber's private network, e.g., 6-CONF, then dialing "6-CONF" at SSP 15 would terminate at "6-CONF-15", while dialing "6-CONF" after receiving the second dial tone from the remote SSP, i.e., CAF-DP 131, the caller would be connected to "6-CONF-13". This particular feature would be useful to station 1SA when the caller plans to go to location 13 and host a meeting. Alternatively, station 15A could dial "6-CONF-13" for a similar connection.

If ASF on-network option is part of the subscribed private network for station to station dialing and function numbers are assigned to SSP 13 but function numbers are not assigned to SSP 15, then the caller at station 15A may take advantage of the function number dialing at SSP 13. Assuming that SSP 15 has no ASF trunks, calls from station 15A to station 12A would be terminated over public facilities, the universal default for the ASF on-network option. However, when station 15A dials "83" to access the CAF-DP 131 TAT, the terminating number associated with station 12A may be dialed after the second dial tone. The SSP 13 and SSP 12 are shown in FIG. 2 as coupled with ASF trunk 112. The SSP 13 routes the CAF-DP dialed call to station 12A over ASF trunk 112 as if station 13A had dialed station 12A. Finally, if SSP 13 may implement the ASF off-network option, stations going through CAF-DP 131 may get access to the option. Trunk 113 may be an ASF off-network trunk that goes to a foreign NPA. Thus, dialing "7" at the second dial tone, the calling party may receive a third dial tone to which station 15A could be in 10 to 15 digits. If service logic determines that the call goes to trunk 113, SSP 13 may receive instructions to route the call there. If the ASF off-network option does not have a route for it, the default would be to use "other", which would be via public facilities because of the CIC in the ASF off-network table.

In CAF-DP, there needs to be a separate access code for each SSP whose DP is going to be accessible to other switches. In the example of FIG. 2, only access to the dial plan at SSP 13, e.g., CAF-DP 131, is shown. The access code may be, e.g., 83, 813, 42, etc. It is noted that the same starting digit for all CAF access digits conserves digits in the dialing plan. Every SSP may host a CAF-DP trigger if desired. However, if station 13A dials "83", the caller may be blocked by an announcement because the caller at station 13A is already connected to SSP 13 by picking up the telephone. Further, while the dialing plan defines "83" as the CAF-DP access code, SSP 11 may be blocked from dialing 83 at both SSP 13 and SCP 101 (as a backup), if it did not make sense for SSP 11 stations to access the CAF-DP at SSP 13 since an ASF trunk 11 couples SSP 11 and SSP 13.

Table 8, as discussed above, is an example of a table that may be stored in a database of the SCP to provide CAF. The table includes the access code for the selected features, e.g., 81 and 82 for CAF-TL and 83 for CAF-DP. From the standpoint of CAF-DP, only the first four columns of Table 8 are relevant. That is, because CAF-DP enables a caller from a location not provisioned with certain subscribed services to access those services through the CAF-DP option, the identification of trunk groups and carriers is not relevant to this option.

Figure 7B:
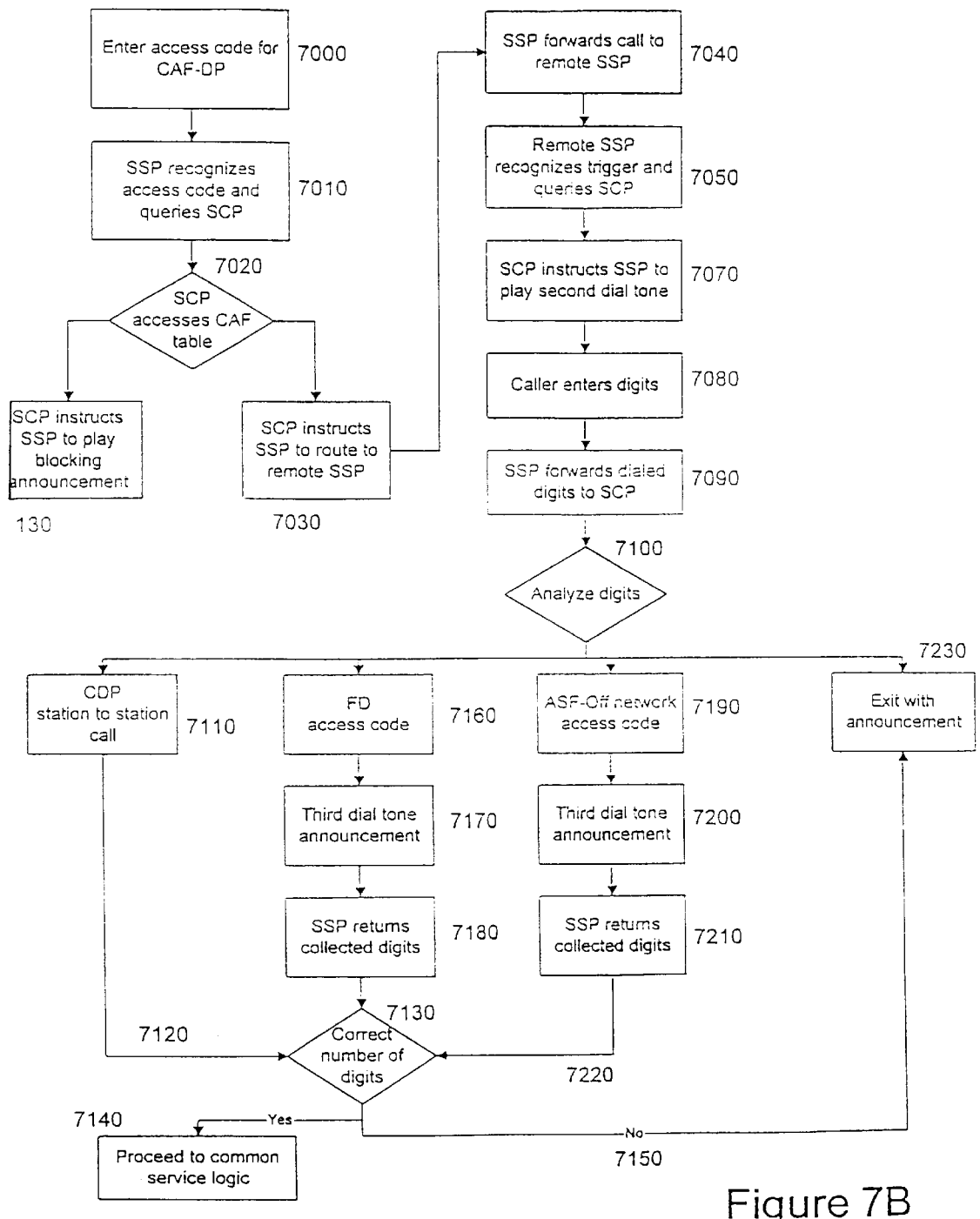
FIG. 7B illustrates an exemplary flow diagram of call processing for an offered call using the centralized access to private/public facilities service dial plan option.

FIG. 7B shows an exemplary flow diagram of call S processing for CAF-DP. For purposes of illustration, the preliminary dialing procedures and dialing options are not discussed within this example. In step 7000, the access code for CAF-DP, e.g., "83", may be entered by the calling party. In step 7010, the SSP recognizes the access code as an AIN trigger and launches a query to the SCP. In step 7020, the SCP may receive the AIN query containing the CGN and the dialed digits, i.e., the calling party number and access code digits. The SCP may then translate the ten digit CGN to determine the originating location and then use the originating location and dialed access code to access the CAF access table, e.g., Table 8, to determine the action to take, e.g., "proceed" (CAF-TL only); "redirect" (CAF-TL and CAF-DP); and "blocked" (CAF-DP only). If the CAF access table indicates "block" (i.e., the caller is directly tied to the SSP associated with the entered access code), then the SCP may instruct the SSP to play a blocking announcement in step 7130.

If the CAF access table indicates that the request is to be redirected to the associated CAF number, then the SCP may instruct the SSP to route to the remote SSP associated with the CAF number in step 7030. Thereafter, in step 7040, the SSP may forward the call to the remote SSP, and the remote SSP may recognize the trigger and query the SCP in step 7050. In step 7070, the SCP may instruct the SSP to play a second dial tone to prompt the calling party to enter digits, e.g., an abbreviated number. After the caller has entered digits or the abbreviated number at step 7080, the SSP may forward the dialed digits to the SCP in step 7090. The SCP may then analyze the dialed digits, in step 7100, to determine further call processing steps.

For example, if the SCP recognizes that, in response to the second dial tone in step 7070, the caller entered an abbreviated DP number, the service logic may proceed to step 7110 to further process the offered call. In step 7120, the service logic proceeds to step 7130.

If the SCP recognizes that, in response to the second dial tone in step 7070, the caller entered the function dialing access code, the service logic may proceed to step 7160 to further process the offered call. In step 7170, a third dial tone may be played by the SSP to prompt the caller for the desired function number. In step 7180, the SSP may return the collected digits, and in step 7130, the SCP may determine whether the correct number of digits has been entered. If the SCP determines that the correct number of digits were entered, the service logic, in step 7140, may proceed to the common service logic. However, if the SCP determines that an incorrect number of digits were entered, the service logic, in step 7150, may proceed to step 7230.

If the SCP recognizes that, in response to the second dial tone in step 7070, the caller entered the ASF-Off access code, the service logic may proceed to step 7190 to further process the offered call. In step 7200, a third dial tone may be played to prompt the caller to enter an off-network terminating number. In step 7210, the SSP may return the collected digits to the SCP. In step 7220, the service logic may proceed to step 7130.

If the SCP does not recognize the digits entered by the calling party in step 7080, or if the SCP determined, in step 7130, that an incorrect number of digits were entered, the service logic may proceed to step 7230. In step 7230, the SCP may instruct the SSP to play an exit announcement, e.g., "Please hang up, check the number, and try again."

D. Outgoing Call Screening

The Outgoing Call Screening (OCS) feature is an optional feature available to the subscriber with a dialing plan either individually or with any other features, e.g., FD, ASF-On, ASF-Off, CAF-TL, CAF-DP, etc. The OCS option may be implemented by service logic or CPR stored in a database in SCP 101. This optional feature ensures that the caller accessing the particular service is authorized to do so. According to this feature, each network station may be assigned a "privilege class" that will denote the station's authority to utilize certain screened features. Additionally, each individual may be assigned an "authorization code" that will denote the individual's authority to override the OCS. The subscriber may place restrictions on some or all of the lines. In general, the available features, from which access may be gained or restricted, may include, e.g., the public network and/or private facilities.

The subscriber may determine, per station, which of the above features each particular station may access. If a user attempts to access a feature from a station that is not authorized for that feature, an announcement, or other warning or informational statement, may be played to prompt the user to enter an authorization code. Entry of an appropriate authorization code may override the screening feature, thus, enabling an authorized caller to place a call from a restricted station.

Privilege classes are concerned with where an originating station may call. In general, it is a matter relating to the types of calls, e.g., local calls versus international calls. According to the present invention, call types are made more difficult by the existence of a lot of features that involve public and private facilities and different "to" locations. As shown in FIG. 8, the OCS may support up to 14 call types which may be variously grouped in one of, e.g., 35 privilege classes.

Conceptually, OCS first determines the type of calls an originating station may make, i.e., call types, assigns a privilege class to the combination of call type (if one does not already exist) and assigns that privilege class to the originating station. In use, the private network determines how to complete the call and sets some call variables to mark its attributes, e.g., international, then it goes to OCS service logic where any additional attributes needed to determine the call type are derived. The call type of the call is then determined. The OCS privilege class of the CGN is looked up in a table stored in the database of SCP 101, such as that shown in, Table 9. The privilege class call type table, e.g., FIG. 8, may be checked to determine if the call type of the call is part of the CGN's PC. If it is, the call continues. If it is not, the call is blocked unless the subscriber has the authorization code option, which permits the OCS to be overridden.

The authorization code is assigned to the individual who also happens to have the work TN shown. For performance reasons, valid authorization codes may be stored in an authorization code table along with the privilege class assigned to the individual. Table 10 is an example of an authorization code table. The authorization code table may be stored in a database of the SCP 101. The type of call made by the CGN may be checked against the call types making up the privilege class for the authorization code. If valid, the service logic may format the final response to the switch. If invalid, the service logic can permit multiple authorization code validation attempts.

As shown in FIG. 8, an explanatory table defining privilege classes is shown which may be stored in a database of the SCP 101. A privilege class may define everything that a station can do. Note that a privilege class may be a two digit number which indicates a combination of On-network intra-LATA private facilities; On-network intra-LATA private/public facilities; On-network inter-LATA private facilities; On-network inter-LATA private/public facilities; Off-network intra-LATA private facilities; Off-network intra-LATA private/public facilities; Off-network inter-LATA private facilities; Off-network inter-LATA private/public facilities; Off-network international private facilities; Off-network international private/public facilities; Off-network (NANP) intra-LATA private facilities with 900-, 976-, and 555 service blocking; Off-network (NANP) inter-LATA private facilities with 900-, 976-, and 555 service blocking; Off-network (NANP) intra-LATA private/public facilities with 900-, 976-, and 555 service blocking; and Off-network (NANP) inter-LATA private/public facilities with 900-, 976-, and 555 service blocking.

TABLE 9

OCS Privilege Class Table

| Work TN | Priv. Class |
|---------|-------------|
| 2139781111 | 21 |
| 2139782222 | 10 |
| 2139783333 | 2 |
| 2139784444 | 35 |

TABLE 10

Authorization Code Table

| Auth. Code | Priv. Class |
|------------|-------------|
| 432157 | 21 |
| 372166 | 10 |

TABLE 10-continued

Authorization Code Table

| Auth. Code | Priv. Class |
|---|---|
| 839047 | 2 |
| 497010 | 35 |

Because authorization codes may be used to determine identity and access privilege, it is necessary that each user be assigned a unique authorization code. An authorization code may be, e.g., six to nine digits in length, but all authorization codes within a single multiple location, communications network should be of the same length. Further, to ensure uniqueness among the authorization codes, it is advisable not to allow users to directly modify their own authorization codes.

Figure 9:
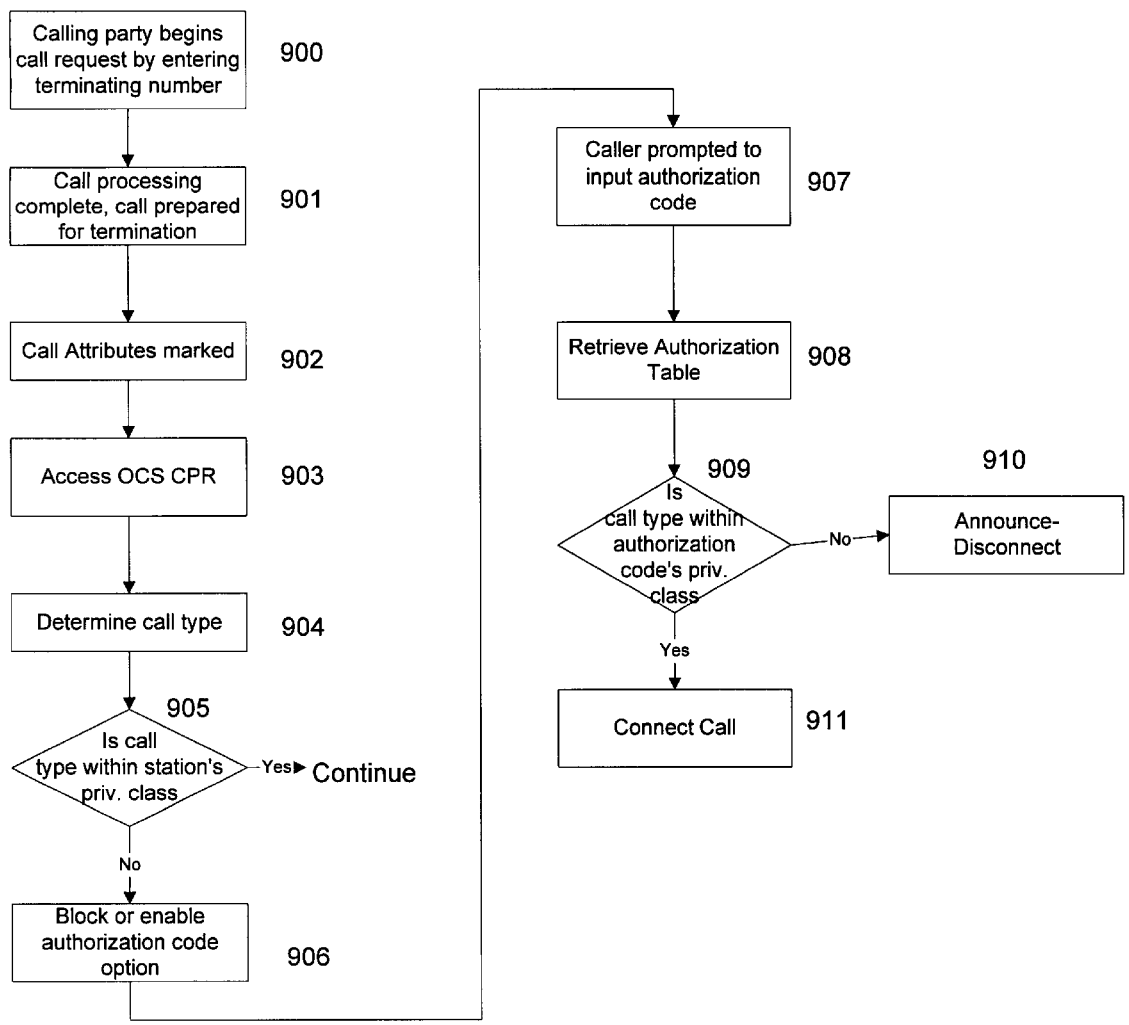
FIG. 9 illustrates an exemplary flow diagram of call processing for an offered call using an outgoing call screening service.

FIG. 9 shows an exemplary flow diagram of placing a call with Outgoing Call Screening (OCS) feature. To facilitate the explanation of this example, the preliminary call features and steps will not be discussed here. If the OCS feature is subscribed to by the subscriber, the screening feature may occur after all other originating features have added their value to the call and before the packaging of routing instructions for the SCP 101's response to SSP 11–16 begins. Accordingly, the calling party begins a call request by entering a terminating number, in step 900. In step 901, the SCP 101, via SSP triggering and AIN querying, determines how to complete the call. In step 902, certain call attributes e.g. international call, may be marked by the SCP 101. In step 903, the OCS logic or CPR in SCP 101 takes over and determines what privilege class has been assigned to the originating station by retrieving the privilege class of the calling party (i.e. work TN or CGN) from the privilege class table, for example, Table 9. The definitions provided in the privilege class definition table (such as FIG. 8) may then be used to determine what call types are permitted. In step 904, the OCS determines whether the call is of the type within the CGN's privilege class. If the call type is within the CGN's privilege class, in step 905, the call continues. If not within the CGN's privilege class, in step 906, the call may be blocked or, if subscribed to, the authorization code option may be enabled.

Assuming that the subscriber's network includes the authorization code option, in step 907, the caller may be prompted for and input an authorization code. In step 908, the OCS retrieves the authorization table (such as Table 10) and determines, in step 909, the type of calls that make up the privilege class for the entered authorization code. If the privilege class associated with the authorization code entered does not allow the call type, the call may be discontinued in step 910 with a disconnect announcement being played to the calling party. If the privilege class associated with the authorization code entered allows the call type, the call may be continued in step 911.

In general, authorization code override is only effective when the caller is not calling from the assigned work TN. That is, the work TN privilege class and the authorization code will generally be the same, however this is not absolutely necessary.

It is noted that the authorization code entry procedure may also include additional steps in which an invalid authorization number may be re-entered multiple times as may be desired by the customer to avoid mistakes due to misentry of the digits.

E. Work-at-Home

Work-at-home (WAH) is an optional feature of the dialing plan basic service that allows a subscriber to authorize certain users to access the multiple location, communications network from their homes, on a call-by-call basis, and to automatically route calls to their office stations directly to their residential telephone numbers. The WAH option may be implemented by service logic or CPR stored in a database in SCP 101.

Accessing WAH is done by the user, at home dialing a seven to ten digit dedicated WAH telephone number, referred to as a "WAH trigger". The dedicated WAH telephone number, e.g., 1FB, 800-, may be purchased from existing tariffs to give an authorized user access to the multiple location, communications network from his/her home telephone.

Users may also be assigned a WAH access telephone number based upon the central office serving their work telephone number (i.e., a host central office), and may be required to dial a WAH TAT pre-assigned to them in order to gain access to all service features that they are entitled to at work. The reason for this is that when the caller accesses the private network through the same SSP as the work TN, the user is already familiar with the various services and features available through the work station, e.g. function dialing, CAF-DP blocking, etc. Thus, the WAH access telephone number acts as a "WAH trigger" to launch a query from the host central office to the SCP. It is noted that some SSPs may require multiple WAH triggers in host central offices. If more than ninety-nine simultaneous WAH users are anticipated at any given time, a ten digit trigger will resolve the problem. Further, WAH calls may be billed to the work telephone number of the home TN placing the call.

The WAH feature may include three basic service components: placing a WAH call; terminating a WAH call; and updating the WAH indicator.

Terminating a WAH call may be the most straight-forward basic service component. A WAH CPR may include an indicator for indicating whether the WAH feature has been enabled. When the WAH feature is not enabled, a call to a work TN will be directed to the called work TN. However, when WAH has been enabled, calls to the user's work TN may be forwarded to the user's home TN. The WAH terminating trigger may be part of an originating trigger CPR. The transfer from the trigger CPR to the WAH CPR goes through a "transfer in" graph according to the type of SSP triggering the service. The "transfer in" graph may also check a WAH terminating table to check the current values of the WAH indicator and home TN for the key, the work TN with the terminating trigger.

The placing a WAH call component and the updating the WAH indicator component may be intermingled. Both components are initiated by dialing a WAH trigger TN. Upon initiation, certain choices may be made by the caller, including, e.g., activating the WAH feature, deactivating the WAH feature, placing a call from home through the private network.

The major difference between WAH and the other optional features is that placing a WAH call originates at the caller's home. The originating party must first access the WAH feature by dialing the WAH trigger number assigned to their local SSP for their work TN. For example, if a calling party at station 14B (a home TN) was the user associated with station 15A and wanted to access WAH, the party would first dial the WAH trigger number designated to SSP 15, i.e., WAH 155. By selecting the option of placing a call on the network, the caller's home telephone becomes an appended or attached part of the private network through SSP 15. of course, station 14B could access WAH by dialing the WAH trigger 154, however the caller may not be familiar with the peculiarities that may exist at that switch.

Once access is gained, i.e., the WAH query is launched to the SCP to access and execute the WAH CPR, the caller may be prompted to select an option, e.g., activate/deactivate WAH feature, place an outgoing business-related telephone call, etc. When activated, the WAH feature will forward the user's network station calls to the user's home telephone number. To ensure proper implementation, authorization and forwarding of calls to be terminated at the user's office station, the WAH user's residential telephone number must be provided to the service provider for properly implementing the WAH service.

The WAH feature relies on the CGN being available because it is carried through the SS7 network. Because this feature may be activated from the user's home telephone, the user's home telephone number should be stored in an SCP access table, such as Table 11. The SCP may access this table to grant access and to restrict access, thus, reducing fraud and unauthorized calls. Because the WAH feature may be deactivated from the user's network station, the user's work TN should also be stored in the table.

Table 11 includes two columns: authorized TN and work TN. The authorized TN may include both the authorized home TNs and work TNs that may access the WAH feature. The work TN column may list the work TN associated with the authorized number. Thus, when the listed authorized TN is the user's assigned work TN the two columns will list the same telephone numbers.

TABLE 11

WAH-Access Table

| Authorized TN | Work TN |
|---|---|
| (213) 978-1111 | (213) 432-7777 |
| (213) 432-7777 | (213) 432-7777 |
| (213) 876-8888 | (213) 876-8888 |
| (213) 978-2222 | (213) 876-8888 |
| (213) 978-3333 | (213) 456-9999 |
| (213) 456-9999 | (213) 456-9999 |
| (213) 978-4444 | (213) 456-0000 |
| (213) 456-0000 | (213) 456-0000 |

In addition to the WAH access table, the service may additionally utilize a WAH termination table, such as that shown in Table 12. Table 12 include four columns and resembles the WAH access table. However, the WAH terminating table also includes an indicator of whether the WAH service is enabled or disabled and also indicates the privilege code for the authorized user of the service.

TABLE 12

WAH Termination Table

| Work TN | Priv. Class | WAH On | Home TN |
|---|---|---|---|
| (213) 432-7777 | 21 | Y | (213) 978-1111 |
| (213) 876-8888 | 15 | N | (213) 978-2222 |
| (213) 456-9999 | 4 | N | (213) 978-3333 |
| (213) 456-0000 | 35 | Y | (213) 978-4444 |

The WAH feature activation/deactivation telephone numbers and the work TNs may be provisioned as TATs or DNTS.

Further, the WAH trigger may be implemented from any AIN SSP within the service provider's system, i.e., the WAH trigger need not be a trigger from within the network, but the dial plan available may not be the same as from an SSP serving the multiple location, communications network. Once the SCP receives the query and begins executing the appropriate WAH CPR, the WAH feature may be executed in accordance with, for example, the exemplary flow diagram of FIGS. 10A–10D.

Figure 10A:
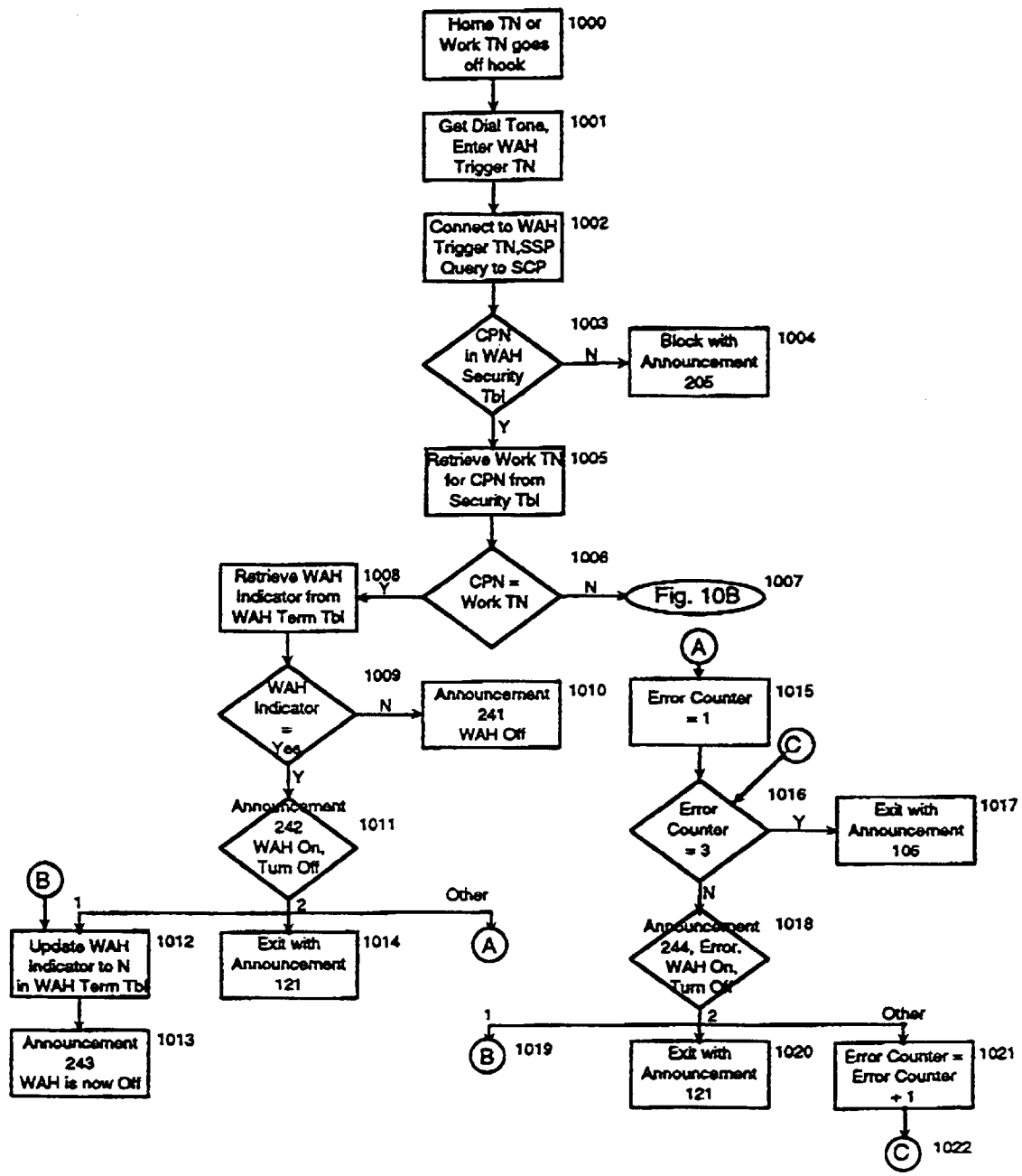
FIGS. 10A illustrates an exemplary flow diagram for triggering a work-at-home service and screening callers.

In step 1000 of FIG. 10A, the calling party's station goes off-hook. In step 1001, the calling party gets a dial tone and enters the seven or ten digit designated WAH access telephone number. According to standard AIN triggering, the SSP assigned the designated WAH will recognize the trigger and launch an AIN message query to the SCP that includes the CGN, in step 1002. The SCP, in step 1003, may use the CGN in conjunction with the access table, such as Table 11, to determine whether the calling party is authorized to access the network's WAH feature. If the CGN is not a valid number, the SCP may instruct the triggering SSP to play an announcement, e.g., "I'm sorry but you have attempted to access an invalid feature" and disconnect the caller from the network in step 1004. If the originating telephone number, i.e., CGN, is indicated in access Table 11 as a valid WAH accessing number, the associated work TN may be retrieved from the access table in step 1005. In step 1006, it may be determined whether the WAH call originates from the work TN.

Figure 10B:
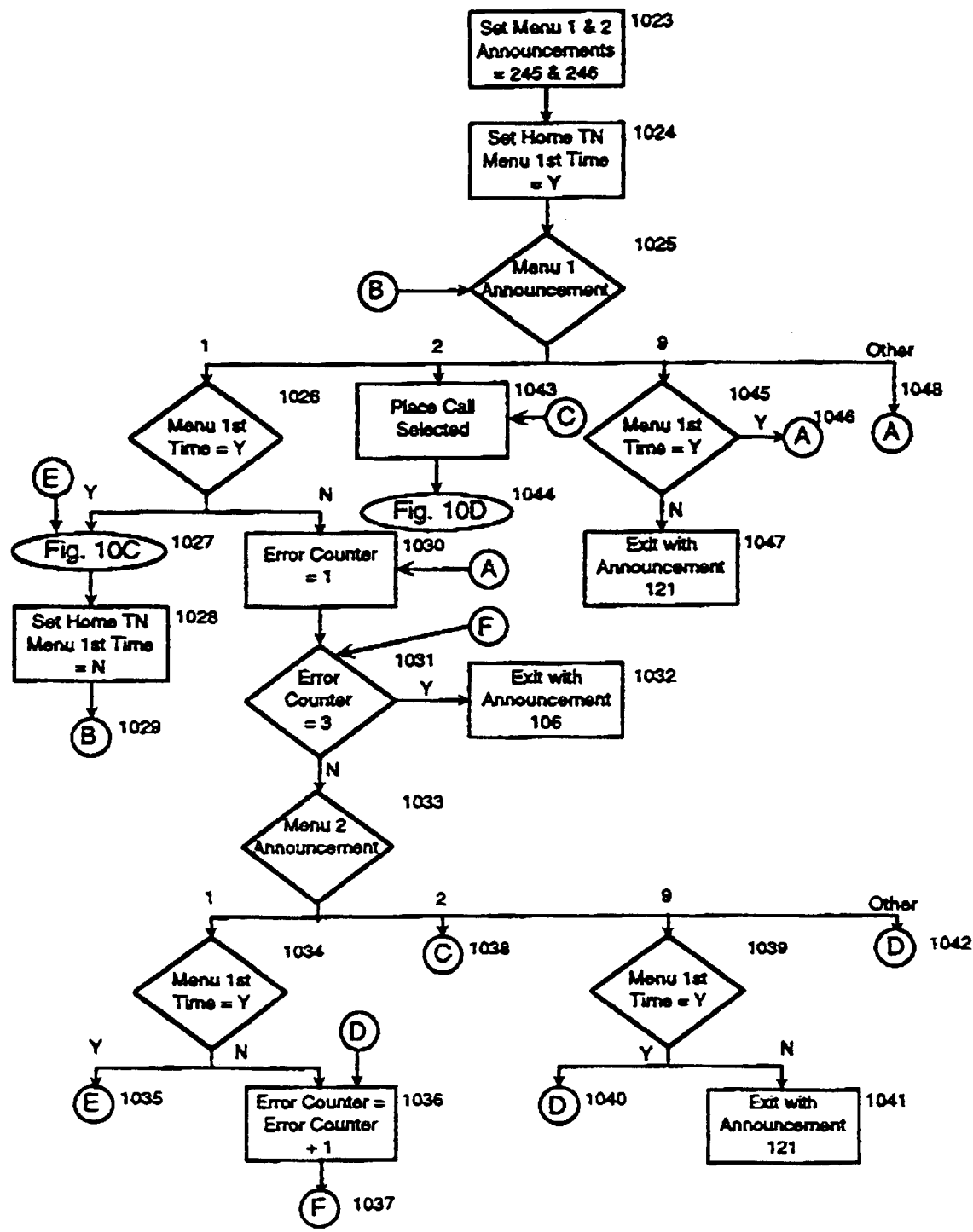
FIG. 10B illustrates an exemplary flow diagram for a work-at-home service option menu.
Figure 10C:
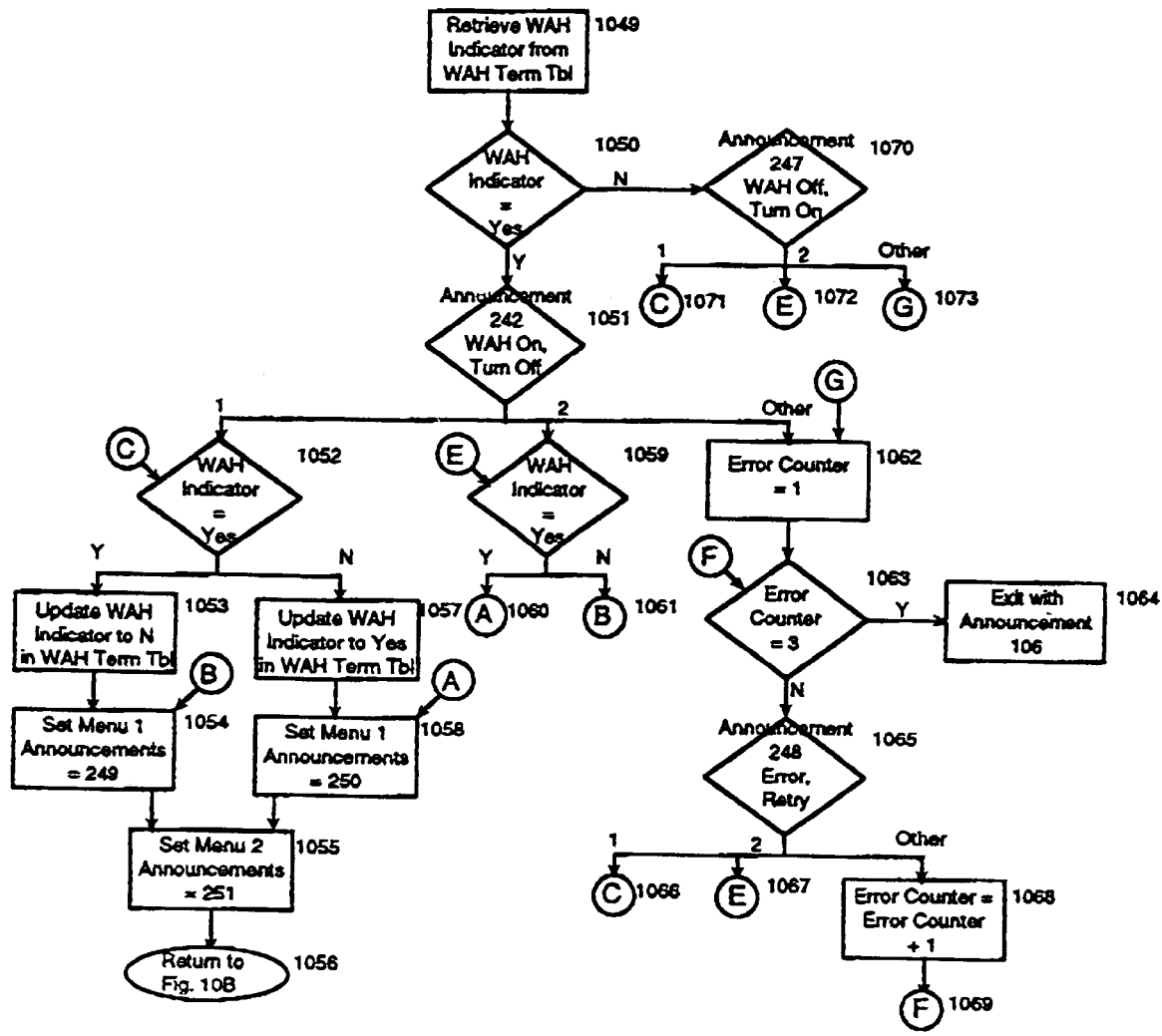
FIG. 10C illustrates an exemplary flow diagram for updating the work-at-home service indicator.

If the CGN is not the work TN, the service logic proceeds to FIG. 10B in step 1007. If the CGN is the work TN, in step 1008, the WAH indicator may be retrieved from the WAH terminating table, e.g., Table 12. In step 1009, the service logic determines whether the WAH feature has been enabled. If not enabled, the SCP may instruct the SSP to play an announcement, e.g., "Work-at-home is off and may only be turned on from your home telephone," in step 1010. If enabled, the SCP, in step 1011, may instruct the SSP to play an announcement, e.g., "Work-at-home is on. To turn work-at-home off, press 1; to leave work-at-home on, press 2."

If the calling party, in response to the announcement, enters the digit "1" to turn the work at home feature off, then, in step 1012, the WAH indicator may be updated to "No" in the WAH terminating table. In step 1013, the SCP may now instruct the SSP to play an announcement, e.g., "Work-at-home is off, thank you for calling." If, in response to the message played in step 1011, the caller enters "2" to turn the work at home feature on, SCP may instruct the SSP to play an announcement, e.g., "Thank you for calling," in step 1014. If, in response to the message played in step 1011, the user enters a digit other than "1" or "2", the WAH service logic may proceed to an error counter (see step 1015) to allow the caller to input a correct digit. In step 1015, an error counter is initialized. In step 1016, it is determined whether the counter reads, e.g., 3. If the counter reads 3, the SCP may instruct the SSP to play an announcement, e.g., "Entry not valid, please hang up, check the number, and call back again," in step 1017. If the counter does not read 3 in step 1016, the SCP may instruct the SSP to play an announcement, e.g., "Entry not valid. To turn on work-at-home, press 1; to leave it as it is, press 2" in step 1018.

The service logic anticipates three responses to the message played in step 1018, i.e., 1, 2 or other. If a "1" is entered by the caller, the service logic, in step 1019, returns to step 1012. If the caller enters "2", the SCP, in step 1020, instructs the SSP to play the same message played in step 1014. If a digit other than "1" or "2" has been entered by the caller, the error counter may be incremented by 1, in step 1021, and, in step 1022, the service logic may proceed back to step 1016 to check if three invalid attempts at entering a correct digit have been made.

When the CGN is not the same as the work TN, step 1007 proceeds to step 1023 (as shown in FIG. 10B), which sets menus 1 and 2 for future announcements, e.g., "Welcome to work-at-home. To turn work-at-home on or off, press 1; to place a call, press 2" and "Entry not valid. To turn work-at-home on or off, press 1; to place a call, press 2." In step 1024, the home TN menu is set to "Y" to indicate the first time through this menu procedure. In step 1025, the SCP may instruct the SSP to play an announcement, e.g., "Welcome to the work-at-home. To turn work-at-home on or off, press 1; to place a call, press 2." Thus, the first time step 1025 is performed, "1" and "2" are the only valid inputs. Accordingly, the service logic anticipates one of two responses, i.e., 1 or 2. If "1" is entered, it is determined, in step 1026, whether this is the first time through this menu. If it is not the first time, then the service logic may proceed to an error counter at step 1030. In step 1030, the counter may be initialized. In step 1031, the service logic may determine whether the counter reads 3. If the counter reads 3, then, in step 1032, the SCP may instruct the SSP to play an announcement similar to the message played in step 1017. If the counter does not read 3, then in step 1033, the SCP may instruct the SSP to play an announcement; e.g., "Invalid entry. To turn work-at-home on or off, press 1; to place a call, press 2." Again, the service logic anticipates one of four potential entries.

If the caller enters a "1" in response to the message played in step 1033, then, in step 1034, the WAH service logic determines whether this is the first time through the menu. If it is determined that this is the first time through the menu, then the service logic, in step 1035, will proceed to FIG. 10C to permit the work at home feature to be turned on or off. If it is determined that this is not the first time through the menu, then the error counter will be incremented by 1 in step 1036. Then in step 1037, the service logic will return to step 1031 to determine the number of the error counter. If in response to the message played in step 1033, the caller inputs a digit 2, then in step 1038, the service logic will proceed to step 1043 and to FIG. 10D to permit the placement of a call through the private network. If in response to the message played in step 1033 the caller inputs the digit 9, then, in step 1039, the service logic will determine whether this is the first time through the menu. If it is determined that this is the first time through the menu then, in step 1040, the service logic will proceed to step 1036 and the error counter will be incremented by one, as described above. If it is determined that this is not the first time through the menu, then in step 1041, the SCP may instruct the SSP to play an announcement, e.g., "Thank you for calling" and exit the menu with the call being disconnected. If in response to the message played in step 1033, the caller inputs a digit other than 1, 2, or 9, then the WAH service logic, in step 1042, would proceed to step 1036.

If, in response to the message played in step 1025, the caller inputs the digit 2, then the service logic would proceed to step 1043. In step 1043, the work-at-home call may be placed, and, in step 1044, the service logic proceeds to FIG. 10D. If in response to the message played in step 1025, the caller inputs the digit 9, then in step 1045, the service logic would determine whether this is the first time through the menu. If this is the first time through the menu, then in step 1046, the service logic will proceed to step 1030. If this is not the first time through the menu, then in step 1047, the SCP will instruct the SSP to play an announcement, e.g., "Thank you for calling" and exit the menu. If in response to the message played in step 1025, the caller inputs a digit other than "1", "2", or "9", then, in step 1048, the service logic would proceed to step 1030.

In step 1027 of FIG. 10B, the caller is permitted to activate or deactivate the WAH feature. Accordingly, step 1027 proceeds to step 1049 in FIG. 10C. In step 1049, the WAH indicator is retrieved from the WAH terminating table stored in the SCP database. In step 1050, it is determined whether the WAH indicator is Yes to indicate that the WAH feature is activated. If the WAH indicator is not Yes, then the service logic proceeds to 1070, in which the SCP may instruct the SSP to play an announcement, e.g., "Work-at-home is off. To turn work-at-home on, press 1; to leave it as it is, press 2." In response to step 1070, the service logic anticipates three potential entries, i.e., 1, 2, or another digit. If in response to the message played in step 1070 the caller inputs the digit 1, the service logic, in step 1071, proceeds to step 1052. If the caller, in response to the message played in step 1070 inputs the digit 2, then, in step 1072, the service logic proceeds to step 1059. If, in response to the message played in step 1070, the caller enters a digit other than 1 or 2, then in step 1073, the service logic then proceeds to step 1062.

If the WAH indicator in step 1050 is found to be Yes, then the service logic proceeds to step 1051. In step 1051, the SCP may instruct the SSP to play an announcement, e.g., "Work-at-home is on. To turn work-at-home off, press 1; to leave it as it is, press 2." In response to this announcement, the service logic anticipates three potential responses, e.g., 1, 2, or another digit. If in response to the message played in step 1051, the caller inputs a digit 1, then in step 1052, the service logic determines whether the WAH indicator is Yes. If the WAH indicator is Yes, the service logic proceeds to step 1053. In step 1053, the WAH indicator may be updated to No in the WAH terminating table. In step 1054, the menu 1 may be set to play an announcement, e.g., "Work-at-home is off. To place a call, press 2; to exit, press 9." In step 1055, menu 2 may be set to play an announcement, e.g., "Entry not valid. To place a call, press 2; to exit, press 9." Thus, after this step is performed, "1" is no longer a valid input digit. In step 1056, the service logic may return to step 1028 of FIG. 10B. In step 1028, the home TN menu first time is set to N. In step 1029, the service logic proceeds to step 1025 to play the announcement set as menu 1.

If, in step 1052, it is determined that the WAH indicator is No, then in step 1057, the WAH indicator may be updated to Yes in the WAH terminating table. In step 1058, menu 1 may be set to play an announcement, e.g., "Work-at-home in on. To place a call, press 2; to exit, press 9." The service logic then proceeds to step 1055 to set menu 2 to play an announcement, e.g., "Entry not valid. To place a call, press 2; to exit, press 9." Thus, after this step, "1" is no longer a valid input digit. In step 1056, the service logic may proceed to step 1028 of FIG. 10B.

If, in response to step 1051, the caller inputs the digit 2, then in step 1059, it will be determined whether the WAH indicator is Yes. If a WAH indicator is Yes, then in step 1060, the service logic will proceed to step 1058 to set menu 1, as discussed above. If the WAH indicator is No, the service logic, in step 1061, will proceed to step 1054 to set menu 1, as discussed above.

If in response to the message played in step 1051, the caller inputs a digit other than 1 or 2, the service logic may proceed to an error counter to allow the caller to input the digit again. In step 1062, the error counter is initialized. In step 1063, the service logic determines whether the error counter reads 3. If the error counts reads 3, then in step 1064, the SCP may instruct the SSP to play an announcement similar to the message played in step 1017. If the counter does not read 3 in step 1063, then the SCP may instruct the SSP to play an announcement similar to the message played in step 1018. In response to the message played in step 1065, the service logic anticipates three potential responses, i.e., 1, 2, and others. If the caller inputs digit 1, then in step 1066, the service logic will proceed to step 1052. If the caller inputs the digit 2, then in step 1067, the service logic will proceed to step 1059. If the caller inputs a digit other than 1 or 2, then in step 1068, the error counter will be incremented by one. In step 1069, the service logic may proceed to step 1063.

Figure 10D:
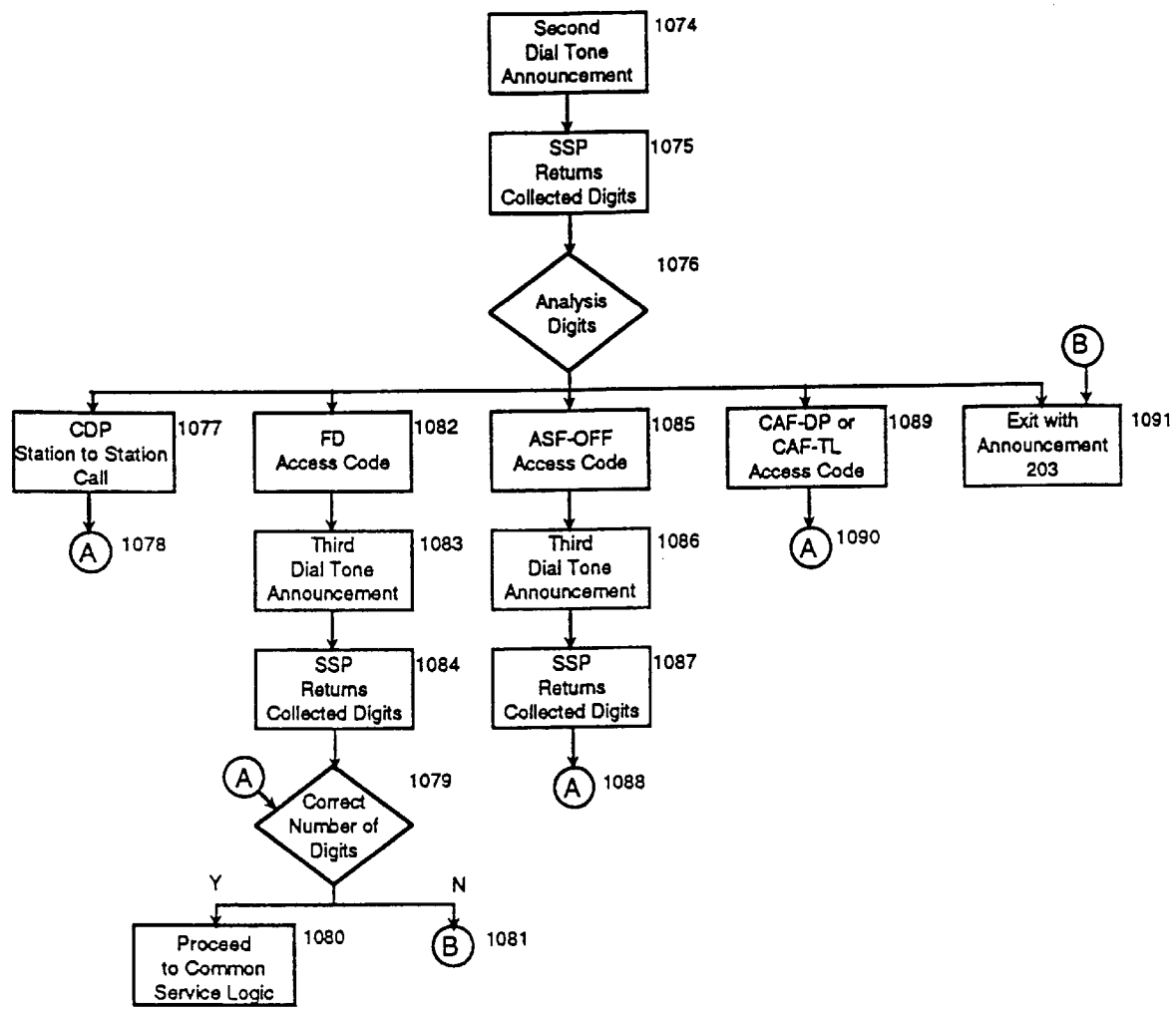
FIG. 10D illustrates an exemplary flow diagram for placing a call through the work-at-home service.

When the caller has indicated an intention to place a call, and the service logic, in step 1044, proceeds to FIG. 10D, then the service logic proceeds to step 1074. In step 1074, the SCP instructs the SSP to play a second dial tone. In step 1075, the SSP returns collected digits input from the caller, which indicate a desired terminating number. In step 1076, the service logic analyzes the digits to determine whether the particular access code has been entered.

In step 1077, the service logic determines that the caller is attempting a CDP station-to-station call. In step 1078, the service logic proceeds to step 1079. In step 1082, the service logic determines that the caller is attempting a function dialing option. In step 1083, the SCP may instruct the SSP to play a third dial tone and/or an announcement to prompt the caller for the function number. In step 1084, the SSP may return collected digits input by the caller, indicative of a function number desired. In step 1079, it is determined whether the correct number of digits have been entered by the caller. If the number of digits is correct, the service logic proceeds to step 1080 in which the service logic proceeds to the common service logic of the multiple location, communications network. If, in step 1079 it is determined that an incorrect number of digits has been entered, then in step 1081, the service logic proceeds to step 1091.

In step 1085, the service logic in the SCP determines that the caller is attempting an ASF off-network access. In step 1086, the SCP may instruct the SSP to play a third dial tone and/or announcement to prompt the caller for the desired terminating number. In step 1087, the SSP may return the collected digits entered by the caller, indicative of the desired terminating number. In step 1088, the service logic proceeds to step 1079.

In step 1089, it is determined that the caller is attempting a CAF-DP or CAF-TL access. In step 1090, the service logic proceeds to step 1079.

If the service logic does not understand the digits collected in step 1075, then, in step 1091, the SCP may instruct the SSP to play an announcement, e.g., "Please hang up, check the number, and try again".

As noted above, once access has been granted to the user, the user may move around freely within the common service logic of the multiple location, communications network, although the call screening feature may restrict certain features from the user. For example, if the originating number is not valid, the WAH CPR may prompt the user to enter a validation code to override Table 11. The authorization code may be the same as the authorization code that overrides the outgoing call screening feature or may be a distinct WAH access code.

Once the WAH feature is activated, calls offered for termination at the user's network station will be forwarded to the user's home telephone. If a network includes the WAH feature, the SCP must determine whether each call offered for termination to a network station, whether originating on-network or off-network, is an activated WAH station. This WAH screening feature is necessary for the SCP to determine whether the offered call is to be terminated at the user's work station or at the user's home telephone. This information may also be stored in the WAH terminating table or another table accessible by the SCP. The table should contain at least entries to indicate the network station number, the home telephone number, and whether WAH is active. If the SCP finds WAH active, the incoming call may be forwarded to the designated home telephone number. If the SCP finds WAH inactive, the incoming call will be routed to the network station location.

Figure 11:
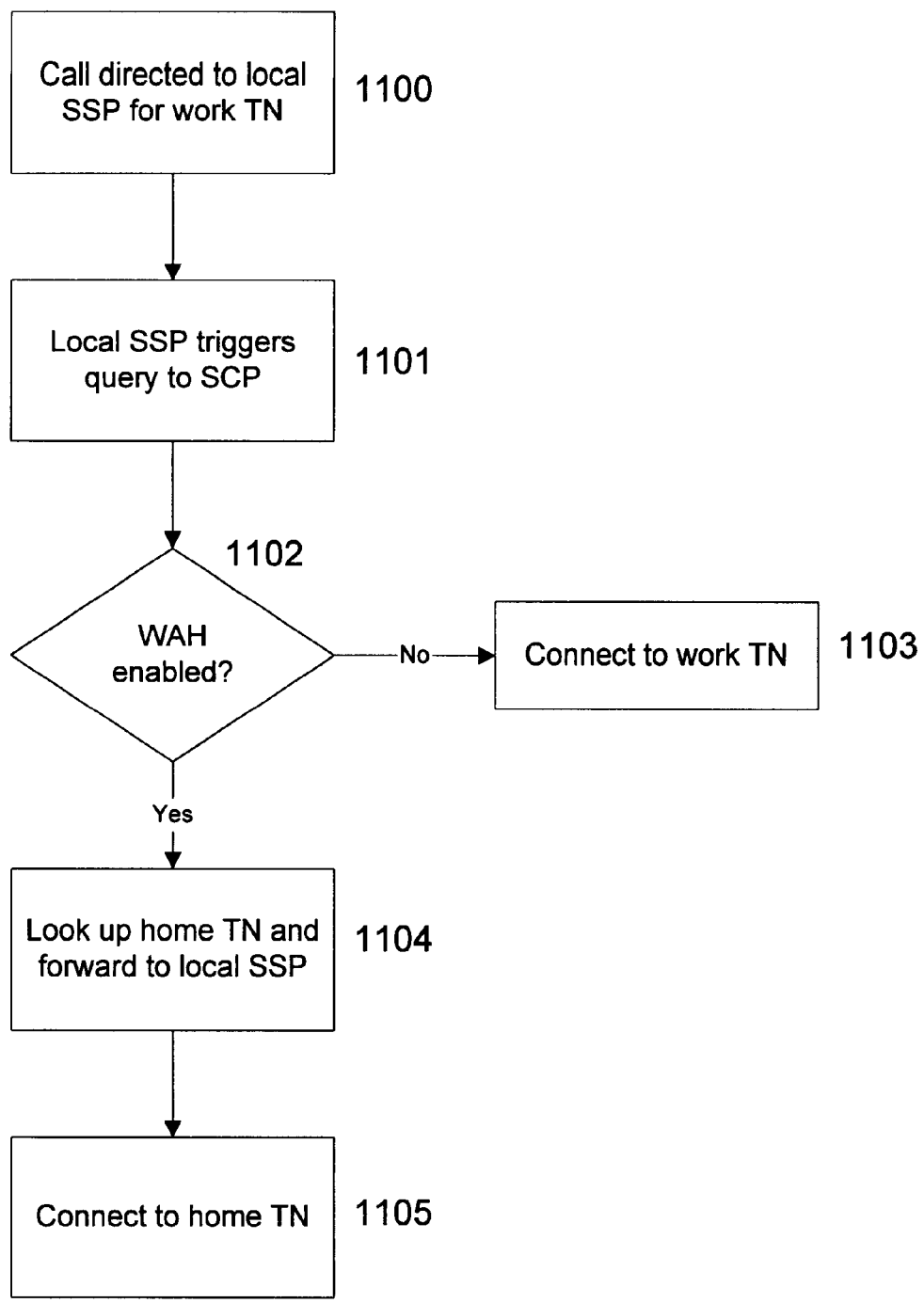
FIG. 11 illustrates an exemplary flow diagram of work-at-home call termination.
Figure 12:
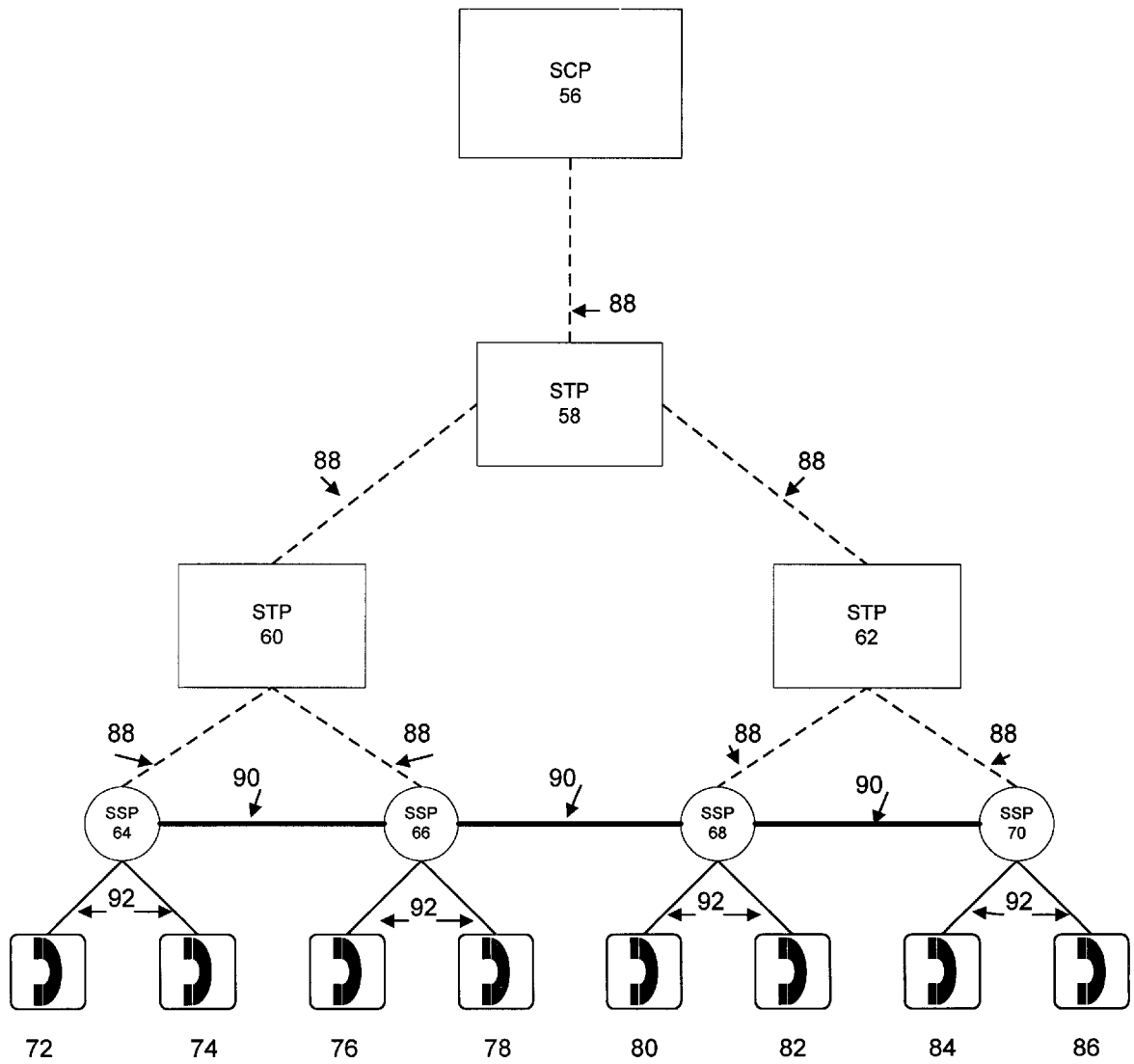
FIG. 12 illustrates an exemplary block diagram of the basic components of an Advanced Intelligent Network (AIN) system.

FIG. 11 shows an exemplary flow diagram of an incoming call to the network that subscribes to the WAH feature. In step 1100, the call (whether originating on- or off-network) will be directed to the local SSP for the work TN for termination. In step 1101, the local SSP, as a terminating attempt trigger, may query the SCP. The SCP, in step 1102, may access the WAH terminating table, e.g., Table 12, to determine whether the WAH feature has been enabled for the called work TN. If WAH has not been enabled, i.e., the "WAH On" column indicates "N", then in step 1103, the call may be terminated to the work TN. However, if WAH has been enabled, i.e., the "WAH On" column indicated "Y", then in step 1104, the SCP may look up the home TN and forward the home TN to the triggering SSP. In step 1105, the call may be terminated to the home TN associated with the called work TN.

With regard to the selection of appropriate AIN SSPs for provisioning the WAH features, 1AESS switches with AIN Release 0.0 DNTs used in the terminating call mode on a work TN may interfere with many switch based features. To overcome this obstacle, subscribers connected to existing 1AESS switches may use Call Forwarding-Variable and Remote Access to Call Forwarding to approximate WAH terminating and WAH update of the WAH indicator.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitations. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the multiple location communications network comprising:

means for receiving, at one of the plurality of network service switching points, a call request from the originating station to establish a communication connection with the terminating station, the call request including at least one dialed digit, the one network service switching point comprising means for identifying a service control point request based upon the at least one dialed digit;

means for accessing the service control point in response to the service control point request identified by the identifying means, the accessing means comprising means for forwarding a query message from the one network service switching point to the service control point, the query message including the at least one dialed digit;

means for identifying, at the service control point, the terminating station based on the query message and the at least one dialed digit;

means for forwarding, from the service control point to the one network service switching point, a query response comprising routing information including a routing path between the originating station and the terminating station; and means for establishing the communication connection between the originating station and the terminating station based on the query response and the at least one dialed digit;

wherein when the originating station is a non-network location, the call request includes a designated number to append the non-network location to the private network, the designated number being entered prior to entry of the at least one dialed digit;

wherein the service control point comprises means for verifying that the one non-network location is authorized to be appended to the private network such that when the verifying means determines that the one non-network location is authorized to be appended to the network, the one non-network location becomes an appended location of the private network.

2. The multiple location communication network according to claim 1, said verifying means comprising a look up table including home telephone numbers of authorized users and work telephone numbers of said authorized users, wherein when a calling phone number associated with said originating station is found in said look up table, said authorization is verified.

3. The multiple location communication network according to claim 2, said service control point further comprising means for selectively forwarding a call offered to a work telephone number of one of said authorized users to a home telephone number associated with said work telephone number in said look up table.

4. The multiple location communication network according to claim 2, comprising means for accepting said at least one dialed digit entered from one of said home telephone numbers listed in said look up table; and means for blocking said at least one dialed digit entered from one of said work telephone numbers listed in said look up table.

5. The multiple location communication network according to claim 2, comprising means for enabling call forwarding to a home telephone number of said authorized user;

means for collecting an enable request from said authorized user entered from a station associated with said authorized user's home telephone number; and means for blocking said enable request from said authorized user entered from a station associated with said authorized user's work telephone number.

6. The multiple location communication network according to claim 2, comprising means for disabling call forwarding to a home telephone number of said authorized user;

means for collecting a disable request from said authorized user entered from a station associated with one of said authorized user's work telephone number and said authorized user's home telephone number.

7. A multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the multiple location communications network comprising;

means for receiving, at one of the plurality of network service switching points, a call request from the originating station to establish a communication connection with the terminating station, the call request including at least one dialed digit, the one network service switching point comprising means for identifying a service control point request based upon the at least one dialed digit;

means for accessing the service control point in response to the service control point request identified by the identifying means, the accessing means comprising means for forwarding a query message from the one network service switching point to the service control point, the query message including the at least one dialed digit;

wherein when the originating station is an originating network location, the originating station is adapted to directly access specific dialing plans associated with a central access service switching point;

the call request including an access number associated with the central access service switching point to connect the originating network location to the central access service switching point.

8. The multiple location communication network according to claim 7, said service control point comprising means for determining whether said central access service switching point is a local network service switching point or a non-local network service switching point with respect to said originating station.

9. The multiple location communication network according to claim 8, when said central access service switching point comprises a non-local network service switching point, said service control point comprising means for translating said access number into a terminating number associated with said non-local network service switching point and means for instructing a local network service switching point to forward said call request to said non-local network service switching point.

10. The multiple location communication network according to claim 9, said service control point further comprising means for instructing said non-local network service switching point to play a second dial tone to said originating station.

11. The multiple location communication network according to claim 7, when said central access service switching point comprises a local network service switching point, said service control point further comprising means for blocking call processing.

12. A multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the multiple location communications network comprising:

means for receiving, at one of the plurality of network service switching points, a call request from the originating station to establish a communication connection with the terminating station, the call request including at least one dialed digit, the one network service switching point comprising means for identifying a service control point request based upon the at least one dialed digit;

means for accessing the service control point in response to the service control point request identified by the identifying means, the accessing means comprising means for forwarding a query message from the one network service switching point to the service control point, the query message including the at least one dialed digit;

means for identifying, at the service control point, the terminating station based on the query message and the at least one dialed digit;

means for forwarding, from the service control point to the one network service switching point, a query response comprising routing information including a routing path between the originating station and the terminating station; and means for establishing the communication connection between the originating station and the terminating station based on the query response and the at least one dialed digit;

wherein when the originating station is an originating network location, the originating station is adapted to directly access private facilities directly coupled to a central access point including one of a local network service switching point and a non-local network service switching point;

the call request including an access number associated with the central access point to connect the originating network location to the central access point.

13. The multiple location communication network according to claim 12, said service control means comprising means for translating said access number into a terminating number associated with said central access service switching point.

14. The multiple location communication network according to claim 13, said service control point further comprising means for determining whether said central access service switching point is a local network service switching point or a non-local network service switching point with respect to said originating station.

15. The multiple location communication network according to claim 14, when said central access service switching point comprises a local network service switching point, said service control point comprising means for instructing said central access service switching point to play a second dial tone.

16. The multiple location communication network according to claim 14, when said central access service switching point comprises a non-local network service switching point, said service control point comprising means for translating said access number into a terminating number associated with said central access service switching point and means for forwarding said call request to said central access service switching point.

17. The multiple location communication network according to claim 16, said service control point further comprising means for instructing said central access service switching point to play a second dial tone to said originating station.

18. A multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the multiple location communications network comprising:

means for receiving, at one of the plurality of network service switching points, a call request from the originating station to establish a communication connection with the terminating station, the call request including at least one dialed digit, the one network service switching point comprising means for identifying a service control point request based upon the at least one dialed digit;

means for accessing the service control point in response to the service control point request identified by the identifying means, the accessing means comprising means for forwarding a query message from the one network service switching point to the service control point, the query message including the at least one dialed digit;

means for identifying, at the service control point, the terminating station based on the query message and the at least one dialed digit;

means for forwarding, from the service control point to the one network service switching point, a query response comprising routing information including a routing path between the originating station and the terminating station; and means for establishing the communication connection between the originating station and the terminating station based on the query response and the at least one dialed digit;

the originating station entering an access number to indicate that the terminating station location comprises a terminating non-network location;

the means for selectively establishing a routing path comprising means for determining the originating station location, means for determining the termination station location, and means for ascertaining a desired routing scheme for establishing the service connection.

19. The multiple location communication network according to claim 18, said service control point comprising means for instructing said one service switching point to play a second dial tone to said originating station, wherein said originating station enters a terminating number in response to said second dial tone.

20. The multiple location communication network according to claim 18, said means for ascertaining a desired routing scheme for establishing said service connection comprising a look up table including a listing of each originating network location, a listing of terminating locations.

21. The multiple location communication network according to claim 20, wherein said listing of terminating locations are arranged as a listing of selected NPA-NXXs, a listing of selected NPAs, and a default listing.

22. The multiple location communication network according to claim 21, said service control point further comprising means for determining said termination station location including means for translating said at least one dialed digit into a terminating station NPA-NXX, and wherein said means for determining said originating station location includes translating a calling telephone number into said originating station location.

23. The multiple location communication network according to claim 22, said means for ascertaining comprising means for correlating said originating station location with said terminating station NPA-NXX in said look up table and means for selecting a predefined routing scheme from a subscriber prioritized facility arrangement list, wherein when said terminating station NPA-NXX is not listed, said means for ascertaining comprising means for correlating said originating station location with said terminating station NPA in said look up table and means for selecting said predefined routing scheme from said subscriber prioritized facility arrangement list, and wherein when said terminating station NPA is not listed, said means for ascertaining comprising means for correlating said originating station location with said terminating station default listing in said look up table and means for selecting said predefined routing scheme from said subscriber prioritized facility arrangement list.

24. The multiple location communication network according to claim 20, wherein said listing of terminating locations are arranged as a listing of intra-LATA, a listing of inter-LATA, and international.

25. The multiple location communication network according to claim 24, said service control point further comprising means for determining said termination station location including means for translating said at least one dialed digit into an indication of a termination type including one of international, inter-LATA, and intra-LATA, and wherein said means for determining said originating station location includes means for translating a calling telephone number into said originating station location.

26. The multiple location communication network according to claim 25, said means for ascertaining comprising means correlating said originating station location with said termination type in said look up table and means for selecting a predefined routing scheme from a subscriber prioritized facility arrangement list.

27. A multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the multiple location communications network comprising:

means for receiving, at one of the plurality of network service switching points, a call request from the originating station to establish a communication connection with the terminating station, the call request including at least one dialed digit, the one network service switching point comprising means for identifying a service control point request based upon the at least one dialed digit;

means for accessing the service control point in response to the service control point request identified by the identifying means, the accessing means comprising means for forwarding a query message from the one network service switching point to the service control point, the query message including the at least one dialed digit;

means for identifying, at the service control point, the terminating station based on the query message and the at least one dialed digit;

means for forwarding, from the service control point to the one network service switching point, a query response comprising routing information including a routing path between the originating station and the terminating station; and means for establishing the communication connection between the originating station and the terminating station based on the query response and the at least one dialed digit, the at least one dialed digit comprises an access number to enable function dialing, the function dialing comprising a function dialing number in which alphabetic representations of dialed numbers are dialed at the originating station to form a word associated with a functional aspect of a terminating station party.

28. The multiple location communication network according to claim 27, said word comprising an appended location code and said service control point further comprising means for discerning said word from said location code to instruct said one service control point to terminate said function dialing number to said terminating station party at said appended location.

29. The multiple location communication network according to claim 27, comprising means for selectively routing said function dialing number to said terminating party according to predefined routing schemes.

30. The multiple location communication network according to claim 29, said means for selectively routing comprising means for determining whether a routing scheme is defined between said originating station and said terminating station, said determining means including means for accessing a first look up table for on network routing schemes, and, if no routing schemes are found for a pair of said originating station and terminating station, said determining means further comprising means for accessing a second look up table for off network routing schemes; and means for routing said call request according to said determining means.

31. A multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the multiple location communications network comprising:

means for receiving, at one of the plurality of network service switching points, a call request from the originating station to establish a communication connection with the terminating station, the call request including at least one dialed digit, the one network service switching point comprising means for identifying a service control point request based upon the at least one dialed digit;

means for accessing the service control point in response to the service control point request identified by the identifying means, the accessing means comprising means for forwarding a query message from the one network service switching point to the service control point, the query message including the at least one dialed digit;

means for identifying, at the service control point, the terminating station based on the query message and the at least one dialed digit;

means for forwarding, from the service control point to the one network service switching point, a query response comprising routing information including a routing path between the originating station and the terminating station;

means for establishing the communication connection between the originating station and the terminating station based on the query response and the at least one dialed digit; and an outgoing call screening feature, the outgoing call screening feature actuated after the service control point identifies the terminating station and before forwarding the query response, the outgoing call screening feature comprising means for determining a call type and means for ascertaining whether the determined call type is within a privilege class associated with the originating station, the call type comprising a member of the group consisting of on-network intra-LATA private facilities; on-network intra-LATA private/public facilities; on-network inter-LATA private facilities; on-network inter-LATA private/public facilities; off-network intra-LATA private facilities; off-network intra-LATA private/public facilities; off-network inter-LATA private facilities; off-network inter-LATA private/public facilities; off-network international private facilities; off-network international private/public facilities; off-network (NANP) intra-LATA private facilities with 900-, 976-, and 555 service blocking; off-network (NANP) inter-LATA private facilities with 900-, 976-, and 555 service blocking; off-network (NANP) intra-LATA private/public facilities with 900-, 976-, and 555 service blocking; and off-network (NANP) inter-LATA private/public facilities with 900-, 976-, and 555 service blocking; and the privilege class, assigned to a network station, comprising a listing of each call type that a station may offer for termination.

32. The multiple location communication network according to claim 31, wherein when said determined call type is not within said privilege class associated with said origination station, said service control means further comprising blocking means for blocking said call from termination.

33. The multiple location communication network according to claim 31, wherein when said determined call type is not within said privilege class associated with said origination station, said service control point further comprising means for receiving an authorization code associated with the originating party, said service control point further comprising means for validating said authorization code to determine whether said determined call type is within the privilege class of the entered authorization codes.

34. A method for call processing in a multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the method comprising:

receiving, at one of the plurality of network service switching points, a call request from the originating station to establish a communication connection with the terminating station, the call request including at least one dialed digit, the one network service switching point comprising identifying a service control point request based upon the at least one dialed digit;

accessing the service control point in response to the service control point request identified the accessing step comprising forwarding a query message from the one network service switching point to the service control point, the query message including the at least one dialed digit;

identifying, at the service control point, the terminating station based on the query message and the at least one dialed digit;

forwarding from the service control point to the one network service switching point, a query response comprising routing information including a routing path between the originating station and the terminating station;

establishing the communication connection between the originating station and the terminating station based on the query response and the at least one dialed digit; and verifying within the private network that the one non-network location is authorized to be appended to the private network such that when the verifying determines that the one non-network location is authorized to be appended to the network, the one non-network location becomes an appended location of the private network;

wherein, when the originating station is a non-network location, the call request includes a designated number to append the non-network location to the private network, the designated number being entered prior to entry of the at least one dialed digit.

35. The method according to claim 34, said verifying step comprising a look up table including home telephone numbers of authorized users and work telephone numbers of said authorized users, wherein when a calling phone number associated with said originating station is found in said look up table, said authorization is verified.

36. The method according to claim 35, said method further comprising selectively forwarding a call offered to a work telephone number of one of said authorized users to a home telephone number associated with said work telephone number in said look up table.

37. The method according to claim 35, comprising accepting said at least one dialed digit entered from one of said home telephone numbers listed in said look up table; and blocking said at least one dialed digit entered from one of said work telephone numbers listed in said look up table.

38. The method according to claim 35, comprising enabling call forwarding to a home telephone number of said authorized user;

collecting an enable request from said authorized user entered from a station associated with said authorized user's home telephone number; and blocking said enable request from said authorized user entered from a station associated with said authorized user's work telephone number.

39. The method according to claim 35, comprising disabling call forwarding to a home telephone number of said authorized user;

collecting a disable request from said authorized user entered from a station associated with one of said authorized user's work telephone number and said authorized user's home telephone number.

40. A method for call processing in a multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the method comprising:

receiving, at one of the plurality of network service switching points, a call request from the originating station to establish a communication connection with the terminating station, the call request including at least one dialed digit and an access number associated with the central access service switching point to connect the originating network location to the central access service switching point, the one network service switching point comprising identifying a service control point request based upon the at least one dialed digit;

accessing the service control point in response to the service control point request identified the accessing step comprising forwarding a query message from the one network service switching point to the service control point, the query message including the at least one dialed digit;

identifying, at the service control point, the terminating station based on the query message and the at least one dialed digit;

forwarding from the service control point to the one network service switching point, a query response comprising routing information including a routing path between the originating station and the terminating station; and establishing the communication connection between the originating station and the terminating station based on the query response and the at least one dialed digit;

wherein when the originating station is an originating network location, adapting the originating station to directly access specific network dialing plans associated with a central access service switching point.

41. The method according to claim 40, said method further comprising determining whether said central access service switching point is a local network service switching point or a non-local network service switching point with respect to said originating station.

42. The method according to claim 41, when said central access service switching point comprises a non-local network service switching point, said method comprising translating said access number into a terminating number associated with said non-local network service switching point and instructing a local network service switching point to forward said call request to said non-local network service switching point.

43. The method according to claim 42, said method further comprising instructing said non-local network service switching point to play a second dial tone to said originating station.

44. The method according to claim 40, when said central access service switching point comprises a local network service switching point, said method further comprising blocking call processing.

45. A method for call processing in a multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the method comprising:

receiving, at one of the plurality of network service switching points, a call request from the originating station to establish a communication connection with the terminating station, the call request including at least one dialed digit, the one network service switching point comprising identifying a service control point request based upon the at least one dialed digit;

accessing the service control point in response to the service control point request identified the accessing step comprising forwarding a query message from the one network service switching point to the service control point, the query message including the at least one dialed digit;

identifying, at the service control point, the terminating station based on the query message and the at least one dialed digit;

forwarding from the service control point to the one network service switching point, a query response comprising routing information including a routing path between the originating station and the terminating station; and establishing the communication connection between the originating station and the terminating station based on the query response and the at least one dialed digit;

wherein when the originating station is an originating network location, adapting the originating station to directly access private facilities directly coupled to a central access point including one of a local network service switching point and a non-local network service switching point;

the call request including an access number associated with the central access point to connect the originating network location to the central access point.

46. The method according to claim 45, said method comprising translating said access number into a terminating number associated with said central access service switching point.

47. The method according to claim 46, said method further comprising determining whether said central access service switching point is a local network service switching point or a non-local network service switching point with respect to said originating station.

48. The method according to claim 47, when said central access service switching point comprises a local network service switching point, said method comprising instructing said central access service switching point to play a second dial tone.

49. The method according to claim 47, when said central access service switching point comprises a non-local network service switching point, said method comprising translating said access number into a terminating number associated with said central access service switching point and forwarding said call request to said central access service switching point.

50. The method according to claim 49, said method further comprising instructing said central access service switching point to play a second dial tone to said originating station.

51. A method for call processing in a multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the method comprising:

receiving, at one of the plurality of network service switching points, a call request from the originating station to establish a communication connection with the terminating station, the call request including at least one dialed digit, the one network service switching point comprising identifying a service control point request based upon the at least one dialed digit;

accessing the service control point in response to the service control point request identified the accessing step comprising forwarding a query message from the one network service switching point to the service control point, the query message including the at least one dialed digit;

identifying, at the service control point, the terminating station based on the query message and the at least one dialed digit;

selectively establishing a routing path comprising determining the originating station location, determining the termination station location, and ascertaining a desired routing scheme for establishing the service connection;

forwarding from the service control point to the one network service switching point, a query response comprising the routing path between the originating station and the terminating station; and establishing the communication connection between the originating station and the terminating station based on the query response and the at least one dialed digit;

the originating station entering an access number to indicate that the terminating station location comprises a terminating non-network location.

52. The method according to claim 51, said method comprising instructing said one service switching point to play a second dial tone to said originating station, said originating station entering a terminating number in response to said second dial tone.

53. The method according to claim 52, said step for ascertaining a desired routing scheme for establishing said service connection comprising a look up table including a listing of each originating network location and a listing of terminating locations.

54. The method according to claim 53, arranging said listing of terminating locations as a listing of selected NPA-NXXs, a listing of selected NPAs, and a default listing.

55. The method according to claim 54, said method further comprising determining said termination station location including translating said at least one dialed digit into a terminating station NPA-NXX, and said step for determining said originating station location includes translating a calling telephone number into said originating station location.

56. The method according to claim 55, said step for ascertaining comprising correlating said originating station location with said terminating station NPA-NXX in said look up table and selecting a predefined routing scheme from a subscriber prioritized facility arrangement list, wherein when said terminating station NPA-NXX is not listed, said step for ascertaining comprising correlating said originating station location with said terminating station NPA in said look up table and selecting said predefined routing scheme from said subscriber prioritized facility arrangement list, and wherein when said terminating station NPA is not listed, said step for ascertaining comprising correlating said originating station location with said terminating station default listing in said look up table and selecting said predefined routing scheme from said subscriber prioritized facility arrangement list.

57. The method according to claim 53, arranging said listing of terminating locations as a listing of intra-LATA, a listing of inter-LATA, and international.

58. The method according to claim 57, said method further comprising determining said termination station location including translating said at least one dialed digit into an indication of a termination type including one of international, inter-LATA, and intra-LATA, and wherein said step for determining said originating station location includes translating a calling telephone number into said originating station location.

59. The method according to claim 58, said step for ascertaining comprising correlating said originating station location with said termination type in said look up table and selecting a predefined routing scheme from a subscriber prioritized facility arrangement list.

60. A method for call processing in a multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the method comprising:

receiving, at one of the plurality of network service switching points, a call request from the originating station to establish a communication connection with the terminating station, the call request including at least one dialed digit, the one network service switching point comprising identifying a service control point request based upon the at least one dialed digit;

accessing the service control point in response to the service control point request identified the accessing step comprising forwarding a query message from the one network service switching point to the service control point, the query message including the at least one dialed digit;

identifying, at the service control point, the terminating station based on the query message and the at least one dialed digit;

forwarding from the service control point to the one network service switching point, a query response comprising routing information including a routing path between the originating station and the terminating station; and establishing the communication connection between the originating station and the terminating station based on the query response and the at least one dialed digit;

wherein the at least one dialed digit comprises an access number to enable function dialing, the function dialing comprising entering a function dialing number in which alphabetic representations of dialed numbers at the originating station form a word associated with a functional aspect of a terminating station party.

61. The method according to claim 60, appending a location code to said word and said method further comprising discerning said word from said location code instructing said one service control point to terminate said function dialing number to said terminating station party at said appended location.

62. The method according to claim 60, comprising selectively routing said function dialing number to said terminating party according to predefined routing schemes.

63. The method according to claim 62, said step for selectively routing comprising determining whether a routing scheme is defined between said originating station and said terminating station, said determining step including accessing a first look up table for on network routing schemes, and, if no routing schemes are found for a pair of said originating station and terminating station, said determining step further comprising accessing a second look up table for off network routing schemes; and routing said call request according to said determining means.

64. A method for call processing in a multiple location communications network associated with a private network in an advanced intelligent communications system, the advanced intelligent communications system comprising a service control point, a two-way communications network interconnecting a plurality of network service switching points and a plurality of non-network service switching points, and selectively establishing communication between at least two of a plurality of geographically dispersed locations coupled to the network and non-network service switching points, the at least two locations including an originating station and a terminating station, the method comprising:

receiving, at one of the plurality of network service switching points, a call request from the originating station to establish a communication connection with the terminating station, the call request including at least one dialed digit, the one network service switching point comprising identifying a service control point request based upon the at least one dialed digit;

accessing the service control point in response to the service control point request identified the accessing step comprising forwarding a query message from the one network service switching point to the service control point, the query message including the at least one dialed digit;

identifying, at the service control point, the terminating station based on the query message and the at least one dialed digit;

screening an outgoing call to determine a call type and to ascertain whether the determined call type is within a privilege class associated with the originating station;

assigning the privilege class to a network station, the privilege class listing each call type that a station may offer for termination;

forwarding from the service control point to the one network service switching point, a query response comprising routing information including a routing path between the originating station and the terminating station; and establishing the communication connection between the originating station and the terminating station based on the query response and the at least one dialed digit;

the call type comprising a member of the group consisting of on-network intra-LATA private facilities; on-network intro-LATA private/public facilities; on-network inter-LATA private facilities; on-network inter-LATA private/public facilities; off-network intra-LATA private facilities; off-network intra-LATA private/public facilities; off-network inter-LATA private facilities; off-network inter-LATA private/public facilities; off-network international private facilities; off-network international private/public facilities; off-network (NANP) intra-LATA private facilities with 900-, 976-, and 555 service blocking; off-network (NANP) inter-LATA private facilities with 900-, 976-, and 555 service blocking; off-network (NANP) intra-LATA private/public facilities with 900-, 976-, and 555 service blocking; and off-network (NANP) inter-LATA private/public facilities with 900-, 976-, and 555 service blocking.

65. The method according to claim 64, wherein when said determined call type is not within said privilege class associated with said origination station, said method further comprising blocking said call from termination.

66. The method according to claim 64, wherein when said determined call type is not within said privilege class associated with said origination station, said method further comprising receiving an authorization code associated with the originating party, and validating said authorization code to determine whether said determined call type is within the privilege class of the entered authorization codes.

* * * * *